United States Patent
Park et al.

(10) Patent No.: US 11,304,092 B2
(45) Date of Patent: Apr. 12, 2022

(54) SESSION PACKET DUPLICATION CONTROL

(71) Applicants: Kyungmin Park, Herndon, VA (US); Esmael Hejazi Dinan, McLean, VA (US); Jayshree Bharatia, Plano, TX (US); Peyman Talebi Fard, Sterling, VA (US); Weihua Qiao, Herndon, VA (US)

(72) Inventors: Kyungmin Park, Herndon, VA (US); Esmael Hejazi Dinan, McLean, VA (US); Jayshree Bharatia, Plano, TX (US); Peyman Talebi Fard, Sterling, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/568,961

(22) Filed: Sep. 12, 2019

(65) Prior Publication Data

US 2020/0084663 A1   Mar. 12, 2020

Related U.S. Application Data

(60) Provisional application No. 62/730,206, filed on Sep. 12, 2018, provisional application No. 62/733,843, filed on Sep. 20, 2018.

(51) Int. Cl.
*H04W 28/06* (2009.01)
*H04W 76/27* (2018.01)
(Continued)

(52) U.S. Cl.
CPC ............ *H04W 28/06* (2013.01); *H04W 8/08* (2013.01); *H04W 60/06* (2013.01); *H04W 76/12* (2018.02);
(Continued)

(58) Field of Classification Search
CPC ..... H04W 76/12; H04W 76/15; H04W 76/16; H04W 76/22; H04W 28/06; H04W 28/085
See application file for complete search history.

(56) References Cited

U.S. PATENT DOCUMENTS

2018/0367288 A1* 12/2018 Vrzic ............... H04W 36/0069
2019/0158993 A1   5/2019 Kwon
(Continued)

FOREIGN PATENT DOCUMENTS

WO   2019068328   4/2019
WO   2019093813   5/2019

OTHER PUBLICATIONS

3GPP TS 23.501 V15.2.0 (Jun. 2018); 3rd Generation Partnership Project; Technical Specification Group Services and System Aspects; System Architecture for the 5G System; Stage 2; (Release 15).
(Continued)

*Primary Examiner* — Marcus Smith
(74) *Attorney, Agent, or Firm* — Philip R. Smith; Kavon Nasabzadeh; Jacob L. Mangan

(57) ABSTRACT

A wireless device receives configuration parameters from a base station. The configuration parameters are for a first session and a second session. The second session is for a packet duplication of the first session. The wireless device receives an activation indication of the packet duplication. Based on the activation indication of the packet duplication, the wireless device sends packets of the first session to a user plane function and a duplication of the packets to the user plane function via the second session.

20 Claims, 51 Drawing Sheets

(51) Int. Cl.

| | |
|---|---|
| H04W 80/10 | (2009.01) |
| H04W 76/12 | (2018.01) |
| H04W 76/15 | (2018.01) |
| H04W 80/02 | (2009.01) |
| H04W 60/06 | (2009.01) |
| H04W 8/08 | (2009.01) |

(52) U.S. Cl.
CPC ........... *H04W 76/15* (2018.02); *H04W 76/27* (2018.02); *H04W 80/02* (2013.01); *H04W 80/10* (2013.01)

(56) References Cited

U.S. PATENT DOCUMENTS

| | | | |
|---|---|---|---|
| 2019/0174576 | A1 | 6/2019 | Palat et al. |
| 2019/0335379 | A1* | 10/2019 | Joseph ................... H04L 1/189 |
| 2020/0007281 | A1* | 1/2020 | Kilinc ..................... H04L 5/001 |
| 2020/0112879 | A1* | 4/2020 | Shimoda .................. H04L 1/16 |
| 2020/0322860 | A1* | 10/2020 | Yan ....................... H04W 80/02 |

OTHER PUBLICATIONS

3GPP TS 23.502 V15.2.0 (Jun. 2018); 3rd Generation Partnership Project; Technical Specification Group Services and System Aspects; Procedures for the 5G System; Stage 2; (Release 15).

3GPP TR 23.725 V0.3.0 (Jul. 2018); 3rd Generation Partnership Project; Technical Specification Group Services and System Aspects; Study on enhancement of Ultra-Reliable Low-Latency Communication (URLLC) support in the 5G Core network (5GC) (Release 16).

3GPP TS 29.281 V15.3.0 (Jun. 2018); 3rd Generation Partnership Project; Technical Specification Group Core Network and Terminals; General Packet Radio System (GPRS) Tunnelling Protocol User Plane (GTPv1-U) (Release 15).

3GPP TS 36.331 V15.2.2 (Jun. 2018); 3rd Generation Partnership Project; Technical Specification Group Radio Access Network; Evolved Universal Terrestrial Radio Access (E-UTRA); Radio Resource Control (RRC); Protocol specification (Release 15).

3GPP TS 37.324 V15.0.0 (Jun. 2018); 3rd Generation Partnership Project; Technical Specification Group Radio Access Network; E-UTRA and NR; Service Data Adaptation Protocol (SDAP) specification (Release 15).

3GPP TS 37.340 V15.2.0 (Jun. 2018); 3rd Generation Partnership Project; Technical Specification Group Radio Access Network; Evolved Universal Terrestrial Radio Access (E-UTRA) and NR; Multi-connectivity; Stage 2 (Release 15).

3GPP TS 38.323 V15.2.0 (Jun. 2018); 3rd Generation Partnership Project; Technical Specification Group Radio Access Network; NR; Packet Data Convergence Protocol (PDCP) specification (Release 15).

3GPP TS 38.331 V15.2.1 (Jun. 2018); 3rd Generation Partnership Project; Technical Specification Group Radio Access Network; NR; Radio Resource Control (RRC) protocol specification (Release 15).

3GPP TS 38.401 V15.2.0 (Jun. 2018); 3rd Generation Partnership Project; Technical Specification Group Radio Access Network; NG-RAN; A3rchitecture description (Release 15).

3GPP TS 38.413 V15.0.0 (Jun. 2018); 3rd Generation Partnership Project; Technical Specification Group Radio Access Network; NG-RAN; NG Application Protocol (NGAP) (Release 15).

3GPP TS 38.423 V15.0.0 (Jun. 2018); 3rd Generation Partnership Project; Technical Specification Group Radio Access Network; NG-RAN; Xn application protocol (XnAP) (Release 15).

3GPP TS 38.425 V15.2.0 (Jun. 2018); 3rd Generation Partnership Project; Technical Specification Group Radio Access Network; NG-RAN; NR user plane protocol (Release 15).

3GPP TS 38.473 V15.2.1 (Jul. 2018); 3rd Generation Partnership Project; Technical Specification Group Radio Access Network; NG-RAN; F1 application protocol (F1AP) (Release 15).

3GPP TR 38.804 V14.0.0 (Mar. 2017); 3rd Generation Partnership Project; Technical Specification Group Radio Access Network; Study on New Radio Access Technology; Radio Interface Protocol Aspects (Release 14).

Internet Engineering Task Force (IETF); M. BagnuloRequest for Comments: 6181 UC3MCategory: Informational; Mar. 2011ISSN: 2070-1721; Threat Analysis for TCP Extensions for Multipath Operation with Multiple Addresses.

Internet Engineering Task Force (IETF); A. FordRequest for Comments: 6182; Roke Manor Research Category: Informational; C. RaiciuISSN: 2070-1721; M. Handley; University College London; S. Barre Universite catholique de Louvain; J. Iyengar; Franklin and Marshall College Mar. 2011; Architectural Guidelines for Multipath TCP Development.

Internet Engineering Task Force (IETF); C. RaiciuRequest for Comments: 6356; Univ. Politehnica of BucharestCategory: Experimental; M. HandlyISSN: 2070-1721; D. Wischik; Univ. College London Oct. 2011; Coupled Congestion Control for Multipath Transport Protocols.

Internet Engineering Task Force (IETF); A. FordRequest for Comments: 6824; CiscoCategory: Experimental C. RaiciuISSN: 2070-1721; U. Politechnica of Bucharest; M. Handley; U. College London O. Bonaventure; U. catholique de Louvain; Jan. 2013; TCP Extensions for Multipath Operation with Multiple Addresses.

Internet Engineering Task Force (IETF); M. ScharfRequest for Comments: 6897; Alcatel-Lucent Bell LabsCategory: Informational; A. FordISSN: 2070-1721; Cisco; Mar. 2013; Multipath TCP (MPTCP) Application Interface Considerations.

Internet Engineering Task Force (IETF); M. BagnuloRequest for Comments: 7430 UC3MCategory: Informational; C. PaaschISSN: 2070-1721; UCLouvain F. Gont; SI6 Networks / UTN-FRH; O. Bonaventure; UCLouvain; C. Raiciu; UPB; Jul. 2015; Analysis of Residual Threats and Possible Fixes for Multipath TCP (MPTCP).

Internet Engineering Task Force (IETF); O. BonaventureRequest for Comments: 8041 UCLouvainCategory: Informational; C. PaaschISSN: 2070-1721; Apple, Inc. G. Detal; Tessares; Jan. 2017; Use Cases and Operational Experience with Multipath TCP.

3GPP TSG-SA WG2 Meeting #128 S2-186419; Vilnius, Lithuania Jul. 2-6, 2018 (revision of 18xxxx); Source: Ericsson; Title: An overview of the IETF DetNet activity; Document for: Approval; Agenda Item: 6.20; Work Item / Release: FS_5G_URLLC / Rel-16.

3GPP TSG-SA WG2 Meeting #128 S2-186420; Vilnius, Lithuania Jul. 2-6, 2018 (revision of 18xxxx); Source: Ericsson; Title: Anchor change for Ethernet PDU Sessions; Document for: Approval; Agenda Item: 6.20; Work Item / Release: FS_5G_URLLC / Rel-16.

3GPP TSG-SA WG2 Meeting #128 S2-186421; Vilnius, Lithuania Jul. 2-6, 2018 (revision of 18xxxx); Source: Ericsson; Title: Updates to Solution #1 on Redundant user plane paths based on dual connectivity Document for: Approval; Agenda Item: 6.20; Work Item / Release: FS_5G_URLLC / Rel-16.

3GPP TSG-SA WG2 Meeting #128 S2-186422; Vilnius, Lithuania Jul. 2-6, 2018 (revision of 18xxxx); Source: Ericsson; Title: Updates to solution #2 on Multiple UEs per device for user plane redundancy; Document for: Approval; Agenda Item: 6.20; Work Item / Release: FS_5G_URLLC / Rel-16.

SA WG2 Meeting #128 S2-186431; Jul. 2-6, 2018, Vilnius, Lithuania (was S2-18xxxx); Source: Qualcomm Incorporated; Title: Support for VLAN ID learning to enable IEEE 802.1CB (Frame Replication and Elimination for Reliability) combined with IEEE 802.1Q; Document for: Discussion/Approval; Agenda Item: 6.20; Work Item / Release: FS_5G_URLLC.

3GPP TSG-SA WG2 Meeting #128 S2-186482; Vilnius, Lithuania, Jul. 2-Jul. 6, 2018 (revision of S2-185181); Source: Huawei, HiSilicon; Title: Solution for KI#3: AF Response to UP Path Management Event Notifications Document for: Approval; Agenda Item: 6.20; Work Item / Release: FS_5G_URLLC / Rel-16.

SA WG2 Meeting #128 S2-186483; Jul. 2-Jul. 6, 2018, Vilnius, Lithuania (revision of S2-18xxxx) ; Source: Huawei, HiSilicon ; Title: Update of solution#3 and solution#4; Document for: Approval; Agenda Item: 6.20; Work Item / Release: FS_URLLC.

SA WG2 Meeting #128 S2-186484; Jul. 2-Jul. 6, 2018, Vilnius, Lithuania (revision of S2-18xxxx) ; Source: Huawei, HiSilicon ;

(56) References Cited

OTHER PUBLICATIONS

Title: Update of solution#5; Document for: Approval; Agenda Item: 6.20; Work Item / Release: FS_URLLC.
SA WG2 Meeting #128 S2-186516; Jul. 2-6, 2018, Vilnius, Lithuania ; Source: OPPO; Title: Updating for solution#5 in FS_URLLC; Document for: Approval; Agenda Item: 6.20; Work Item / Release: FS_URLLC / Rel-16.
SA WG2 Meeting #128 S2-186525; Vilnius, Lithuania , Jul. 2-6, 2018 (was S2-18xxxx); Source: Sony; Title: Solution for Key Issue 5; Document for: Discussion/Approval; Agenda Item: 6.20; Work Item / Release: FS_5G_URLLC.
SA WG2 Meeting #128 S2-186721; Jul. 2-6, 2018, Vilnius, Lithuania ; Source: Samsung; Title: Solution for establishing N3 and N9 tunnels for redundant transmission; Document for: Approval; Agenda Item: 6.20; Work Item / Release: FS_5G_URLLC / Rel-16.
SA WG2 Meeting #128 S2-186722; Jul. 2-6, 2018, Vilnius, Lithuania ; Source: Samsung; Title: Update the solution #4; Document for: Approval; Agenda Item: 6.20; Work Item / Release: FS_5G_URLLC / Rel-16.
SA WG2 Meeting #128 S2-186802; Jul. 2-6, 2018, Vilnius, LT (revision of S2-18xxxx); Source: Nokia, Nokia Shanghai Bell; Title: Solution for 5G URLLC in 5G System; Document for: Approval; Agenda Item: 6.20; Work Item / Release: FS_5G_URLLC/Rel-16.
SA WG2 Meeting #128 S2-186926; Jul. 2-6, 2018, Vilnius, Lithuania (revision of S2-18xxxx); Source: Lenovo, Motorola Mobility; Title: Solution for KI 1#: Redundant Transmission in core network for URLLC service ; Document for: Approval; Agenda Item: 6.20; Work Item / Release: FS_5G_URLLC /Rel-16.

* cited by examiner

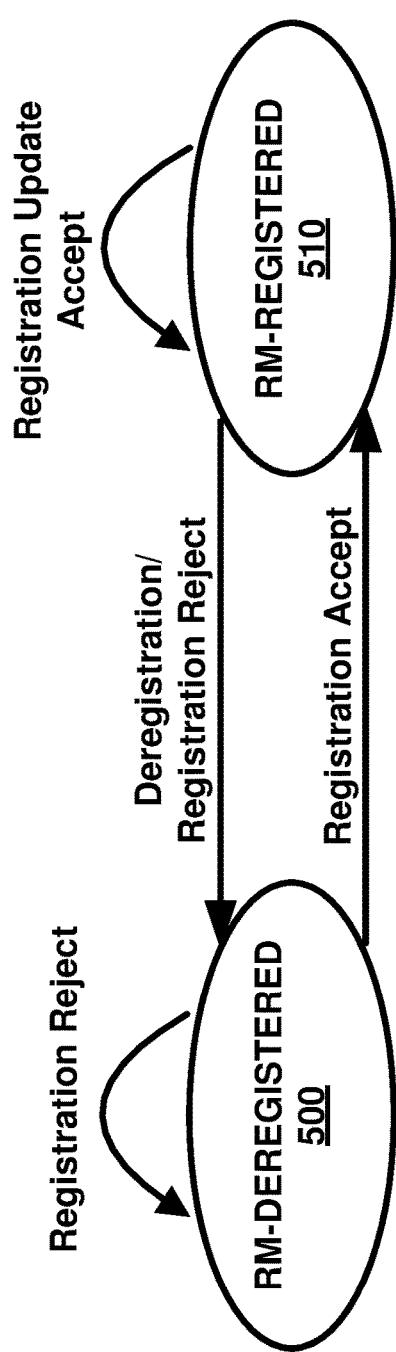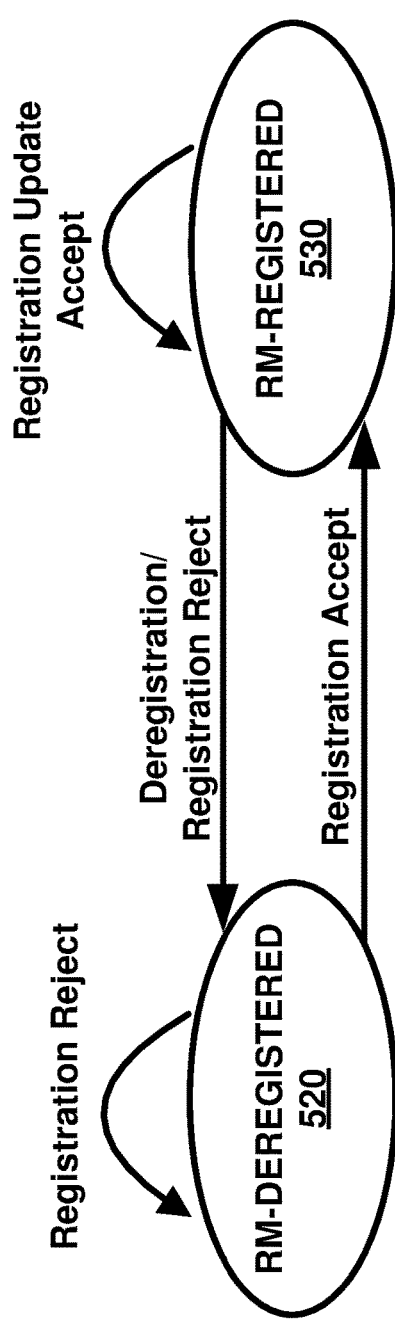

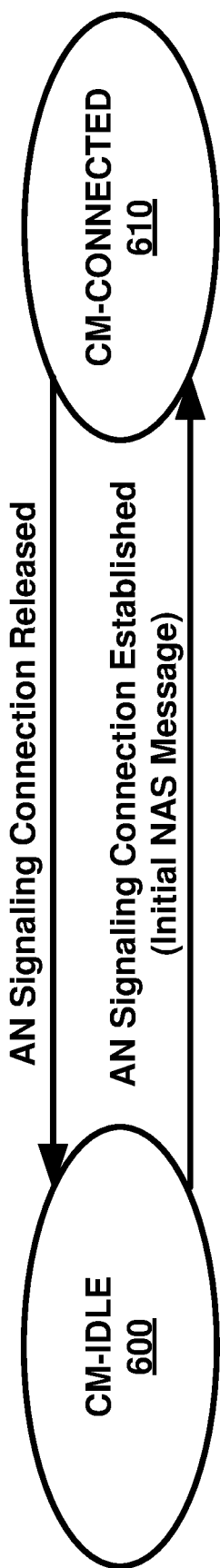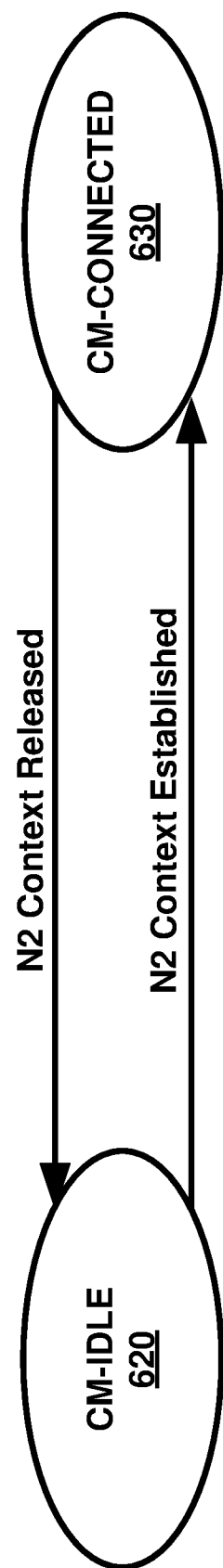

SESSION PACKET DUPLICATION CONTROL

CROSS-REFERENCE TO RELATED APPLICATIONS

This application claims the benefit of U.S. Provisional Application No. 62/730,206, filed Sep. 12, 2018, and U.S. Provisional Application No. 62/733,843, filed Sep. 20, 2018, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
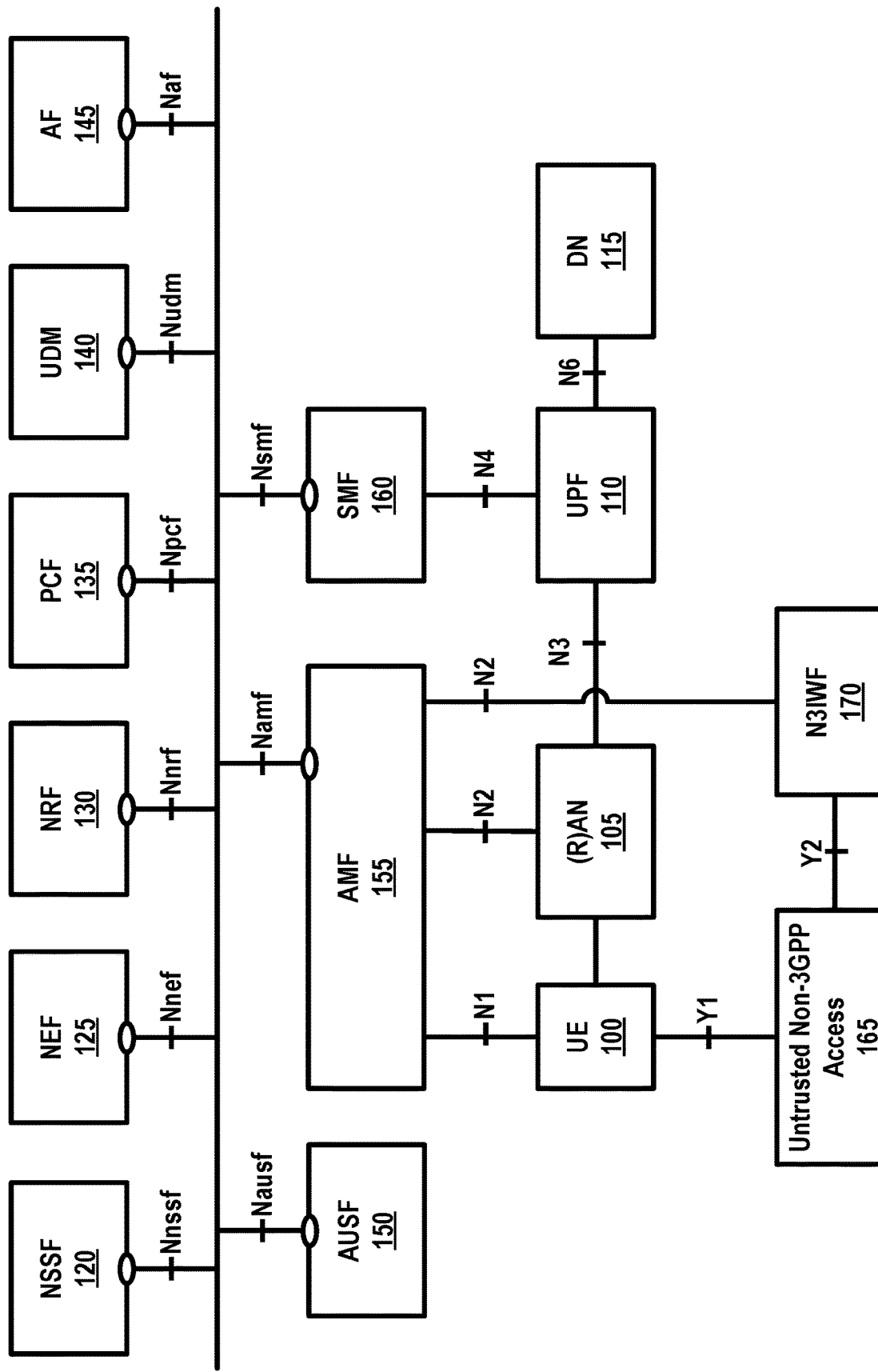
FIG. 1 is a diagram of an example 5G system architecture as per an aspect of an embodiment of the present disclosure.
Figure 2:
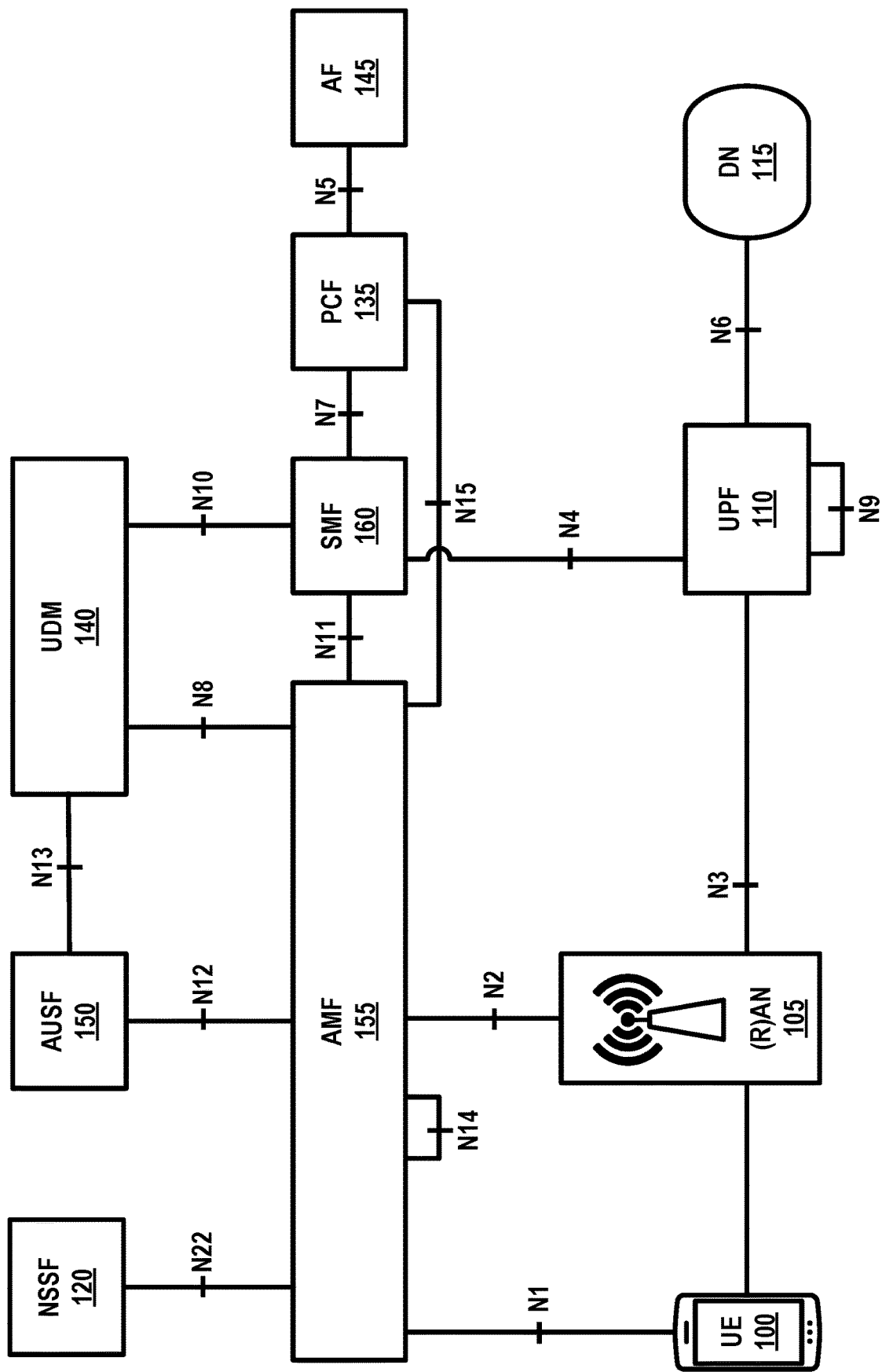
FIG. 2 is a diagram of an example 5G System architecture as per an aspect of an embodiment of the present disclosure.

The following acronyms are used throughout the present disclosure:
5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GPSI Generic Public Subscription Identifier
GTP GPRS Tunneling Protocol
GUTI Globally Unique Temporary Identifier
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
RAN Radio Access Network
QFI QoS Flow Identity
RM Registration Management
S1-AP Application Protocol
SBA Service Based Architecture
SEA Security Anchor Function
SCM Security Context Management
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
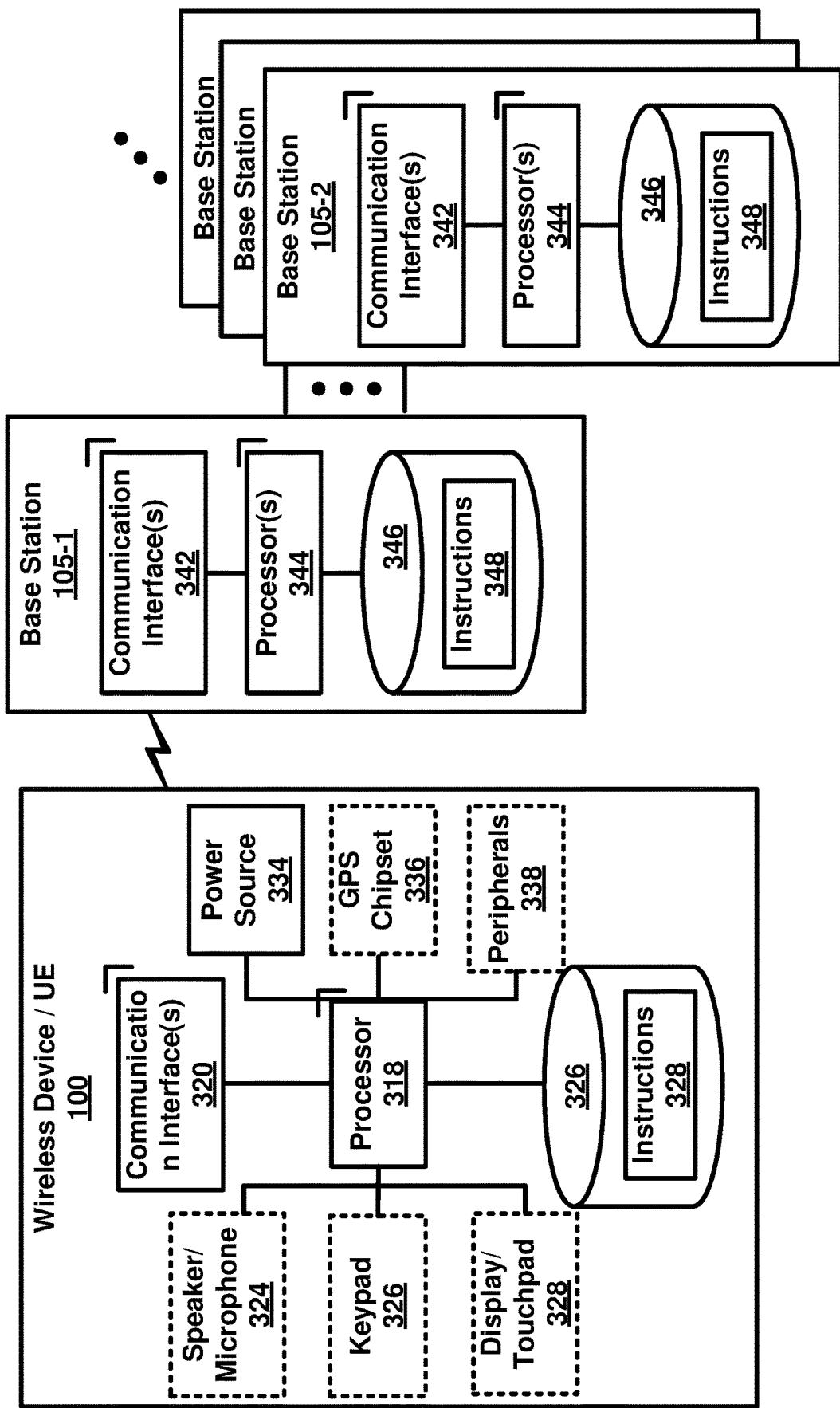
FIG. 3 is a system diagram of an example wireless device and a network node in a 5G system as per an aspect of an embodiment of the present disclosure.
Figure 4:
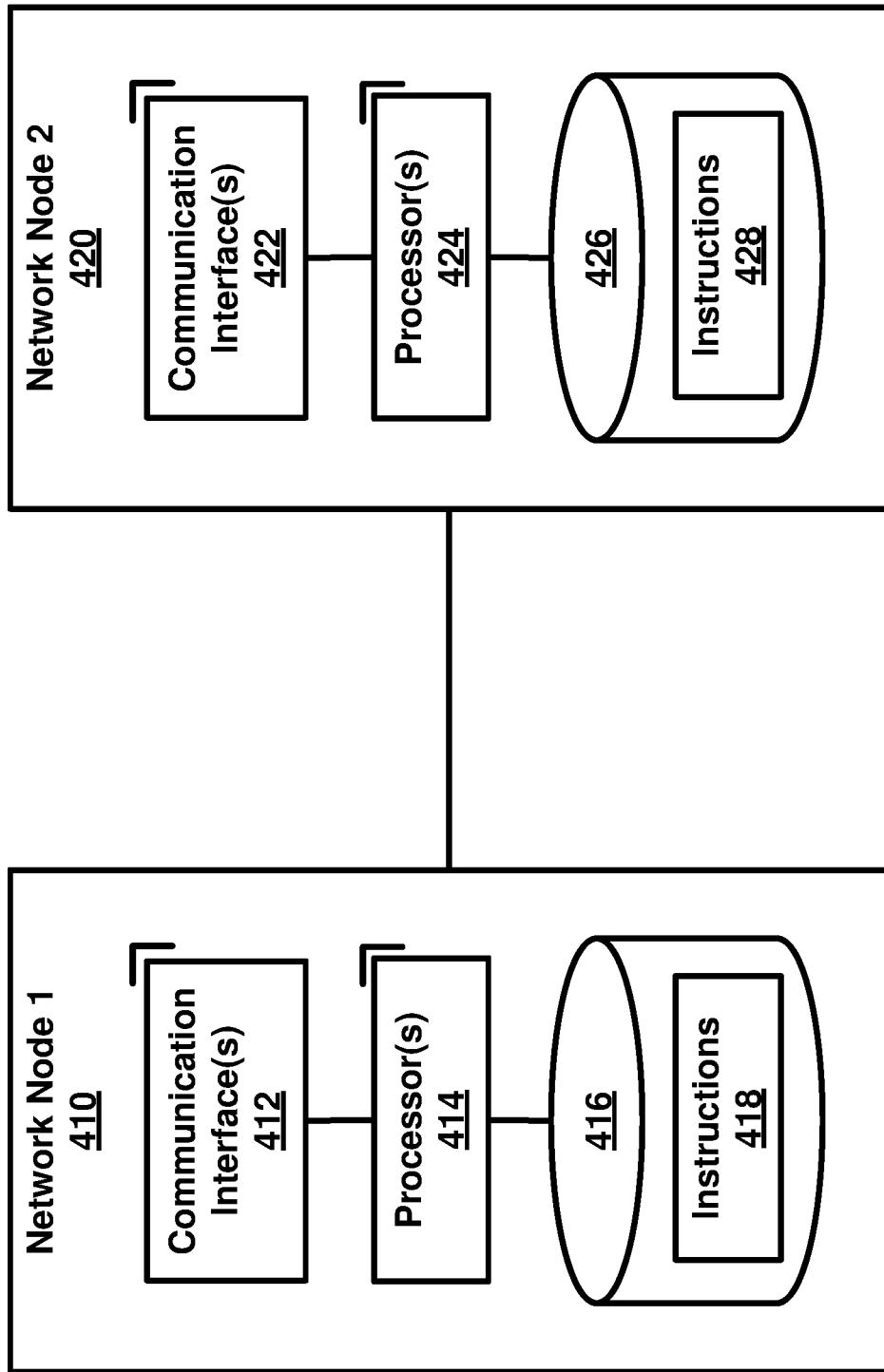
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
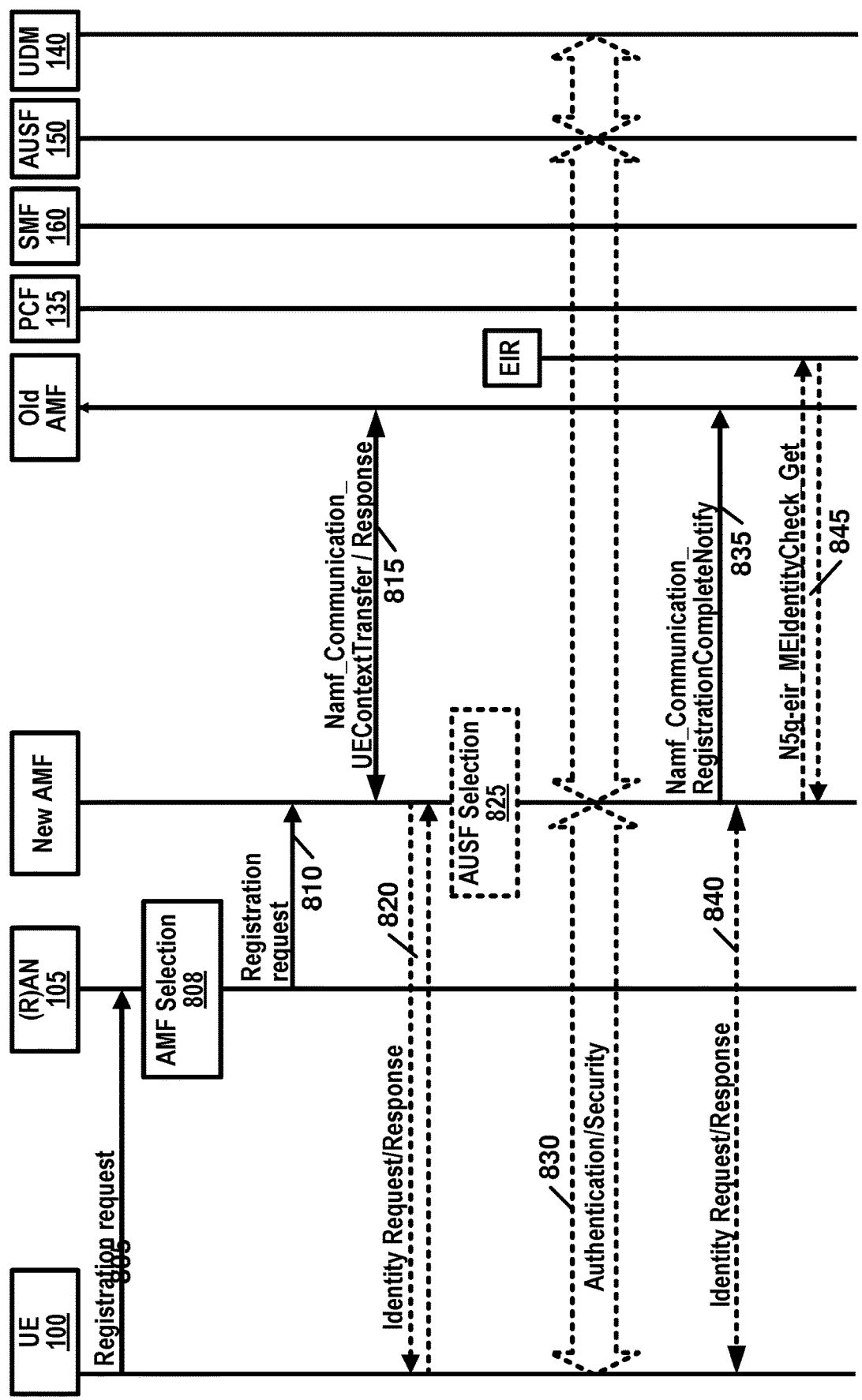
FIG. 8 is an example call flow as per an aspect of an embodiment of the present disclosure.
Figure 9:
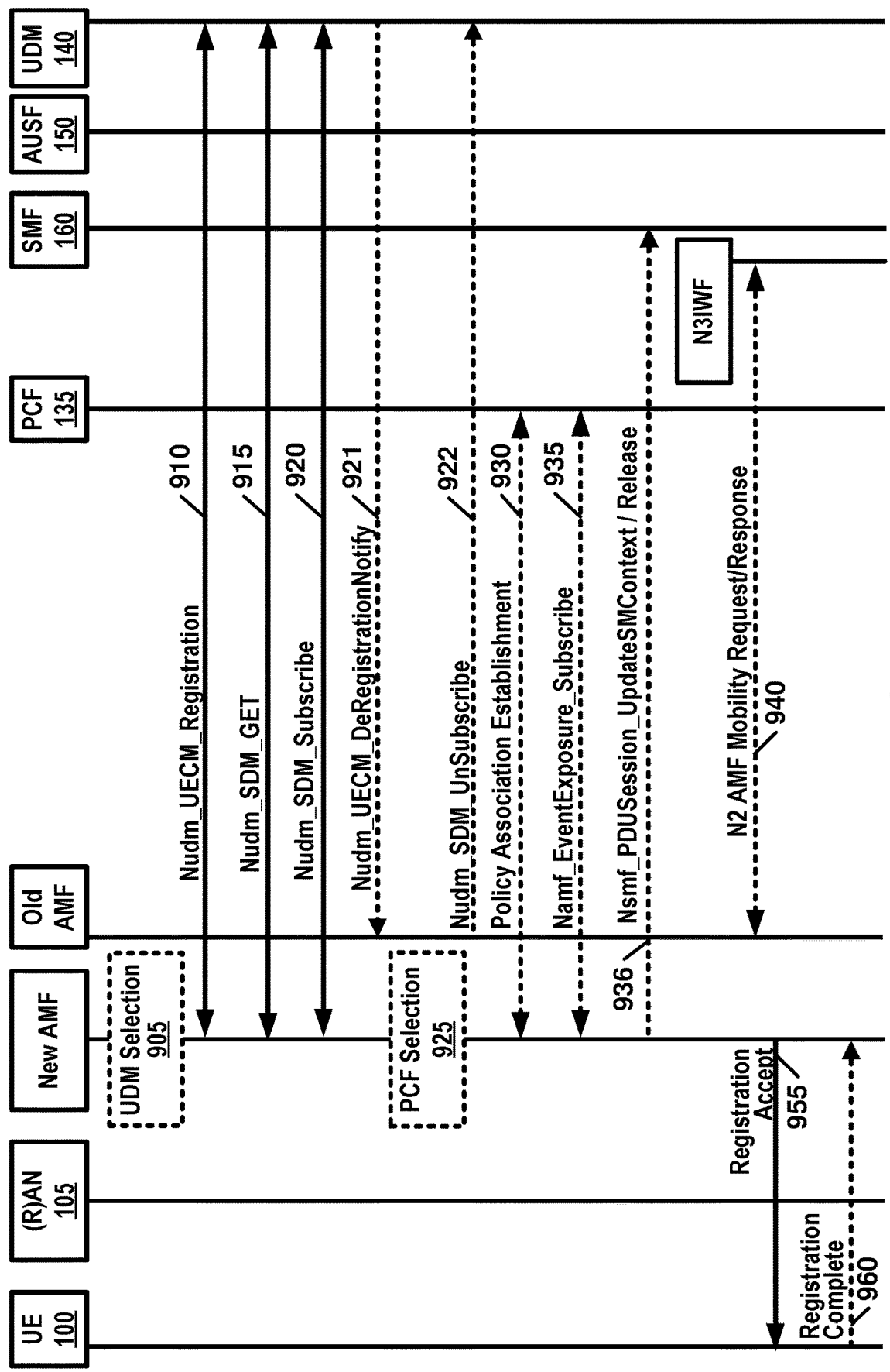
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
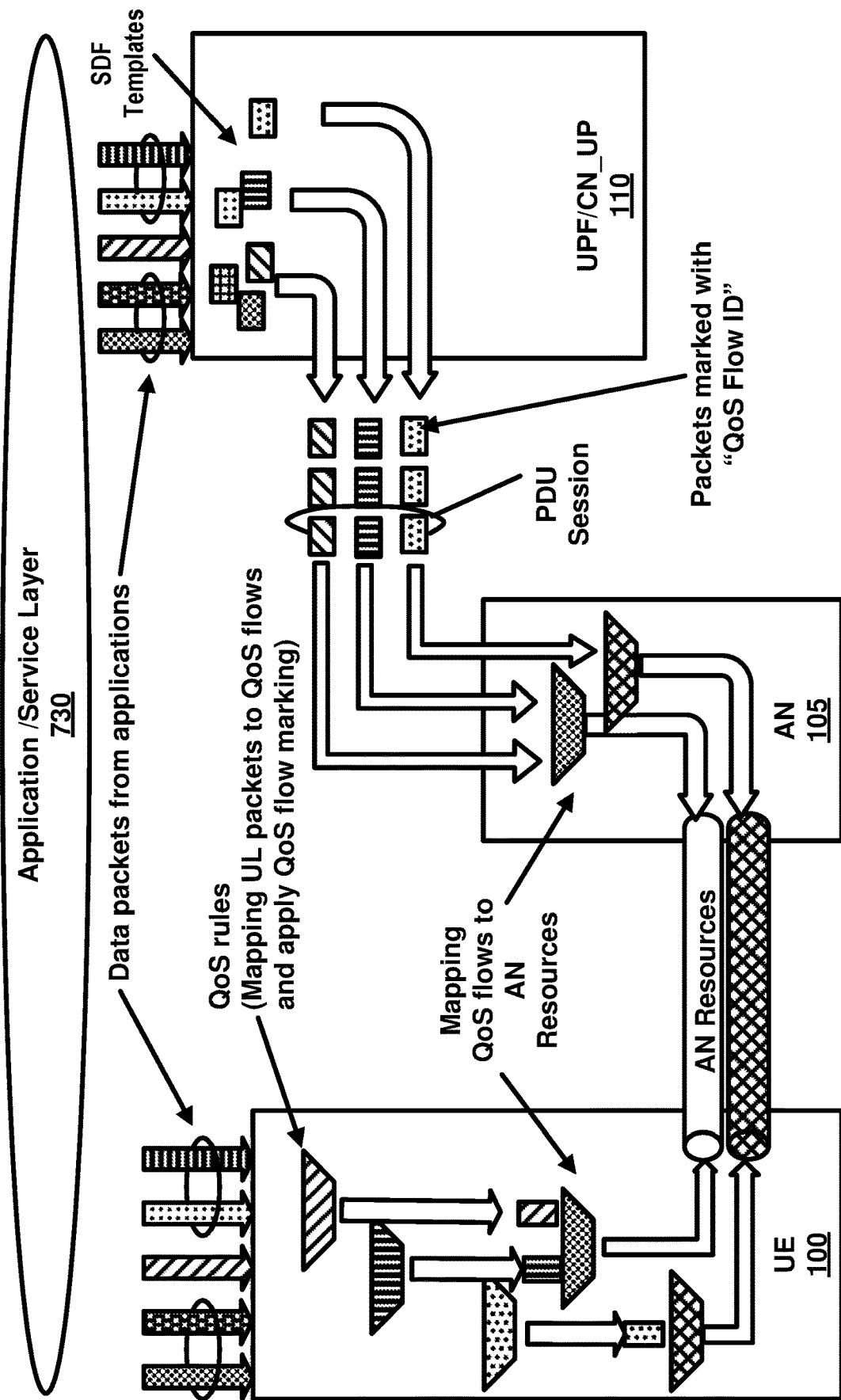
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160 (s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
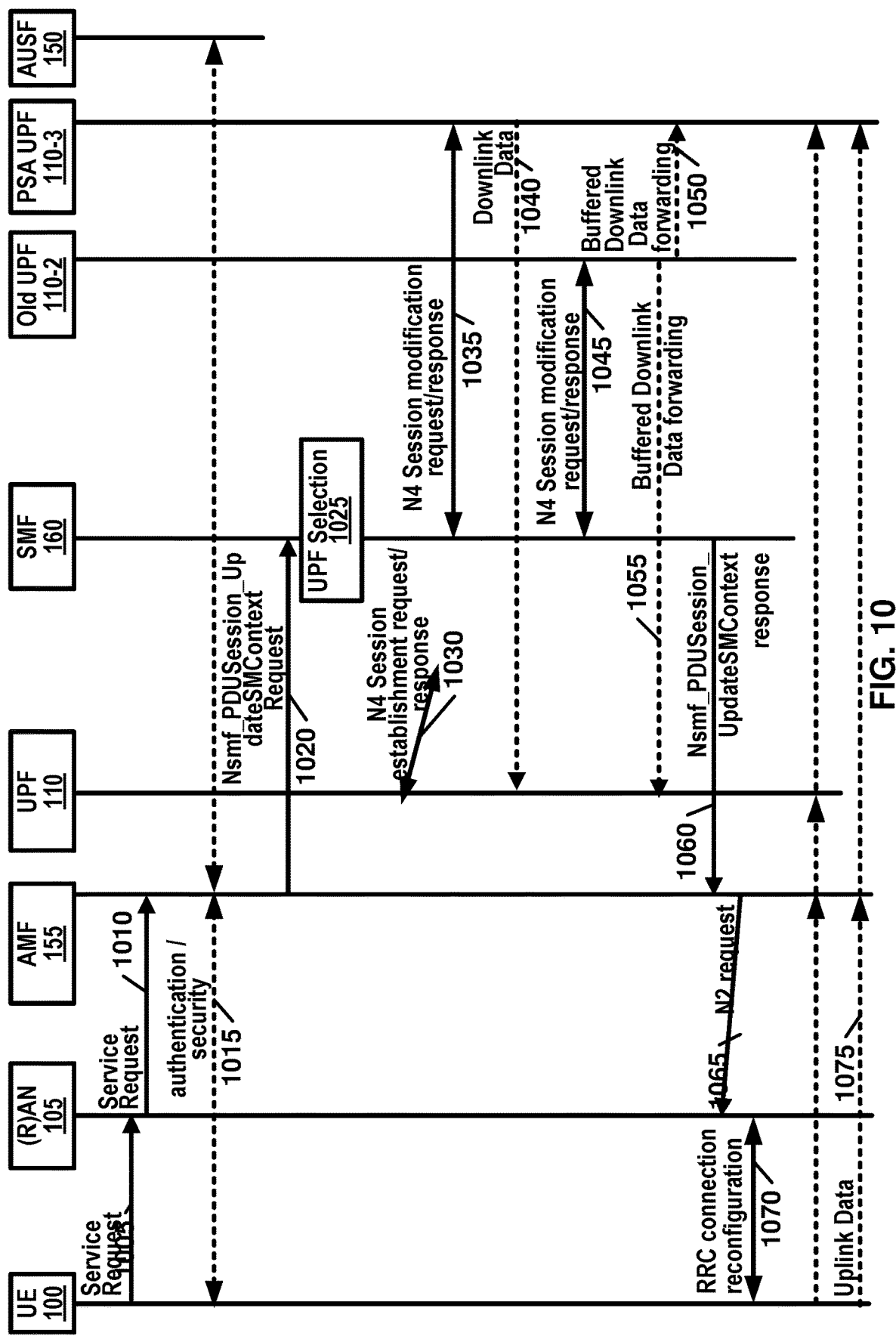
FIG. 10 is an example call flow as per an aspect of an embodiment of the present disclosure.
Figure 11:
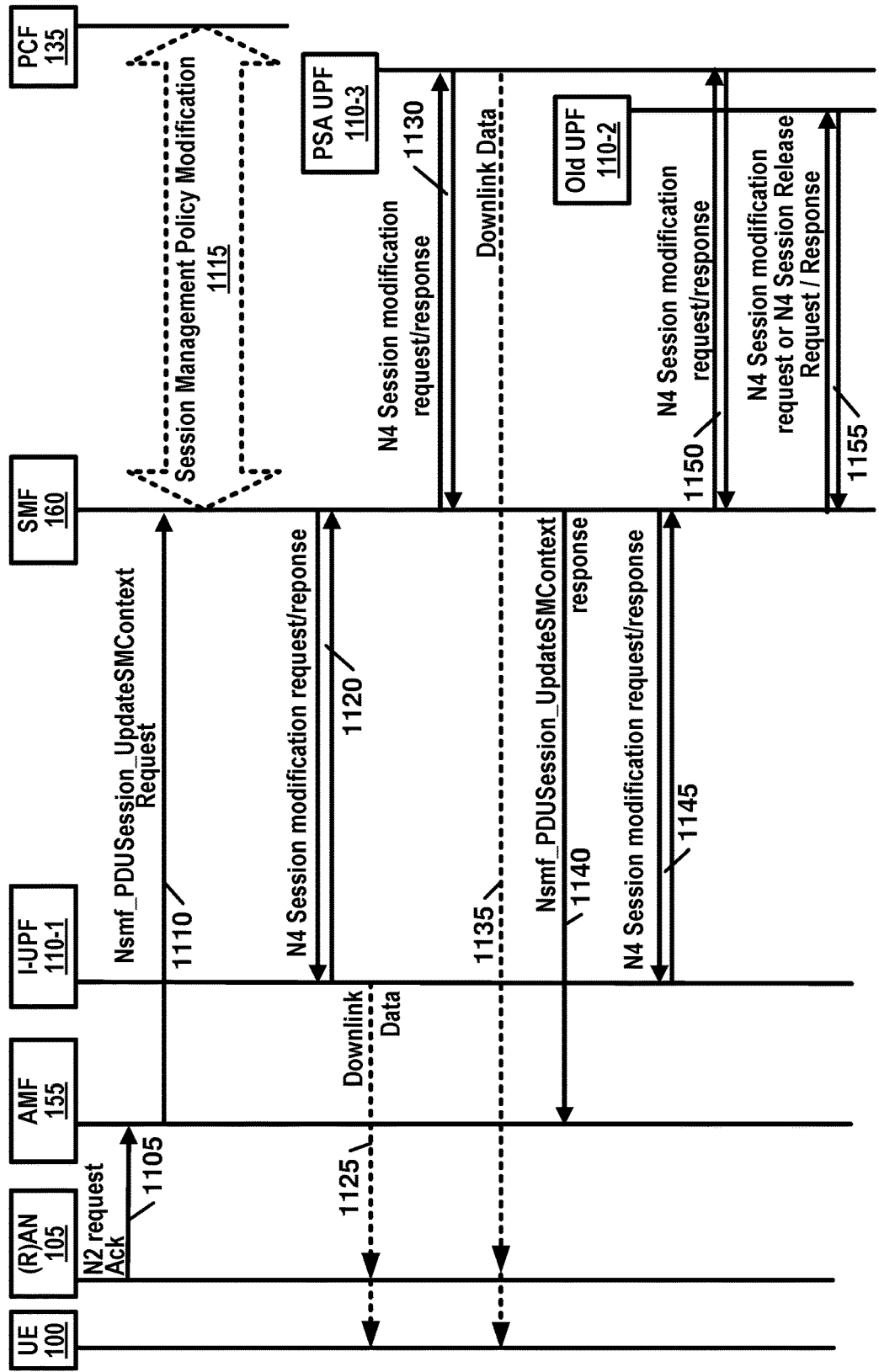
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession-_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
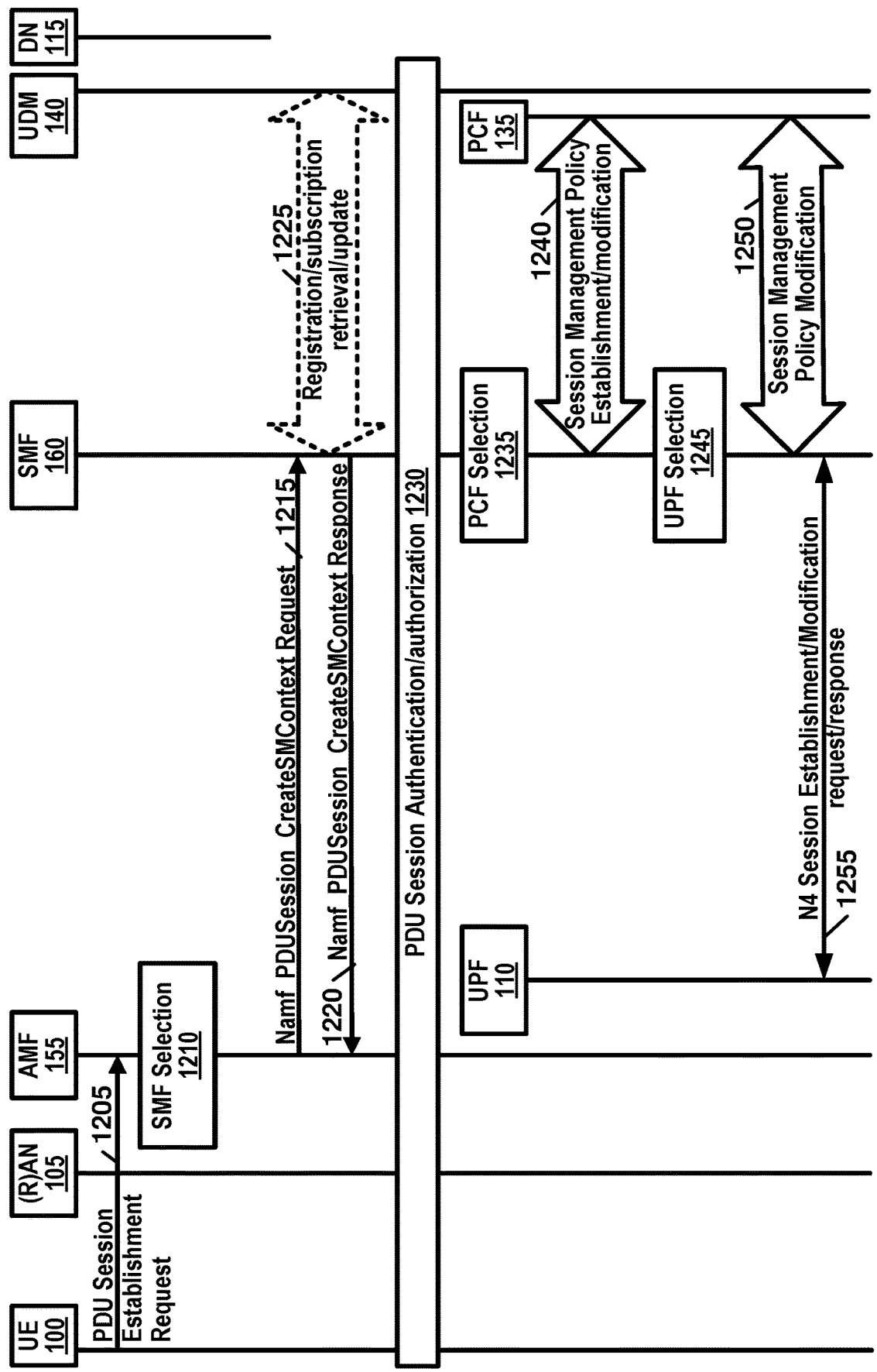
FIG. 12 is an example call flow as per an aspect of an embodiment of the present disclosure.
Figure 13:
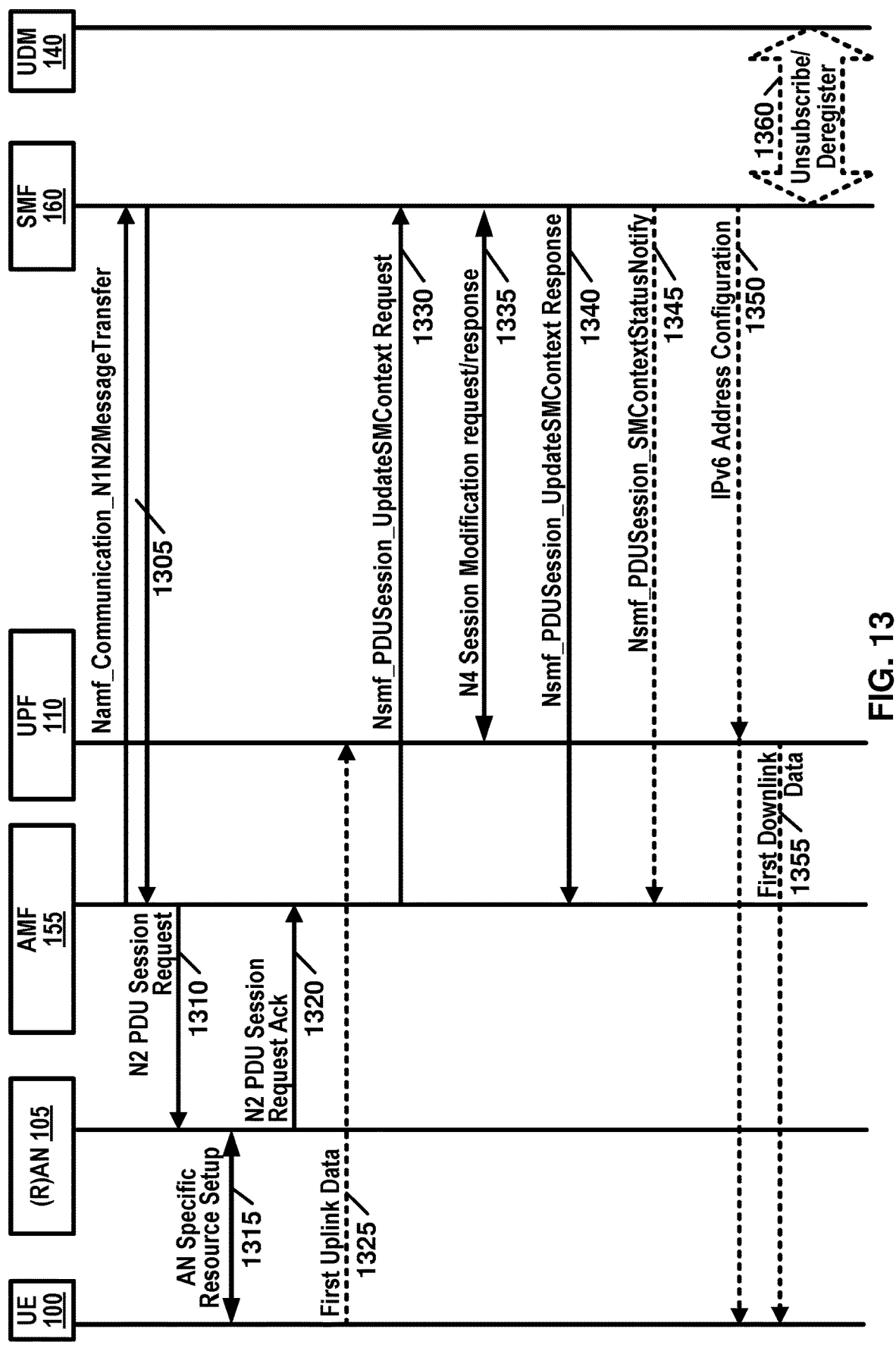
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the ongoing PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))).

In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_

Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_ SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NS-SAI). In an example, if the PDU session may not be established, the SMF 160 may deregister 1360 for the given PDU session using Nudm_UECM_Deregistration (SUPI, DNN, PDU session ID).

High reliability may hardly be achieved by single path on user plane. A redundant transmission for services requiring low latency and high reliability may be essential. Depending on the condition of network deployment, e.g. which network function or network segments cannot meet the requirements of reliability, the redundant transmission may be applied on the user plane path between the UE and the network.

Existing technologies may require low latency, low jitter and high reliability in existing or next generation wireless system (4G, 5G, fifth generation, NR, LTE, EPC, next generation core, and/or the like). Existing solutions offered in 3GPP technical report 23.725 provides procedures for establishing, modifying or releasing multiple tunnels for redundant packet transmission on N3 interface for communication between an access node and user plane function and N9 interface for communication between user plane functions.

Existing solutions focus on the transmission of duplicated packets. In an example, session duplication (and/or packet duplication) may be necessary or inefficient depending on network congestion status, network link reliability status, and/or radio link conditions. Configuring or releasing a duplicate session of an original session may require signaling messages among a wireless device, access nodes (gNBs, eNBs), and/or core network nodes (e.g. AMF, SMF, UPF, UDM, PCF, and/or the like). In an existing technology, configuration or release of session duplication in response to dynamically changing network status and radio conditions may increase signaling overhead among network nodes and/or may increase adaptation delay to current network status (e.g. enabling/disabling delay for session (packet) duplication). An existing technology may decrease packet transmission reliability and service quality of wireless devices. Instead of configuring or releasing packet (session) duplication setup, an implementation of example embodiments provides dynamic activation and/or deactivation mechanisms of a configured duplication of the packets (e.g. sessions), based on network status and radio conditions. An implementation of example embodiments provides how duplication activation/deactivation is achieved at the wireless device and at the entity in the core network. An implementation of example embodiments may decrease signaling overhead and/or decrease configuration latency for session duplication configuration/release by activating/deactivating configured packet duplication depending on network status and/or radio condition changes. An implementation of example embodiments may increase packet transmission reliability and service quality of wireless devices.

An example embodiment may provide solution for duplication of a session in the wireless device and mechanism to dynamically activate and deactivate duplication of the packets of the session. An example embodiment may provide mechanism to configure a core network when the activation is triggered by the access node. Various transmission mechanisms may be used to handle original and duplicated packets of the session between the entities handling packet duplication and duplication elimination using same or separate paths. In an example, separate paths may be disjoint paths.

There may be multiple options for achieving redundancy depending on which path is exposed to possibility of a frequent failure. In an example, there may be a mechanism to ensure duplication over an air interface between a wireless device and one or more access nodes (base stations). An activation of duplication procedure or mechanism may provide duplicating packets of an original session in to copy of one or more sessions (second session) and transmitting packets of the first session and the second session over one or more user plane paths involving N3 interface, N9 interface and/or the like. An example embodiment may provide mechanism for duplication of a PDU session (first session) for uplink packets of the application at the wireless device and duplication elimination of the received downlink packets received from a wireless core network at the wireless device. This example embodiment may provide mechanism for duplication of the first session for downlink packets received from a data network and duplication elimination of the received uplink packets from the wireless device at a packet data unit session anchor (PSA) user plane function (UPF). A determination of the activation of duplication of the original PDU session may be done by a first access node serving the first session. A mechanism to ensure transmission of duplicated packets between these two entities (wireless device and PSA UPF) may include the activation of duplication and/or an establishment of multiple tunnels between the first access node and the PSA UPF.

In an example, a wireless device may set up one or more redundant PDU sessions (e.g., two redundant PDU sessions) over the 5G network, so that the network may attempt to make the paths of the two redundant PDU sessions independent whenever that is possible. In an example, upper layer protocols, such as the IEEE TSN (Time Sensitive Networking) FRER (Frame Replication and Elimination for Reliability), to manage the replication and elimination of redundant packets/frames over the duplicate paths which may span both the 3GPP segments and possibly fixed network segments as well. Other upper layer protocols, including IP based ones such as a DetNet based solution may also be employed for redundant packet transmission over multiple paths or for managing a backup path in addition to the active path.

Figure 30:
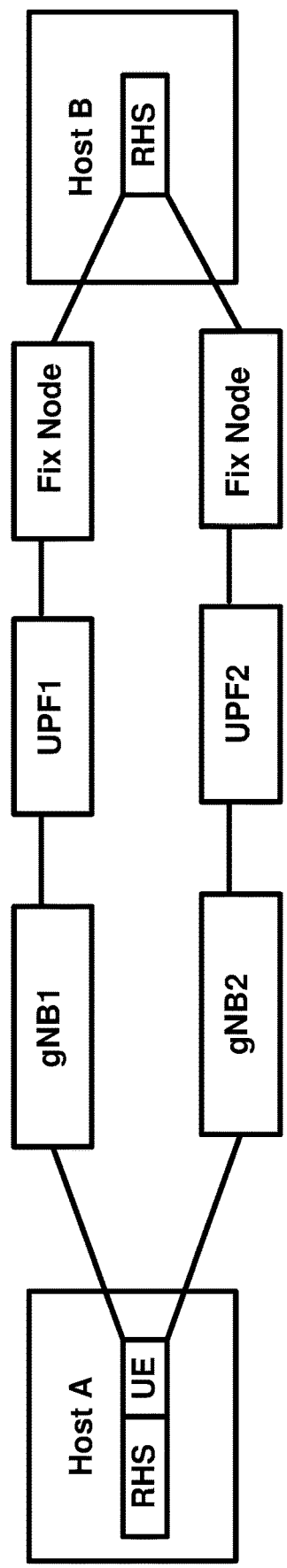
FIG. 30 illustrates an example for a redundant user plane paths based on dual connectivity.

In an example as illustrated in FIG. 30, a wireless network may provide two paths from the device: the first (packet data unit) PDU session spans from the UE via a first access node to a first UPF (UPF1) acting as the PSA UPF, and a second PDU session spans from the UE via the second access node to UPF2 acting as the PSA UPF. Based on these two independent PDU sessions, two independent paths are set up, which may span even beyond the 3GPP network. There are two paths set up between Host A in the device and Host B, with one or more intermediate nodes. The redundancy handling function (RHF) entities that may reside in Host A and Host B make use of the independent paths. The IEEE TSN FRER may be an example for an RHF. For Host A within the device, the two PDU sessions appear as different networking interfaces, making the host multi-homed. In an example, other solutions may be employed, where redundancy spans up to an intermediate node.

This example may be based on the dual connectivity feature that is supported both by LTE and NR. A single UE may have user plane connectivity with both the first access node (MgNB or first access node) and the second access node (SgNB or second access node). The radio access network (RAN) control plane and N1 may be handled via the MgNB. The MgNB may control the selection of SgNB and the setup of the dual connectivity feature via the Xn interface. The UE may set up (e.g., configure or establish) two PDU sessions, one via MgNB to UPF1 acting as a first PSA UPF, and another one via SgNB to UPF2 acting as a second PSA UPF. UPF1 and a second UPF (UPF2) may connect to the same Data Network (DN), even though the traffic via UPF1 and UPF2 might be routed via different user plane nodes within the DN. UPF1 and UPF2 are controlled by SMF1 and SMF2, respectively, where SMF1 and SMF2 may coincide depending on operator configuration of the SMF selection.

This example may differ from the RAN based Packet Data Convergence Protocol (PDCP) packet duplication function which may be internal to RAN, and the packet duplication takes place between the UE and the MgNB. The redundant paths may span the whole system including RAN and core network.

Two options may be provided for the selection of the UPFs and the gNBs. In an example, a static approach for UPF selection that may take place before the SgNB may be selected in RAN; this may be applicable to IP based PDU sessions, Ethernet based PDU sessions, non-IP based PDU sessions, unstructured PDU sessions, and/or the like. In an example, a dynamic approach for UPF selection, which enhances the Static approach which may take into considerations the SgNB selected in RAN. This may be applicable to Ethernet PDU sessions.

The solution may comprise one or more SMFs. In an example embodiment, two SMFs may be employed. In an example, a single SMF may be employed. If two SMFs are employed, the SMFs may be aware that the sessions are redundant (e.g., one or more, or two distinct/disjoint sessions). In case of multiple SMFs are used, the SMFs may be configured to have different UPF pool for avoiding reuse of same UPF by different SMFs.

SMF(s) may be aware of redundant sessions using, e.g. UE providing indication regarding redundant PDU session and proper provisioning during UPF selection.

In an example, a wireless device may set up multiple redundant PDU sessions (e.g., request establishment/configuration) over the 5G network, so that the network may establish/configure separate, independent, and/or disjoint paths for the multiple redundant PDU sessions. It may be possible to rely on upper layer protocols, such as the IEEE TSN (Time Sensitive Networking), to manage the replication and elimination of redundant packets/frames over the multiple paths which may span both the 3GPP segments and possibly fixed network segments. Other upper layer protocols, including IP based ones such as a DetNet based solution may be possible for redundant packet transmission over multiple paths or for managing a backup path in addition to the active path.

Figure 31:
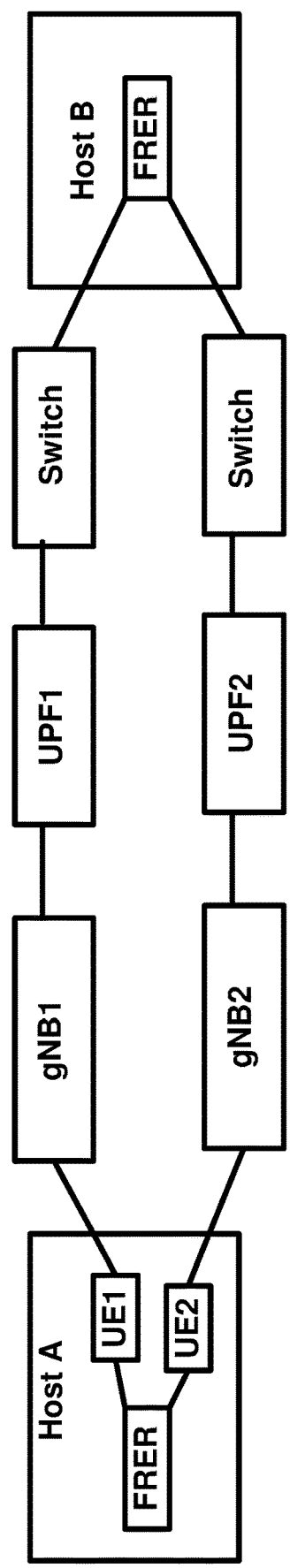
FIG. 31 illustrates an example for a multiple UEs used per device for a user plane redundancy.

In an example as illustrated in FIG. 31, when the terminal device may be equipped with two UEs. The first PDU session may span from a first wireless device (UE1) via gNB1 to UPF1, while the second PDU session may span from a second wireless device (UE2) via gNB2 to UPF2. Based on these two independent PDU sessions, two independent paths are set up, which may span even beyond the 3GPP network. In an example, there may be two paths set up between Host A in the wireless device and Host B, with some (optional) fixed intermediate nodes. The redundancy handling function (RHF) entities (out of 3GPP scope) that reside in Host A and Host B make use of the independent paths. The IEEE TSN FRER may be an example for a RHF. For Host A within the device, the two UEs may provide different networking interfaces, making the host redundantly connected. In an example, other solutions are also possible, where redundancy spans only up to an intermediate node and not to the end host.

In an example, an integration of multiple UEs into a device may be used and may assume a RAN deployment where redundant coverage by multiple gNBs may be available. Multiple PDU sessions may be set up from the UEs, which use independent RAN (gNB) and CN (UPF) entities. As illustrated in FIG. 31, UE1 and UE2 may be connected to gNB1 and gNB2, respectively and UE1 sets up a PDU session via gNB1 to UPF1, and UE2 sets up a PDU session via gNB2 to UPF2. UPF1 and UPF2 connect to the same DN, even though the traffic via UPF1 and UPF2 might be routed via different user plane nodes within the DN. UPF1 and UPF2 may be controlled by SMF1 and SMF2, respectively.

For handling the reliability grouping of a UE, a new system parameter UE reliability group (UE RG) may be defined. This parameter may be configured explicitly to the UE and sent in a registration request message to the network, it may be a part of the subscription or it may be derived from other system parameters (e.g., SUPI, PEI, NSSAI, RFSP) based on operator configuration. The UE RG parameter of one or more UE may be sent from AMF to RAN when the RAN context is established, and maintained as part of the RAN context, so each gNB may acquire knowledge about the reliability group of the connected UEs.

The reliability group of the RAN (cells of gNBs) entities may be pre-configured by the O&M system in RAN. It may be possible for gNBs to learn the reliability group neighboring cells as the Xn connectivity between the gNBs may be set up.

For connected mode mobility, the serving gNB may down-prioritize candidate target cells that belong to different reliability group than the UE. The UE may hand over only to cells in the same reliability group. If cells in the same reliability group are not available (UE is out of the coverage of cells of its own reliability group or link quality is below a given threshold) the UE may be handed over to a cell in another reliability group.

In case the UE connects to a cell in the wrong reliability group, the gNB may initiate a handover to a cell in the appropriate reliability group whenever such a suitable cell is available.

If redundant RAN coverage is available at a certain location, then UEs that belong to the same terminal device may connect to different gNBs based on the reliability group classification using the connected mode mobility.

In an example, redundant transmission may be used over different physical transport paths in a core wireless network and RAN to enhance the reliability of upper layer service. Whether redundant transmission need to be activated for a QoS Flow may be decided by the SMF based on local policies for the DNN or S-NSSAI, or by the PCF based on its QoS requirement, UE's subscription and condition of network deployment.

Figure 20:
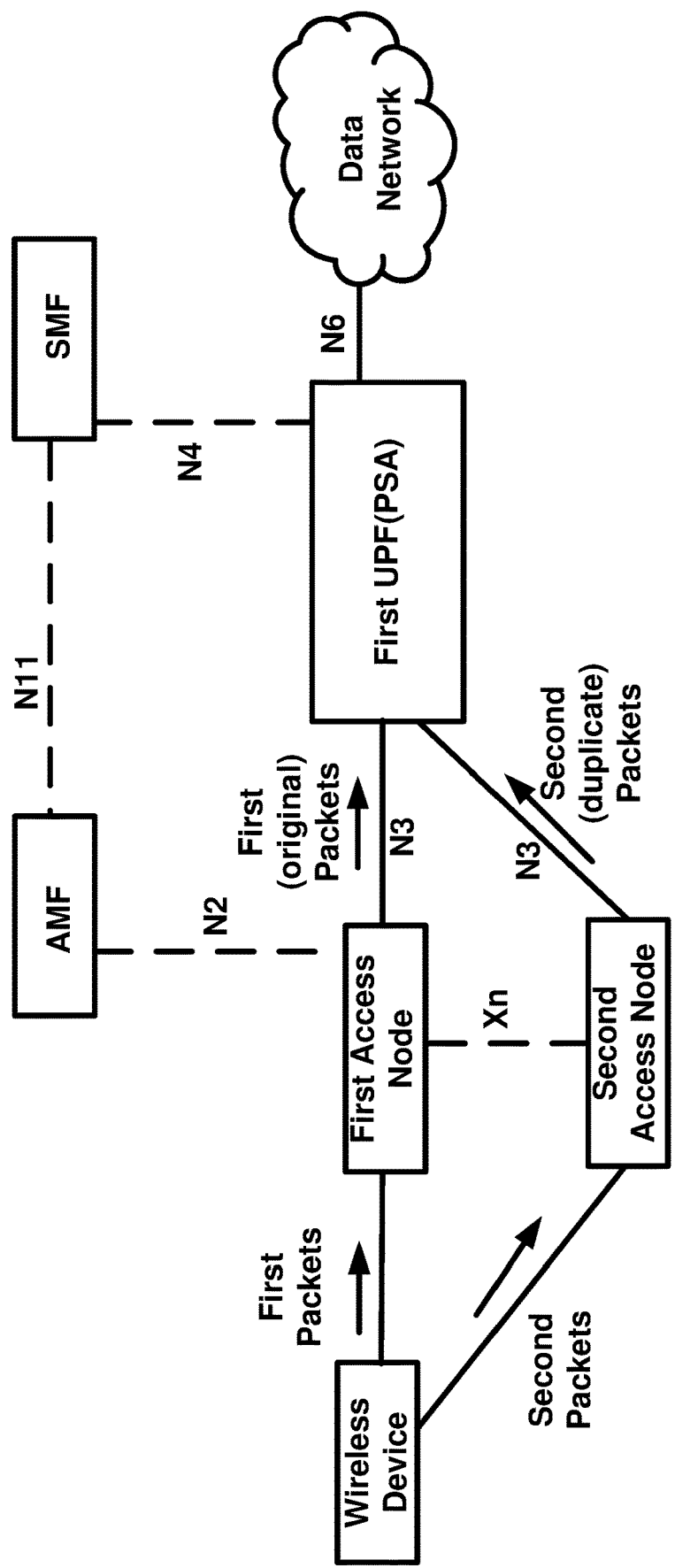
FIG. 20 illustrates an example of network configuration where the duplicated packets may be transmitted using dual connectivity mode of the wireless device via different paths of a same UPF as original packets as per an aspect of an embodiment of the present disclosure.

In an example illustrated in FIG. 20, it is assumed that the reliability of UPF and control plane functions may be high enough to fulfill the reliability requirement of URLLC services served by these network functions (NFs), and the UE may be under overlapping coverage of the two RAN nodes. A single RAN node may not provide enough reliability in air interface for the QoS flow, so the redundant packets may be transferred between UPF and UE via two independent N3 tunnel and two RAN nodes to enhance the reliability of service.

To ensure the two N3 tunnels can be transferred via disjointed transport layer paths, the M-RAN (Master RAN or the first access) node, SMF or UPF may provide different routing information in the tunnel information (e.g. different IP addresses or different Network Instances), and this routing information may be mapped to disjoint transport layer paths according to network deployment configuration.

The redundant transmission may be based on the dual connectivity architecture, except that same PDU is transferred via both M-RAN and S-RAN (Secondary RAN or the second access node) nodes. With two different NG-RAN nodes (first and second access nodes), separate transport layer paths are used for redundant data transmission in user plane. A high reliability protocol layer is implemented on the UE and UPF to support packet replication and elimination function.

Figure 18:
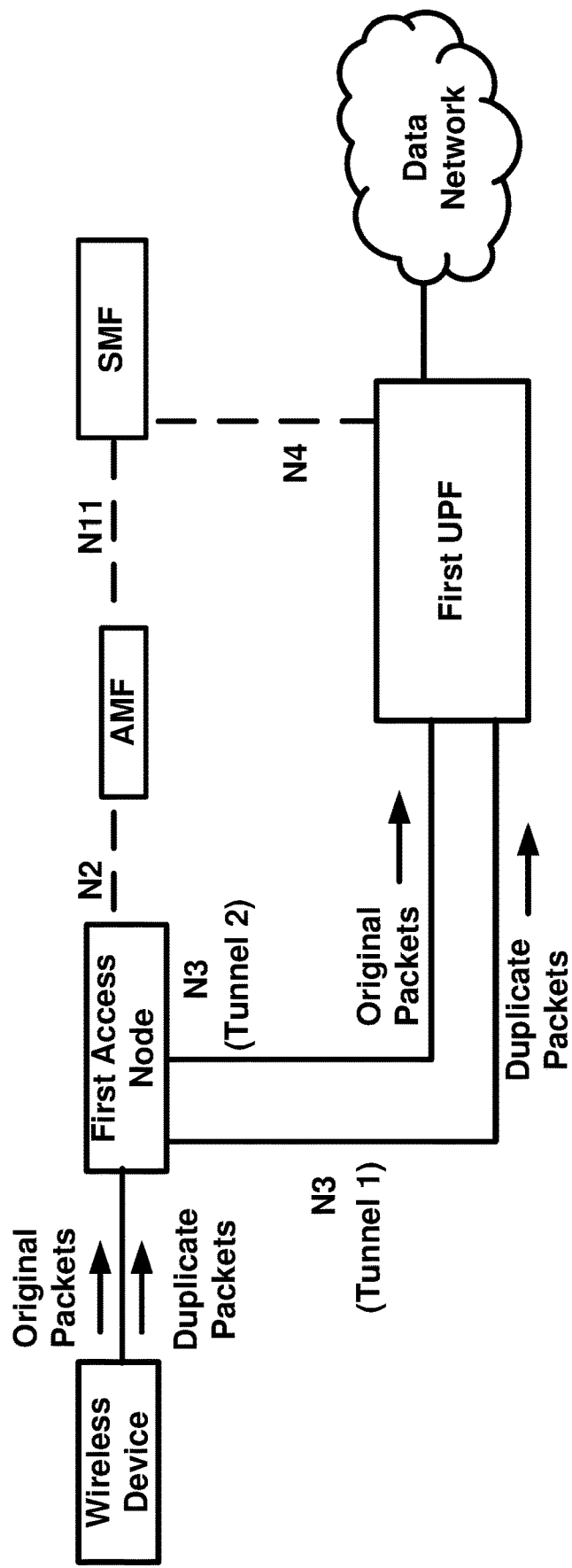
FIG. 18 illustrates an example of network configuration where the duplicated packets may be transmitted via different paths of a same UPF as original packets as per an aspect of an embodiment of the present disclosure.

In an example illustrated in FIG. 18, it is assumed that the reliability of NG-RAN node, UPF and control plane NFs may be high enough to fulfil the reliability requirement of ultra-reliable low latency services served by these NFs. The reliability of single N3 tunnel may not considered high enough, e.g. due to the deployment environment of backhaul network, so the redundant packets may be transferred between UPF and RAN via two independent N3 tunnels, which may be associated with a single PDU session, over different transport layer path to enhance the reliability of service.

To ensure the two N3 tunnels may be set via disjointed transport layer paths, the M-RAN node, SMF or UPF may provide different routing information in the tunnel information (e.g. different IP addresses or different Network Instances), and this routing information may be mapped to disjoint transport layer paths according to network deployment configuration.

In an example, the redundant transmission may be set based on two N3 tunnels between a gNB and the UPF. The RAN node and UPF may support the packet replication and elimination function.

Packet replication and elimination may be realized by modifying the GTP-U protocol. In case of downlink traffic, the UPF replicates the packet from the DN and assigns the same GTP-U sequence number to them for the redundant transmission. These packets are transmitted to the NG-RAN via the N3 Tunnel 1 and the N3 Tunnel 2 separately. For eliminating the duplicated packet, the NG-RAN may forward the packet received first from either tunnel to the UE and may drop the replicated packet which has the same GTP-U sequence number as the forwarded packet.

In case of uplink traffic, the NG-RAN may replicate the packet and may assign the same GTP-U sequence number to them and the UPF may eliminate the duplicated packet based on the GTP-U sequence number.

Figure 32:
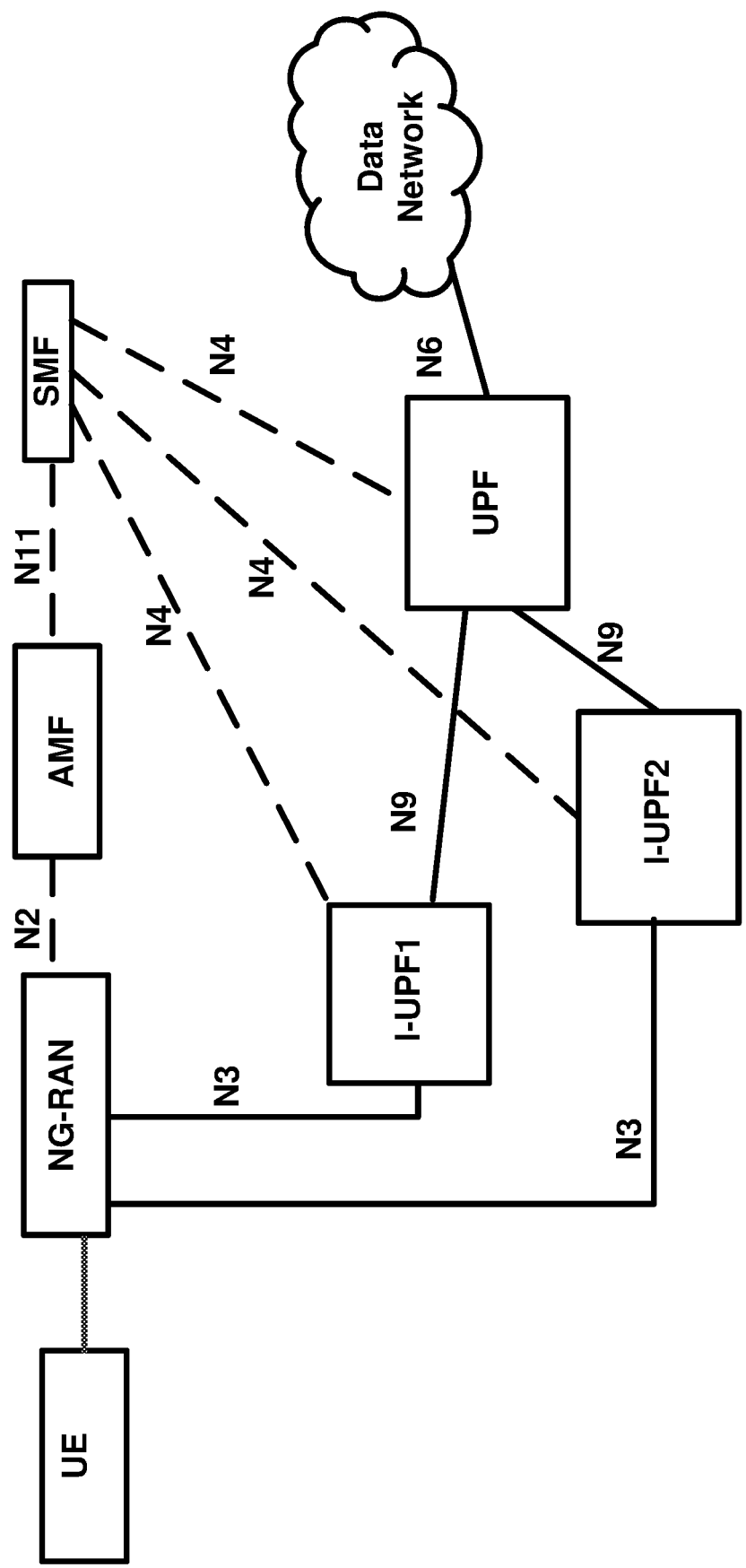
FIG. 32 illustrates an example for supporting redundant data transmission via single access node.

In an example illustrated in FIG. 32, two separate paths may be extended by inserting two Intermediate UPFs (I-UPFs) between the UPF acting as the PDU session Anchor and the NG-RAN to support the redundant transmission based on two N3 and N9 tunnels between a single NG-RAN mode and the UPF. The RAN node and UPF may support the packet replication and elimination function.

In an example illustrated in FIG. 32, there may be two N3 and N9 tunnels between NG-RAN and UPF for redundant transmission. The UPF interfacing the DN and may act as the traffic distributor for downlink traffic may duplicates the packet of the URLLC service from the DN and may assign the same GTP-U sequence number to them. These duplicated packets may be transmitted to I-UPF1 and I-UPF2 via N9 Tunnel 1 and N9 Tunnel 2 separately. Each I-UPF may forward the packet with the same GTP-U sequence number which may be received from the UPF to NG-RAN via N3 Tunnel 1 and N3 Tunnel 2 respectively. The NG-RAN may eliminate the duplicated packet based on the GTP-U sequence number. In case of UL traffic, the NG-RAN acting as the Traffic Distributer for UL traffic duplicates the packet of the URLLC service for the UE and the UPF may eliminate the duplicated packet.

An example solution may reduce latency and jitter caused by the data forwarding and/or data path switch in a core network due to handover. A user plane tunnel may be established and employed to transmit data if the DRB is established. This procedure may be referred to as enhanced handover.

The enhanced handover may be dynamically provisioned at the SMF from UDM or PCF during PDU session establishment procedure. The enhanced handover may be statically preconfigured in SMF. The SMF may retain the information (e.g., PDU session identifiers, type, and/or the like) essential for supporting enhanced handover for PDU sessions it may control.

When handover is triggered by source RAN node, the SMF may duplicate the tunnel for the PDU session which may be associated to enhanced handover. The SMF may send the downlink data to source RAN and target RAN node until the handover may be completed.

Figure 33:
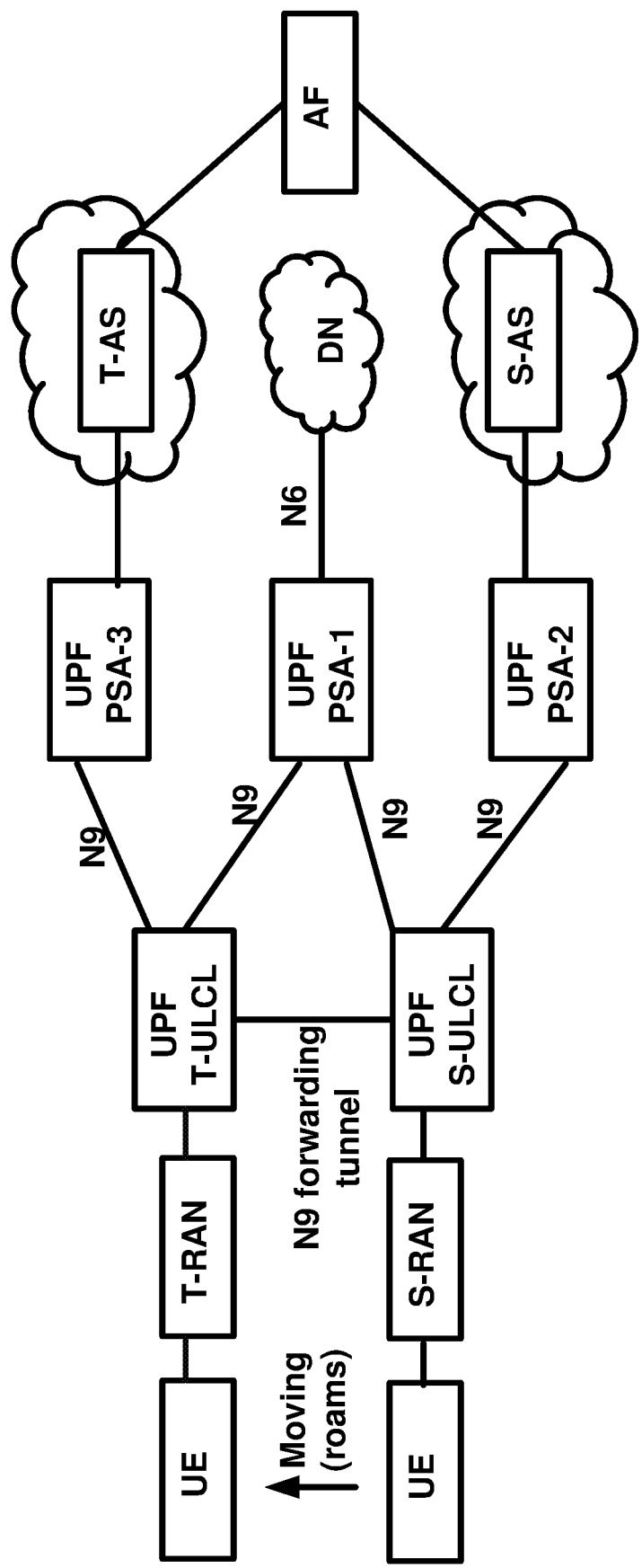
FIG. 33 illustrates an example for a use of forwarding tunnel between source and target UL CL during handover.

In an example depicted in FIG. 33, a UE may be connected to Source RAN (S-RAN) and has a PDU session established with a remote PDU session anchor (PSA1). The network may have inserted a source uplink classifier (S-ULCL) that directs selected traffic to a local PDU session anchor (PSA2). The traffic flows exchanged via PSA-2 may be terminated in a source application server (S-AS) which is a user plane entity (e.g. content distribution server) that may be controlled by an AF.

At some point UE may be handed over to the Target RAN (T-RAN). In an example, upon instantiation of the target uplink classifier (T-ULCL) a N9 forwarding tunnel may be created between the source uplink classifier (S-ULCL) and the T-ULCL.

The N9 forwarding tunnel may be maintained until all active traffic flowing on it ceases to exist for a configurable duration. T-ULCL may be configured with packet filters that may force uplink traffic from existing sessions (between UE and Source AS) on the path involving T-RAN-T-ULCL-S-ULCL-PSA2. The S-ULCL may be configured to forward all downlink traffic for this UE coming from S-AS into the N9 forwarding tunnel towards T-ULCL.

In an example, T-ULCL may be configured with packet filters that force any new DNS requests (relating to the local DN) to go to the new local DN (via PSA3).

In an example, T-ULCL may be configured with packet filters that force any traffic related to the Target Application Server (T-AS) in the new local DN (e.g. identified by a match between the destination IP address of uplink packets and the IP address of T-AS) to go to the new local DN (via PSA3).

In an example, T-ULCL may be configured with packet filters that may let any remaining traffic go to the remote PDU session Anchor (PSA1).

SMF may send a late notification to AF to inform it about the DNAI change (i.e. change of local PSA). Based on this notification the AF may trigger the S-AS to use upper layer (e.g. IP level or HTTP level) mechanisms to redirect the ongoing traffic sessions towards a server in the new local DN (i.e. towards Target AS).

In an example, a replicator may be defined that allows the wireless system to be aware (e.g. detect or have explicit information) that two or more "streams" of replicated packets belong together, and may guide the lower layers to ensure these packets get an optimized treatment in the 3GPP system depending on whether the streams are terminated in a single UE or by two different UEs that belong together within the same hub-solution (e.g. TSN hub with two or more redundant 5G modems). This is to specifically ensure that 3GPP features are used optimally to ensure that latency/availability/reliability requirements and expectations of external duplication methods are fulfilled (e.g. including hybrid access solutions, IEEE 802.1CB, and/or the like.). The replicator may be applicable to any external multi-path mechanism even if the multiple paths are not used in a redundancy fashion (i.e., duplicating each packet on all paths) but for partly or fully disjoint data transmission.

An entity/functionality in the 3GPP system, refer as replicator functionality, may be able to detect multiple related flows, and whether they are utilized for redundant packets, of incoming IP/Ethernet flows at the transmitter side. Control plane aspects necessary for the replicator functionality may reside in the SMF and the User plane aspects necessary for the replicator functionality may reside in the UPF.

The replicator may guide the lower layers to ensure their corresponding latency/availability/reliability requirements are fulfilled. The replicator may forward the received replicas to the lower layers, by adding a header or other type of indication that tells the lower-layers to treat the packets as uncorrelated as possible. In an example, the replicator may include manipulation of the incoming data, e.g. combining, excluding, or further replicating (among other operations) the incoming packets. For instance, create 3 packets based on the two incoming replicas and make sure they are scheduled correctly. It may only forward a single or a subset of the packets to the lower-layer but scaling appropriately the QoS constraint to be fulfilled by the lower layers.

To ensure the two N3 tunnels can be transferred via disjointed transport layer paths, the RAN node, SMF or UPF may provide different routing information in the tunnel information (e.g. different IP addresses or different Network Instances), and the routing information may be mapped to disjoint transport layer paths according to network deployment configuration.

At the receiver side, the receiver may translate and forward the internal streams to the corresponding external network(s). To make it transparent to the external network(s), further combine/remove/replicate operations may be applied. The replicator at the receiver may use the header information (or share explicit information with the replicator entity at the other end) to translate/re-build packets according to the external network(s) requirements. In an example, for redundant transmissions, all the duplicated packets may be forwarded to the receiver host to ensure correct performance of the protocol, even if only a single packet was transmitted over the radio network. In an example, for TSN applications, where the 5GS acts as a TSN ethernet bridge, the 5GS may need to forward a lower/equal/larger number of packets to the receiver host as specified in the 802.1CB standard.

Figure 34:
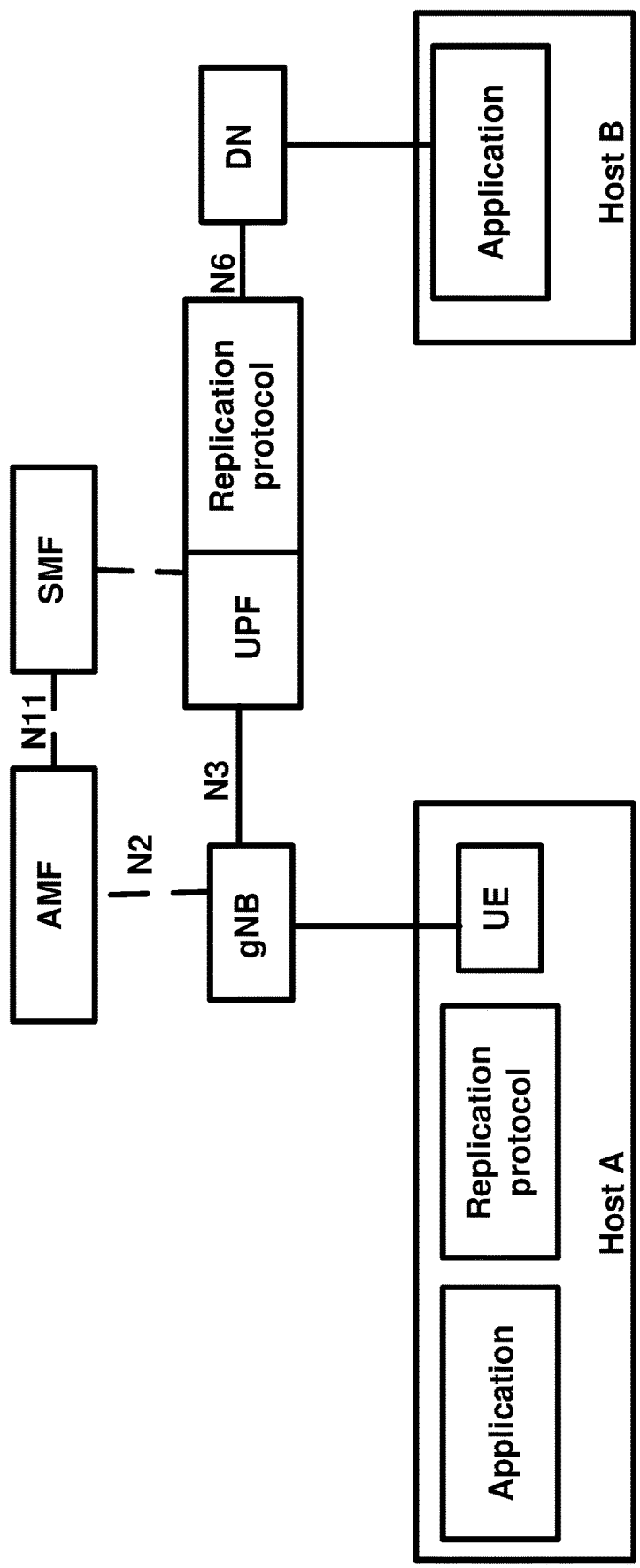
FIG. 34 illustrates an example for a replication framework.

An example FIG. 34 shows the user-plane system architecture. The replicator functionality may be a part of the UPF (or collocated with the UPF) for user plane functionality and SMF for control plane functionality. Multi-UE transceiver may be considered that encompasses various UEs with independent hardware and protocol stacks. Each gNB may consist of multiple distributed units (DU) attached to a central unit (CU).

In an example, the first access node may determine a need of having packet duplication of one or more sessions supported by the wireless device based on one or more criteria. In an example, the one or more criteria may comprise at least one CSI report received from the wireless device. In an example, the one or more criteria may comprise a measurement report (e.g. RRC layer message) received from the wireless device, one or more received signal (e.g. sounding reference signal (SRS)) from the wireless device, and/or the like.

In an example, the wireless device may send a channel state information (CSI) report to the first access node. The CSI may be referred as channel measurement information in an example embodiment. The CSI may constitute one or more parameters comprising a rank indicator (RI), a precoding matrix index (PMI), a channel quality indicator (CQI), and/or precoding type indicator (PTI). The wireless device may represent UE, wireless equipment, IAB-node, and/or like. The first access node and a second access node mentioned in an example embodiment may represent base station, gNB, gNodeB, eNB, eNodeB, RAN, NR, microcell, Integrated Access and Backhaul (IAB) donor, IAB-node, master base station, MgNB, MeNB, secondary base station, SgNB, SeNB, and/or like.

The wireless device may perform CQI, PMI, RI measurements and may report them to the first access node. The RI may include information on a channel rank and indicate the number of streams that may be received via the same time-frequency resource. Since RI may be determined by long-term fading of a channel, it may be generally fed back at a cycle longer than that of PMI or CQI. The PMI may represent a value reflecting a spatial characteristic of a channel and indicate a precoding matrix index of the first access node preferred by the wireless device based on a metric of signal to interference plus noise ratio (SINR). The CQI may represent information indicating strength of a channel and/or may indicate a reception SINR that may be obtainable when the first access node uses PMI. The CQI may represent the CSI for sub-band and/or wide-band. The UE (the wireless device) may measure the reference signal in downlink and/or may map it to the CQI indexes that may have multiple values.

According to transmission mode of the wireless device, one or more CQI, PMI, and/or RI may be transmitted. Periodic transmission of CSI may refer to as periodic reporting and transmission of CSI at the request of the first access node may refer to as aperiodic reporting.

In aperiodic reporting, the first access node may transmit a request bit included in uplink scheduling information to the wireless device. The wireless device may transmit CSI considering transmission mode thereof to the first access node, e.g. through a physical uplink shared channel (PUSCH). In periodic reporting, a period of CSI and/or an offset (e.g. timing offset) at the period may be signaled in a unit of subframes by a semi-static scheme through a higher-layer signal (e.g. an RRC message, a MAC CE, and/or a DCI) per wireless device. Precoding type (PTI) value in CSI report indicates type of CSI reporting provided by the wireless device.

In an example, the determination of the need of having packet duplication of the one or more sessions may be based on at least one of a quality of service (QoS) requirement of the one or more session, traffic load at the first access node and/or the second access node, service type of the session, a network operator policy, and/or the like.

In an example, the measurement report may comprise reference signal received power (RSRP) and/or reference signal received quality (RSRQ) of one or more cells of the first access node (and/or the second access node), RSRP and/or RSRQ of one or more beams (e.g. synchronization signal (SS)/PBCH beam, CSI-RS beam, and/or the like) of one or more cells of the first access node (and/or the second access node). In an example, if the RSRP and/or the RSRQ is equal to or lower than a threshold value (e.g. RSRP<$\alpha$ dB and/or RSRQ<$\beta$ dB), the first access node may determine the need of packet duplication of the one or more session.

In an example, if received power and/or received quality of one or more sounding reference signals (SRS) of the wireless device is equal to or lower than a threshold value (e.g. received power of SRS(s)<$\gamma$ dB and/or received quality of SRS(s)<$\delta$ dB) the first access node may determine the need of packet duplication of the one or more sessions.

In an example embodiment, terms of packet duplication, packet replication, packets copy, copy of packets may be used interchangeably. The terms may refer to one or more copies of packets of the first session. In an example, packet duplication may mean session duplication (e.g. duplication of packets may be interpreted as duplication of a session of the packets).

In an example, the wireless device may support packet duplication by duplicating packets at upper layer (e.g. application layer, PDU session control layer, QoS flow control layer) of SDAP sublayer. The SDAP sublayer may receive a duplicated session (e.g. duplicated packets) of an original session (e.g. original packets) and may map the duplicated session to one or more bearers (e.g. data radio bearer (DRB) and/or signaling radio bearer (SRB)). In an example, the wireless device may support packet duplication by duplicating packets at the service data adaptation protocol (SDAP) sublayer. The SDAP is responsible for QoS flow handling across an air interface of a wireless system. The SDAP may map a specific QoS flow within the first session to a corresponding data radio bearer (DRB) established with an appropriate level of QoS. The SDAP may mark the transmitted packets with the correct QoS flow identifier (QFI), ensuring that the packet receives the correct forwarding treatment as it traverses the wireless System. For a PDU session, a single protocol entity of SDAP may be configured when single (first) access node is serving the wireless device. A separate SDAP configuration on the wireless device may be essential when the wireless device may have dual connectivity having master cell group (MCG) bearer, split bearer or secondary cell group (SCG).

Figure 14:
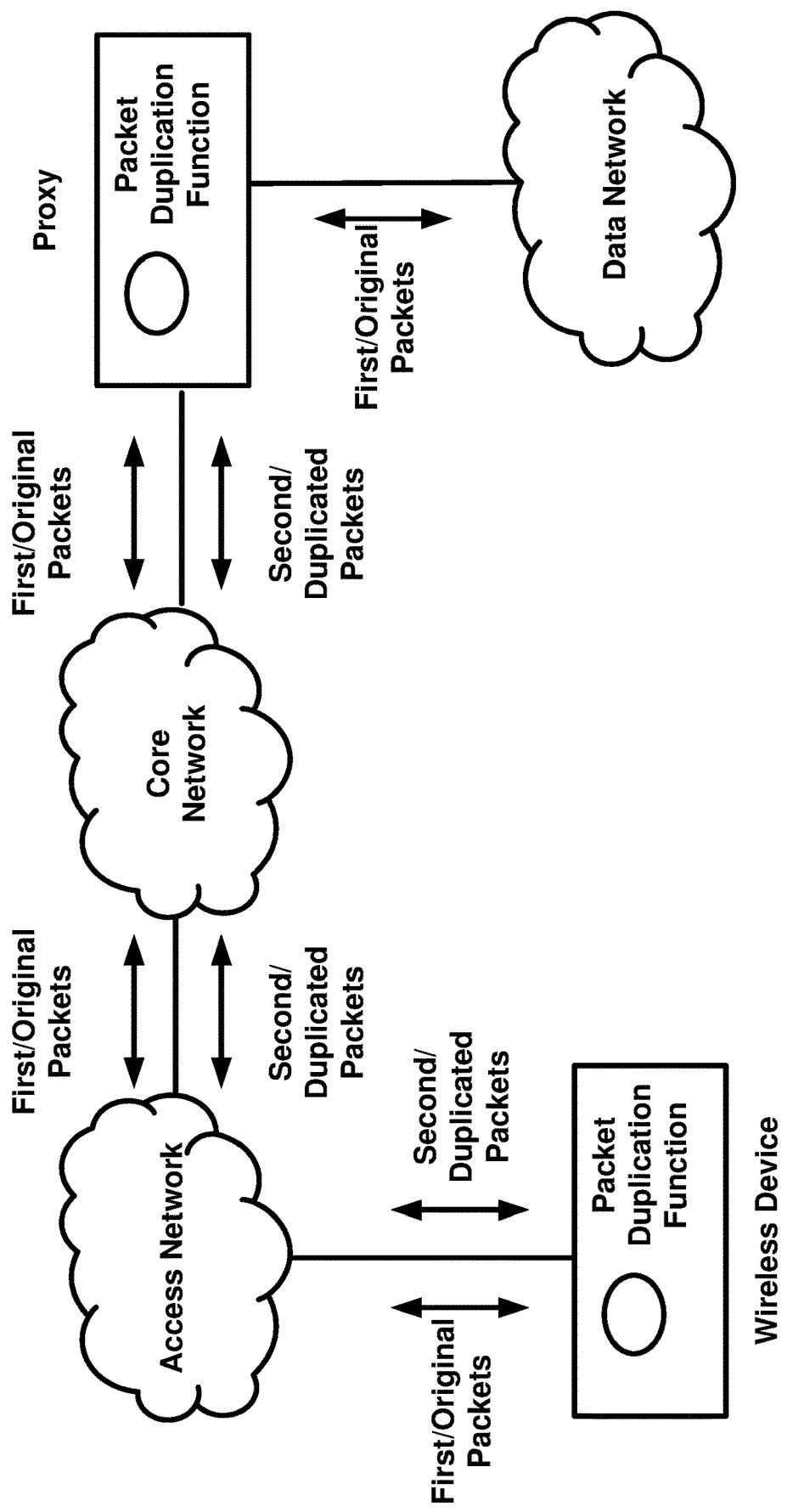
FIG. 14 is an example representing peer entities where duplication of packets and duplication elimination of packets may be handled for uplink packets and downlink packets as per an aspect of an embodiment of the present disclosure.

An example call flow illustrated in FIG. 14 may represent location of logical function of duplication of packets and duplication elimination (DPDE) for duplicating and removing (e.g. discarding, deleting, getting rid of) duplication of packets by the wireless device and in a proxy that may reside in a wireless system. In an example embodiment, DPDE function (DPDEF) may represent functionality provided for packet duplication and/or packet elimination (e.g. removal, discard, delete). This DPDEF in wireless device may be responsible for duplicating uplink packets and removing duplication of downlink packets. The proxy may be a logical entity responsible for duplicating downlink packets and removing duplication of uplink packets. In an example, the proxy may collocate with the PDU session anchor (PSA) UPF. In an example, the proxy may reside on an N6 interface between the PSA UPF and a data network as a separate function.

Figure 15:
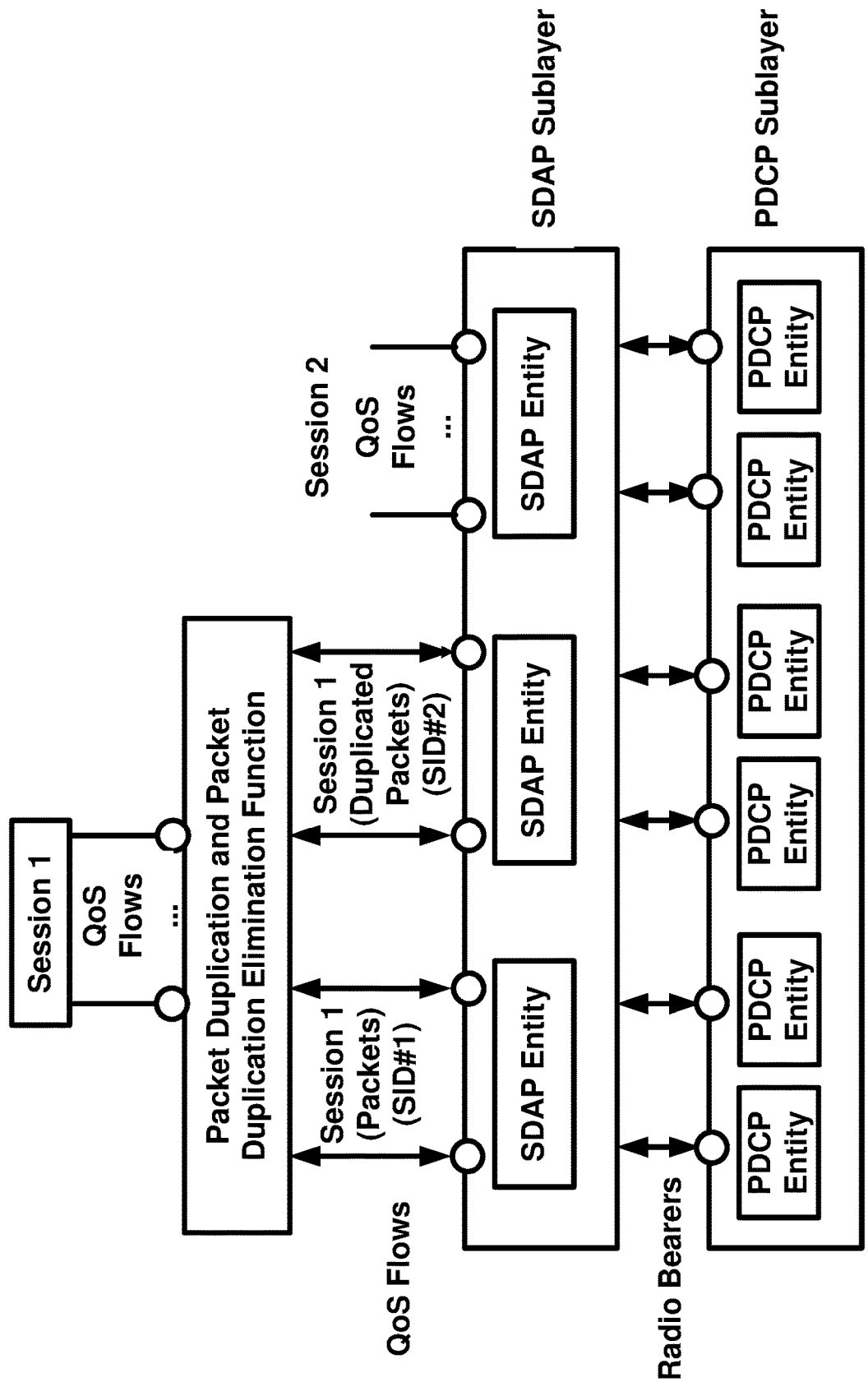
FIG. 15 illustrates an example of duplication of an original session as per an aspect of an embodiment of the present disclosure.
Figure 16:
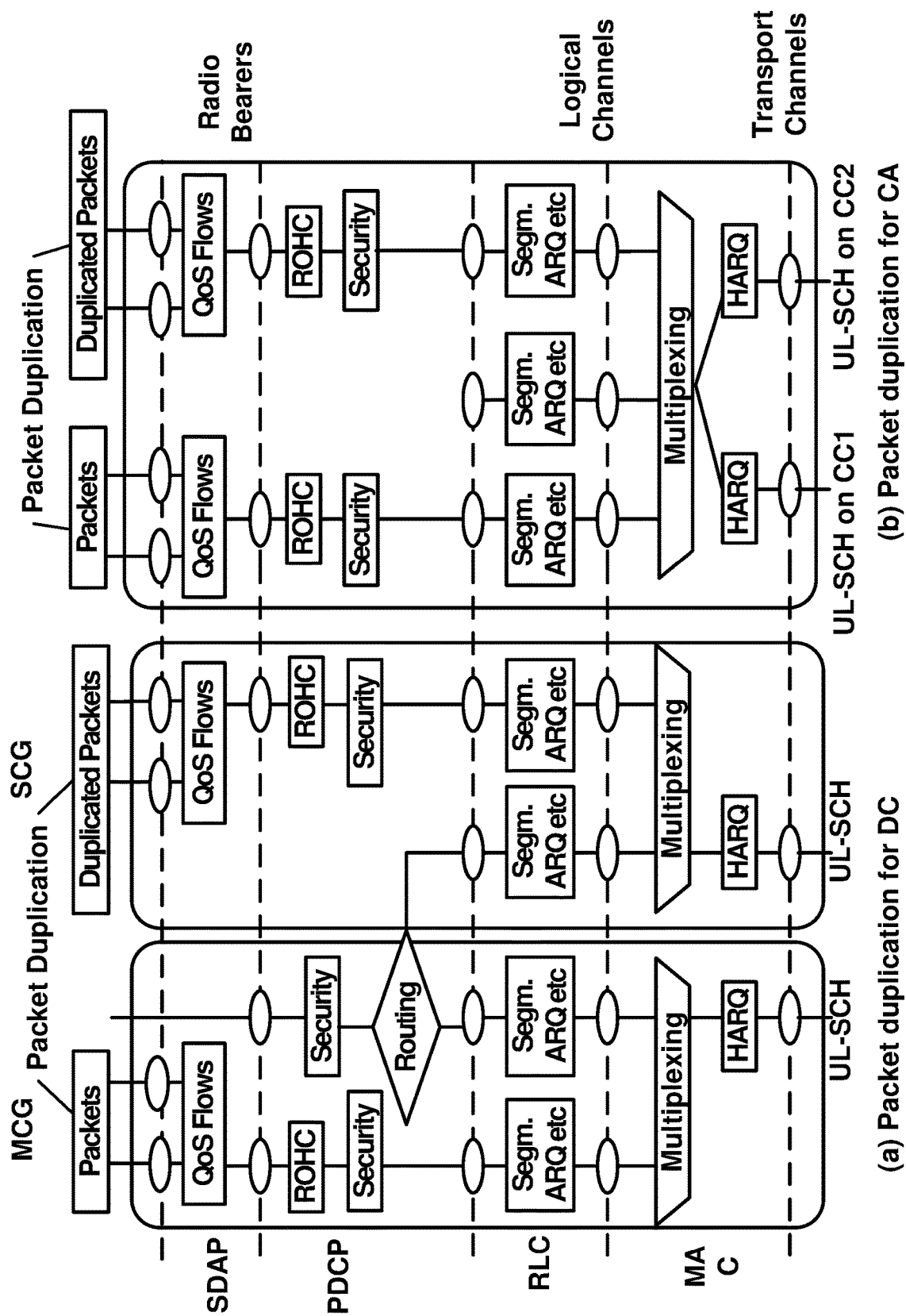
FIG. 16 illustrates an example of duplication of an original session done at an application layer as per an aspect of an embodiment of the present disclosure.

An example call flow illustrated in FIG. 15 illustrates DPDEF in the wireless device. A SDAP session handling the first session may be duplicated to another SDAP session. In an example, the wireless device may use same session identifier as the first session for a duplicated session. In case of same session identifier being used for an original session and a duplicated session, session information of the duplicated session may comprise an indication field indicating that a corresponding session is the duplicated session of the original session (e.g. the first session). In an example, the wireless device may decide to use different session identifier from the first session for a duplicated session. Information of session identifier of duplicated session (e.g. whether a duplicated session employs same or different session identifier with the first session (e.g. original session)) may be referred as a duplication information in an example embodiment. The duplication information may be exchanged with the peer handling DPDEF in the network to facilitate duplicate elimination (e.g. discarding duplicated packets and/or packets of a duplicated session). In an example, the wireless device may use separate message to exchange information with the core network. In an example, the information may be piggybacked with initial duplication activation related exchange handling DPDEF in the peer DPDEF entity. In an example, the information may be exchanged with the peer DPDEF entity at the time of a session establishment of the first session.

In an example, the wireless device may modify transport header of packets of the first session and/or the second session to define a field such as path id, connection id, list of intermediate nodes (e.g. access node and/or UPF via which the packets are transmitted), and/or the like. Use of the field of the transport header of packets may be communicated with the peer DPDEF entity in the core network prior to packet duplication activation.

In an example, the wireless device may reuse existing transport header field of the packets of first session and/or second session for duplication such as type of service, and/or the like. The reuse of header field may be communicated with the peer DPDEF entity in the core network prior to packet duplication activation.

In an example, protocols such as NAS, combination of RRC and N2, combination of RRC and NAS, application protocol over HTTP, and/or the like may be used between the wireless device and the SMF for communicating the duplication information with the peer duplicating entity. The duplication information may be also forwarded to the first UPF (PSA UPF) for identifying and discarding duplicate uplink packets that arrive at the later time for the first session and the second session from the wireless device. The duplication information may be also forwarded to the first UPF (PSA UPF) for duplicating downlink packets and transmitting duplicate downlink packets for the first session and the second session to the wireless device. In an example, the duplication information may be provided to the first UPF at the time of the core network configuration if the core network configuration is done at the time of session establishment or session modification of the first session prior to the activation of duplication of the first session.

In an example, transmission of packets of the first session and the second (duplicated) session may be realized using a frame (packet) replication and elimination (e.g. discarding, deleting) for reliability (FRER) mechanism standardized in IEEE 802.1. The FRER mechanism may be applicable at end devices (e.g. UE(s), UPF, PSA UPF) or collocated with entities within a network. Uplink packets of the first session may be duplicated, and sequence numbers may be added to the packet headers. A different copy of the packets may be forwarded via disjoint paths (e.g. different access nodes, different UPFs, and/or different tunnels) in the network. At proxy in the core network, the duplicate packets may be identified based on the sequence numbers, and one copy (e.g. one of original packet and duplicated packet) may be forwarded toward a data network. In an example, a duplicate copy (e.g. duplicated packets) of the first session may be eliminated. The ordering of the packets may also be maintained at proxy in the core network based on the sequence numbering. An FRER entity (e.g. wireless device, proxy, PSA UPF, and/or the like) may play a replication role and/or an elimination role for the two different directions (e.g. downlink and/or uplink packet transmission). The FRER functionality and/or information of paths may be setup between the FRER entities (e.g. wireless device, proxy, PSA UPF, and/or the like) using protocols such as FRER handshake protocol, NAS, combination of RRC and N2, combination of RRC and NAS, application protocol over HTTP, combination of DRB and GTP, and/or the like.

In an example, transmission of original and the second sessions may be realized by using a multipath transport control protocol (MP-TCP, multipath TCP, MP TCP and/or the like) mechanism standardized in IETF. The multipath transport control protocol may allow TCP connection to use multiple paths using inverse multiplexer enabling a data stream to be broken into multiple lower data rate communication links. In an example, MP TCP functionality may be present in the wireless device and in the network (e.g. in PSA UPF, proxy over an N6 interface, and/or the like). An information for paths for transmitting packets of the first session and packets of the second session between two MP TCP entities (e.g. wireless device, proxy, MP TCP, proxy, and/or the like) may be communicated prior to packet duplication activation using TCP three-way handshake. In an example, other protocols (NAS, combination of RRC and N2, combination of RRC and NAS, application protocol over HTTP, combination of DRB and GTP, and/or the like) may be used for paths and path set up.

In an example, transmission of the first session and/or the second session may be realized by using a multipath quick user datagram protocol internet connections (QUIC) (e.g. MP-QUIC, MP QUIC, multiple QUIC, and/or the like) mechanism standardized in IETF. This protocol may allow user datagram protocol (UDP) connection to use multiple paths using multiplexes data streams having reduce or compress redundant data transmissions. In an example, MP QUIC functionality may be present in the wireless device and in the network (e.g. in PSA UPF, proxy over an N6 interface, and/or the like). An information of paths for transmitting packets of the first session and packets of the second session between two MP QUIC entities (e.g. wireless device, proxy, MP QUIC proxy, and/or the like) may be communicated prior to packet duplication activation using cryptographic handshake. In an example, other protocols (NAS, combination of RRC and N2, combination of RRC and NAS, application protocol over HTTP, combination of DRB and GTP, and/or the like) may be used for paths and path set up. Lost packets carrying data for an individual stream may impact only that specific stream.

In an example, transmission of the first session and the second session may be realized by using multipath protocols such as concurrent multipath routing, capillary routing, and/or the like.

In an example, transmission of the first session and the second session may be realized by using combination of wireless protocols between the wireless device and entity in the wireless network (e.g. PSA UPF, proxy within or co-located with the PSA UPF, standalone proxy resided on N6 interface, and/or the like). Example of these protocols include combination of RRC protocol and N2 protocol (mobility management protocol, S1-MME, and/or the like), combination of RRC protocol and NAS protocol, combination of NAS protocol and N2 (mobility management protocol, S1-MME, and/or the like) protocol, variation of HTTP-based protocol, and/or the like. The UE may be pre-configured to support transmission of duplicated packets. In an example, protocols (NAS, combination of RRC and N2, combination of RRC and NAS, application protocol over HTTP, combination of DRB and GTP, and/or the like) may be used for paths and path set up.

In an example, the first session and/or the second session may be established via different network nodes (e.g. different access nodes and/or different UPFs). In an example, the first session may be established through the wireless device, the first access node, a first UPF, and the second session may be established through the wireless device, the second access node, a second UPF (and/or the first UPF). A network node may forward/transmit original packets of the first session to a next network node where the first session is established. A network node may forward/transmit duplicated packets of the duplicated session (e.g. the second session) to a next network node where the duplicated session (e.g. the second session) is established.

In an example, in response to determining the need of having packet duplication of one or more sessions of the wireless device, the first access node may send an indication to an access and mobility management function (AMF) requesting to activate packet duplication of the one or more sessions (e.g. the first session).

In an example, the first access node may piggyback request (an indication) to activate packet duplication in a message (e.g. NG message, S1 message, PDU session resource modification indication message, PDU session resource modification response message, PDU session resource notify message, E-RAB modification indication message, E-RAB modify response message, and/or the like) sent to the AMF.

In an example, the AMF may forward the received request to activate packet duplication to a session management function (SMF). The SMF may determine support (e.g. allowance, acceptance, enabling, activation) of duplication (e.g. duplication activation) based on information in a unified data management (UDM) for a user, a type of service supported by the first session, a current traffic condition at the first UPF controlled by the SMF, traffic conditions of one or more UPFs (e.g. via which the first session and/or the duplicated session (the second session) is established), a core network configuration, a current resource availability, one or more policy rules received from a policy control function (PCF), one or more operator policies configured at the SMF and/or the like. The result of the activation of packet duplication is sent to the AMF using N2 (mobility management protocol, S1-MME, and/or the like) protocol. In an example, the SMF may receive traffic condition information from the first UPF and/or the one or more UPFs, periodically and/or aperiodically (e.g. by requesting traffic information in response to receiving the packet duplication activation request).

In an example, in response to determining the support (e.g. allowance, acceptance, enabling, activation) of duplication (e.g. duplication activation), the SMF may send request to the first UPF for activating packet duplication of the first session (e.g. the one or more sessions). The SMF may check a status of the core network configuration. The core network configuration for supporting packet duplication may be established at the time of the first session establishment. In an example, if the core network configuration for supporting packet duplication was not established, the SMF may initiate core network configuration. In an example, the type of core network configuration (e.g. no separate tunneling, separate tunneling with the first UPF, separate tunneling with the second UPF, and/or the like) for supporting duplicated packets may be pre-defined at the SMF. Based on the type of core network configuration set in the SMF, the SMF may initiate session modification procedure with the first UPF for transmitting and receiving the duplicated packets from the first access node or the second access node. The SMF may initiate session establishment procedure with the second UPF for transmitting and receiving the duplicated packets. Tunnel endpoints at the first access node or the second access node may also be modified.

In an example, in response to determining the support of duplication (e.g. duplication activation), the SMF may send a response message indicating the activation of packet duplication (e.g. session duplication) of the first session (e.g. the one or more sessions). The AMF may forward/send/transmit response of the activation of packet duplication received from the SMF to the first access node. In an example, the AMF may send the response of the activation of packet duplication to the first access node via an NG interface message (e.g. PDU session resource modify request message, PDU session resource modify confirm message, E-RAB modification confirm message, E-RAB modify request message). In an example, the first access node may send a message (e.g. an RRC message, an RRC connection reconfiguration message), e.g., using a radio resource control (RRC) protocol to the wireless device, the message informing the wireless device to initiate/activate packet duplication. The first access node may send the message (e.g. the RRC message) to the wireless device in response to receiving the AMF response comprising acceptance of the activation of packets duplication. In an example, the first access node may piggyback request to activate packet duplication in an RRC message sent to the wireless device. In an example, the first access node may transmit request to activate packet duplication in a MAC layer control element (e.g. MAC CE) and/or a physical layer indication (e.g. a DCI) sent to the wireless device. If the AMF response sent to the first access node indicates rejection of activation of packet duplication, the first access node terminates packet duplication attempt.

In an example, in response to receiving the AMF response comprising acceptance of the activation of packets duplication, the first access node may send/transmit an activation indication of packet duplication of the first session to the second access node. The activation indication may be transmitted via an Xn message (e.g. S-NODE modification request message, S-NODE reconfiguration complete message, S-NODE modification confirm message, X2 message). In an example, based on the activation indication, the second access node may receive/transmit duplicated packets of the second session (e.g. the duplicate session).

In an example, the wireless device may respond to the first access node using RRC protocol with the rejection of the activation of packet duplication. In this case, the first access node may send a message (e.g. PDU session release message, PDU session resource release message, PDU session modification request, PDU session resource modification request, and/or the like) to the AMF indicating termination of the packet duplication activation. The AMF may forward the message indicating termination of the packet duplication to the SMF.

In an example, when the message indicating termination of the packet duplication activation (e.g. PDU session resource modify request message, PDU session modification request message, PDU session resource release request message, PDU session release request message, PDU session update request message, PDU session modify request message, Nsmf_PDUSession_UpdateSMContext request operation, Nsmf_PDUSession_ReleaseSMContext request operation and/or the like) message is received at the SMF from the AMF, the SMF may send indication of cancellation of packet duplication activation to the first UPF (e.g. N4 session modification request, N4 session deactivation request, and/or the like). The first UPF may respond to the SMF with the response of the cancellation of packet duplication activation. In an example, if the core network configuration is not pre-defined, the SMF may initiate release of resources established for supporting transmission of packets of the second session, for example, by sending N4 session release request, N4 session modification request, and/or the like. The SMF may respond to the AMF for the message indicating termination of the packet duplication activation (PDU session resource modify response message, PDU session modification response message, PDU session resource release response message, PDU session release response message, PDU session update response message, PDU session modify response message, Nsmf_PDUSession_UpdateSMContext response operation, Nsmf_PDUSession_ReleaseSMContext response operation and/or the like). The first access node may terminate packet duplication attempt.

In an example, the wireless device may respond to the first access node using RRC protocol with the acceptance of the activation of packet duplication. In response to the acceptance of the activation, the wireless device may start sending packets and/or duplicated packets for the first session and the second session using mechanism communicated with the peer DPDEF entity in the core network.

In an example, the core network configuration required for supporting duplication of packets may be established at the time of session establishment procedure. In an example, the core network configuration may be the same as transmitting packets for the first session. In an example, the core network configuration may be established dynamically when activation of the packet is triggered is received from the AMF. The core network configuration may be for supporting one path or may be for supporting separate paths for transmitting the packets of the first session and second session. This example embodiment may support activation of duplicated packets with or without prior core network configuration.

Figure 17:
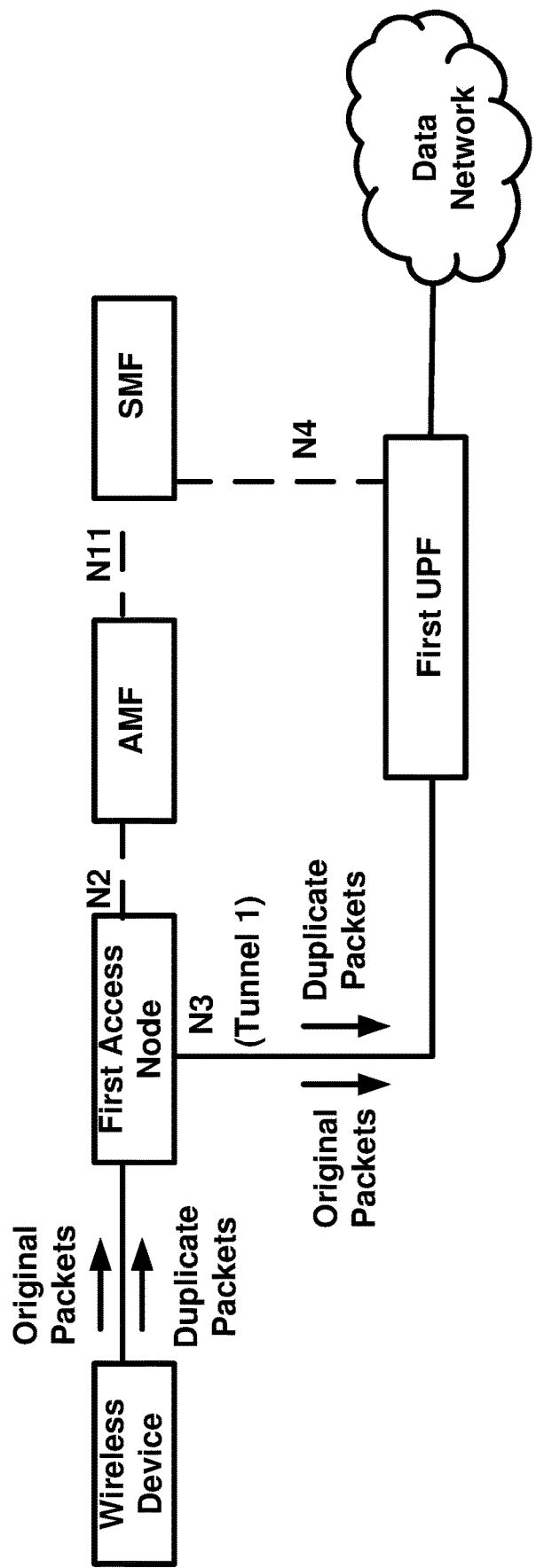
FIG. 17 illustrates an example of network configuration where the duplicated packets may be transmitted via the same path as original packets as per an aspect of an embodiment of the present disclosure.
Figure 19:
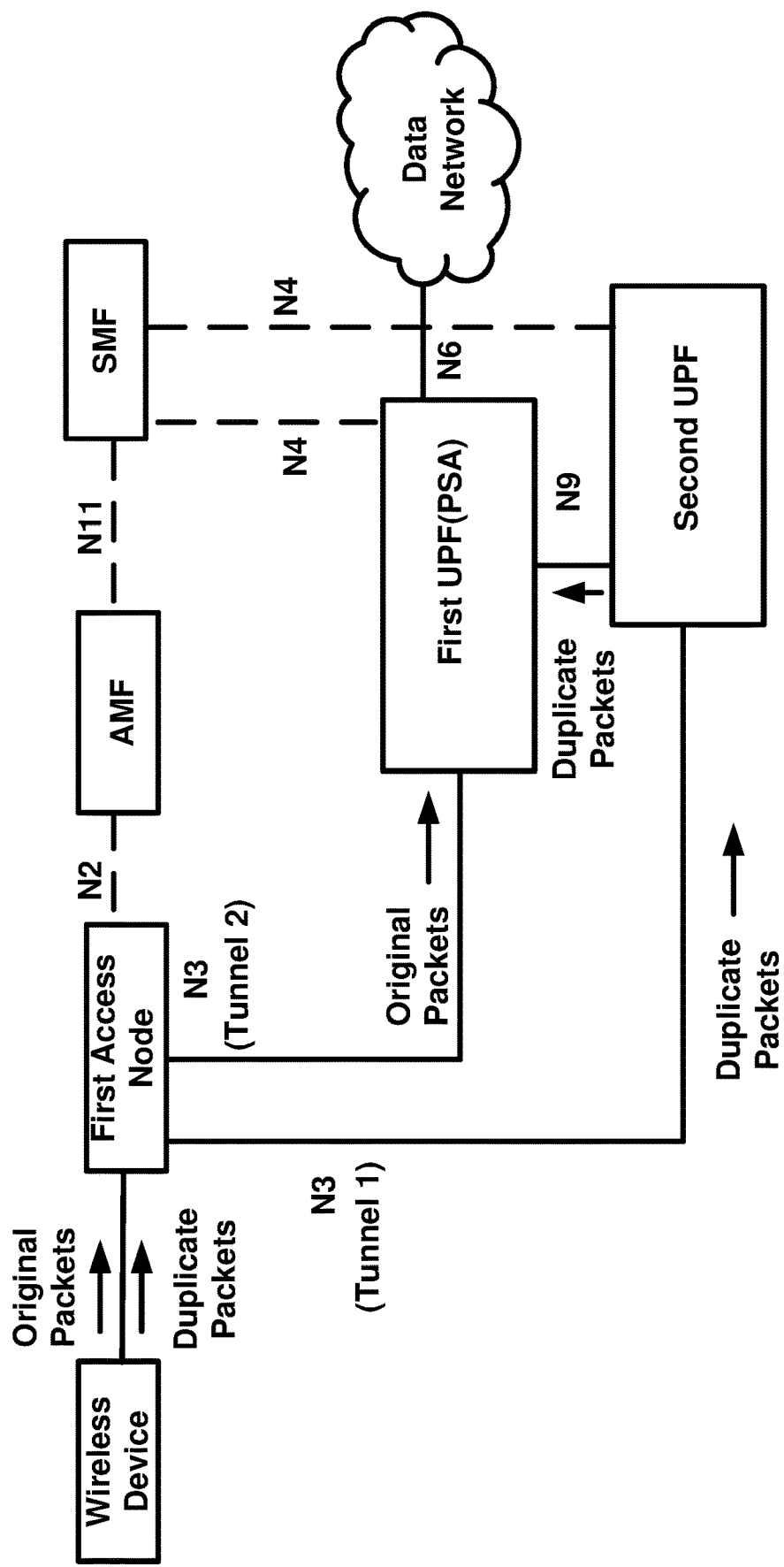
FIG. 19 illustrates an example of network configuration where the duplicated packets may be transmitted via different paths using different UPFs for duplicated and original packets as per an aspect of an embodiment of the present disclosure.

In an example as illustrated in FIG. 17, packets for the first session and second session may be transmitted and received using the same path between the first access node and the first UPF where the first UPF is the UPF currently supporting transmission of packets of the first session. The first UPF may be the PSA UPF. In another example as illustrated in FIG. 18, two separate independent routing paths may be used between the first access node and the first UPF to transmit packets for the first session and second session. In an example as illustrated in FIG. 18, separate paths may be used between a first UPF and the access network using two separate paths for transmission of the packets from the first session and the second session. In an example as illustrated in FIG. 19, separate paths may be established between the first access node and the first UPF and between the first access node and a new intermediate UPF (second UPF) to transmit packets for the first session and second session. A separate tunnel may be established between the first UPF and the second UPF where the first UPF may be the PSA UPF. Uplink packets may be transmitted from the second UPF to the first UPF. The DPDEF in the core network (located at the PSA UPF, proxy over N6 interface and/or the like) may reorder uplink packets and eliminate duplicated packets based on the duplication information which may be exchanged prior to packet duplication activation. Duplicated uplink packets may be eliminated by DPDEF of the core network. The DPDEF in the wireless device may reorder downlink packets and eliminate duplicated packets based on the duplication information which may be exchanged prior to packet duplication activation. Duplicated downlink packets may be eliminated by DPDEF of the wireless device.

Figure 21:
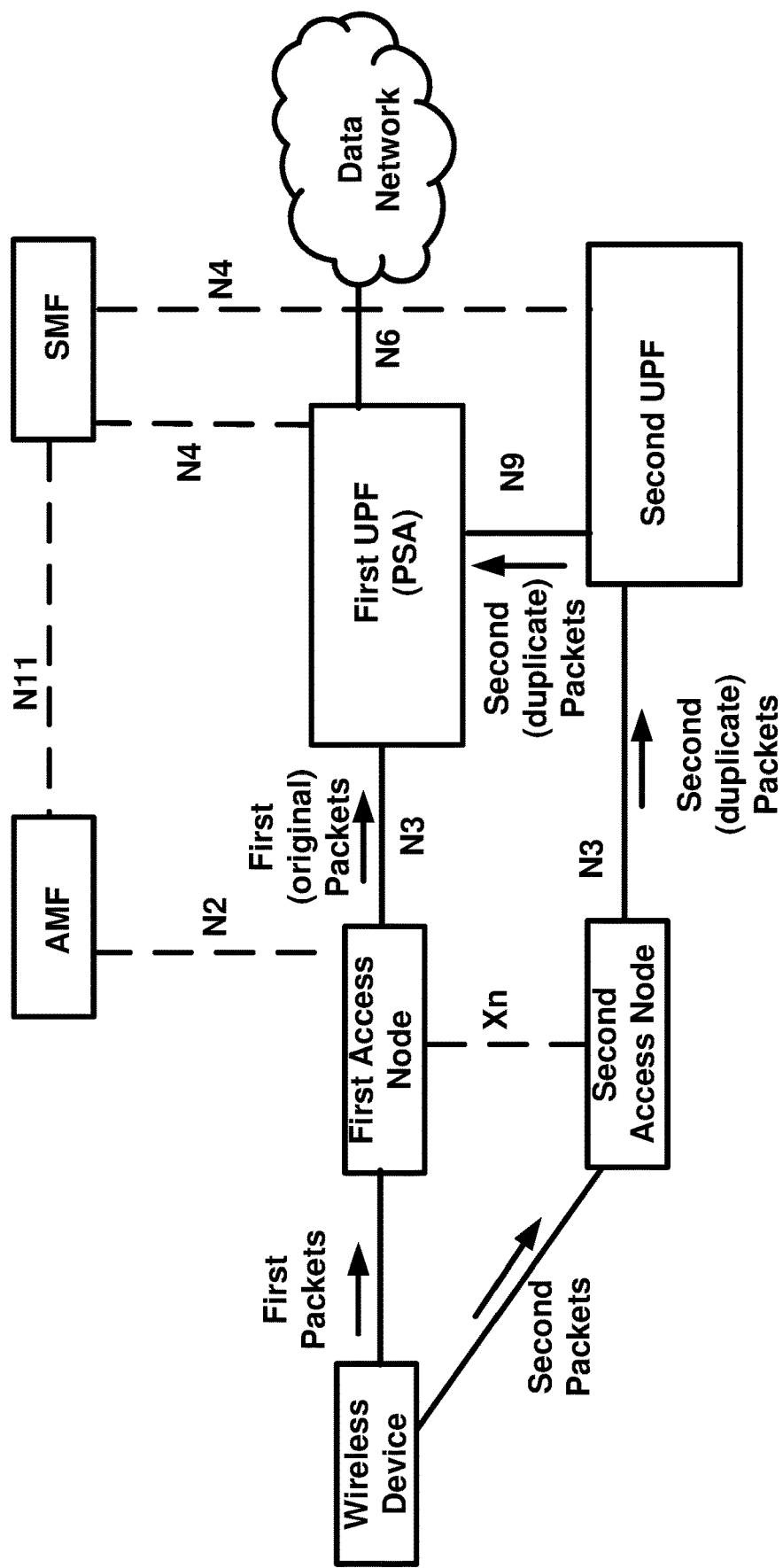
FIG. 21 illustrates an example of network configuration where the duplicated packets may be transmitted using dual connectivity mode (MCG bearer and split bearer) of the wireless device via different paths using different UPFs for duplicated and original packets as per an aspect of an embodiment of the present disclosure.
Figure 22:
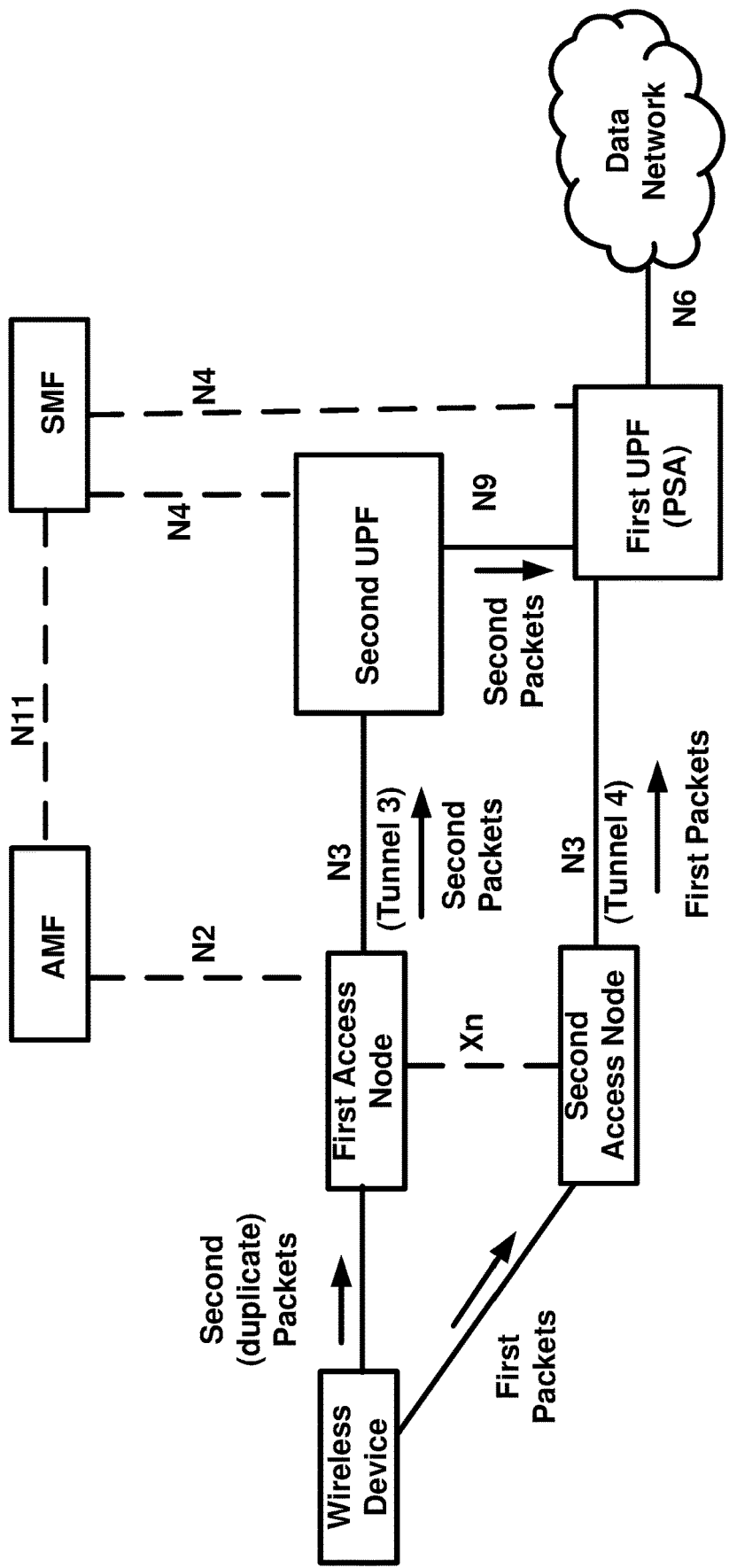
FIG. 22 illustrates an example of network configuration where the duplicated packets may be transmitted using dual connectivity mode (SCG bearer) of the wireless device via different paths using different UPFs for duplicated and original packets as per an aspect of an embodiment of the present disclosure.

In an example where the wireless device may be having dual connectivity, separate paths for packets of the first session and second session may be transmitted via master next generation nodeB (first access node) and secondary next generation nodeB (second access node). Depending on the bearer mode (MCG bearer, SCG bearer or split bearer, and/or the like). In an example as illustrated in FIG. 20, these paths may be connected to the first UPF where the packets of the first session from the first access node may be transmitted via first tunnel between the first access node and the first UPF and the packets of the second session from the first access node may be transmitted via second tunnel between the first access node and the second UPF. In another example as illustrated in FIG. 21, the first access node may be connected to the first UPF and the second access node may be connected to the second UPF. FIG. 22 illustrates an example where the first access node may be connected to the second UPF and the second access node may be connected to the first UPF.

In an example, the first UPF may receive uplink packets of the first session and uplink packets of the second sessions. The first UPF may be the PSA UPF. Based on the duplication information previously exchanged with the wireless device, the SMF may identify packets of the second session as duplicate packets. The first UPF may reorder packets of first session and second session, identify and discard uplink packets of the first session or uplink packets of the second session arriving at the later time to remove duplication.

In an example, the first access node may determine a need of removing packet duplication of one or more sessions supported by the wireless device based on at least one CSI report received from the wireless device. In an example, this determination may be based on at least one or more of a quality of service requirement of the session, traffic load at the first access node, service type of the session, and/or the like.

In an example, the first access node may send an indication to the AMF requesting it to deactivate packet duplication over N2 (mobility management protocol, S1-MME, and/or the like) protocol (e.g. PDU session resource modify request message, PDU session modification request message, PDU session resource release request message, PDU session release request message, PDU session update request message, PDU session modify request message, and/or the like). In an example, the first access node may piggyback request (an indication) to deactivate packet duplication in a message sent to an AMF.

In an example, the AMF may forward the received request to deactivate packet duplication to the SMF (e.g. PDU session resource modify request message, PDU session modification request message, PDU session resource release request message, PDU session release request message, PDU session update request message, PDU session modify request message, Nsmf_PDUSession_UpdateSMContext request operation, Nsmf_PDUSession_ReleaseSMContext request operation and/or the like). The SMF may send a message to the first UPF to deactivate packet duplication (e.g. N4 session modification request, N4 session deactivation request, and/or the like). If the core network configuration is supported dynamically, the SMF may request the first UPF to deallocate a TNL address and/or may request the second UPF to release TNL address if the second UPF was requested earlier for transmitting packets of the first session or the second session. The SMF may send the result of the deactivation of packet duplication to the AMF (e.g. PDU session resource modify response message, PDU session modification response message, PDU session resource release response message, PDU session release response message, PDU session update response message, PDU session modify response message, Nsmf_PDUSession_UpdateSMContext response operation, Nsmf_PDUSession_ReleaseSMContext response operation and/or the like).

The AMF may forward response of the deactivation of packet duplication received from the SMF to the first access node using N2 (mobility management protocol, S1-MME, and/or the like) protocol. In an example, the first access node may send a message (e.g. an RRC message, an RRC connection reconfiguration message, and/or the like) using the RRC protocol to the wireless device informing it to stop packet duplication. In an example, the first access node may piggyback request to deactivate packet duplication in the RRC message sent to the wireless device. The wireless device may deactivate packet duplication and send a result of the deactivation request to the first access node.

In an example when the core network configuration is not pre-defined at the time of a session establishment of the first session, the SMF may initiate the core network configuration when it receives a message (PDU session establishment request message, PDU session modification request message, PDUSession_CreateSMContext request operation, PDUSession_UpdateSMContext request operation and/or the like) from the AMF requesting the activation of the duplication. In one example, the SMF may receive an indication requesting the activation of duplication piggybacked in a message. In another example, the SMF may receive a separate message requesting the activation of the duplication. The first access node may include at least one or more uplink transport network layer (TNL) address (e.g. IP address, MAC address of corresponding tunnel (the first tunnel and/or the second tunnel)) of a first UPF in the response to the first access node. In an example, if the packets of the second sessions are transmitted using a tunnel between the first access node and the second UPF, the first access node may include at least one or more uplink transport network layer (TNL) address of the second UPF.

In an example, the SMF may request the session modification of the first UPF at the time of requesting the activation of the duplication. In another example, the SMF may request the session modification of the first UPF after requesting the activation of the duplication. The request for session modification may include at least one or more downlink TNL address of a second UPF. In an example, the first UPF may responds to the SMF with at least one or more uplink TNL address of a first UPF.

In an example, the SMF may request the session establishment of the second UPF. The request for session establishment may include at least one or more uplink TNL address of a the first UPF. In an example, the first UPF may responds to the SMF with at least one or more uplink TNL address and/or the downlink TNL address of the second UPF.

In an example, the SMF may send a message (e.g. PDU session modification request and/or the like) to the AMF including at least one or more uplink TNL address of a the first UPF. In an example, the SMF may send a message (e.g. PDU session modification request, PDU session update request and/or the like) to the AMF including at least one or more uplink TNL address of a the second UPF. The AMF may forward the message received from the SMF to the first access node. The first access node may respond to the AMF with the downlink TNL address of the first UPF (e.g. PDU session modification response, session update response and/or the like). In an example, the first access node may respond to the AMF with the address of the downlink TNL address of the second UPF if the path to transmit the packets of the second session includes the tunnel between the second UPF and the second access network. The AMF may send the response received from the first access node to the SMF.

In an example, the SMF may send a message (e.g. N4 session modification request, and/or the like) including at least one or more the uplink TNL address of the first UPF, the downlink TNL address of the first access node or the downlink TNL address of the second access node to the second UPF. The second UPF may send the response of the message to the SMF.

In an example, when the dual connectivity is supported by the wireless device for the first session, the first access node may send an activation of the duplication message to the second access node. In an example, the activation of duplication may be piggybacked in a message sent to the second UPF. The activation of duplication message may include at least one or more an uplink TNL address of the first access node. The second access node may respond to the first UPF comprising at least one or more of downlink uplink TNL address of the second access node.

If the wireless device is supporting SCG bearer for the first session, the duplication of uplink packets of the first session may be handled by the second access node. The uplink packets of the first session from the wireless device may be transmitted by the second access node to the first UPF. The uplink packets of the second session may be received at the first access node from the wireless device. These packets may be sent to the second access node from the first access node after the duplication of packets at the second access node. The first access node may send these uplink packets received from the second access node to the second UPF or to the first UPF based on the core network configuration used.

The downlink packets received by the second access node from the first UPF or the second UPF may be sent to the wireless device. The downlink packet of the second session received by the first access node may be sent to the wireless device.

If the wireless device is supporting MCG bearer or split bearer for the first session, the duplication of uplink packets of the first session may be handled by the first access node. The uplink packets of the first session from the wireless device may be transmitted by the first access node to the first UPF. The uplink packets of the second session may be received at the second access node from the wireless device. These packets may be sent to the first access node from the second access node after the duplication of packets at the first access node. The first access node may send these uplink packets received from the second access node to the second UPF or to the first UPF based on the core network configuration used.

The downlink packets received by the first access node from the first UPF may be sent to the wireless device. The downlink packet of the second session received by the second access node may be sent to the wireless device.

Based on the duplication information previously exchanged with the SMF, the wireless device may identify downlink packets of the second session as duplicate packets. The wireless device may re-order packets of first session and second session, identify and discard downlink packets of the first session or uplink packets of the second session arriving at the later time to remove duplication.

Based on the duplication information previously exchanged with the wireless device, the first UPF may identify uplink packets of the second session as duplicate packets. The first UPF may re-order packets of first session and second session, identify and discard uplink packets of the first session or uplink packets of the second session arriving at the later time to remove duplication.

Figure 23:
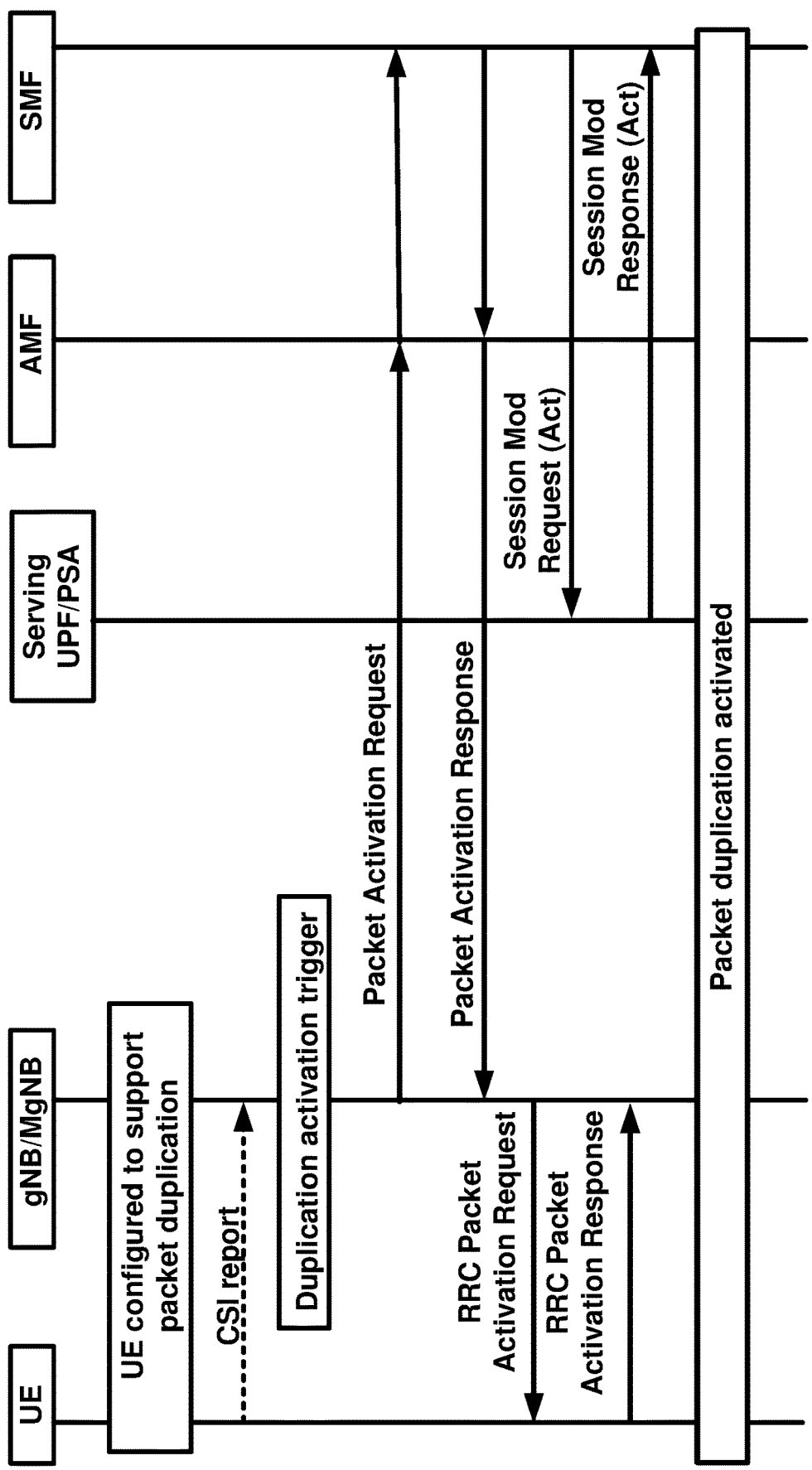
FIG. 23 illustrates an example call flow of the network configuration.

In an example, as illustrated in FIG. 23, the first access node may receive at least one channel measurement information from the wireless device. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The downlink packets of the first session may be duplicated by the first UPF. The SMF may respond to the AMF with the result of the packet duplication activation by sending the second message once it receives a response of the packet duplication activation, a fourth message from the first UPF. If the result indicates acceptance of the packet duplication activation, the first access node may send a first RRC message to the wireless device. The wireless device may send the result of the packet duplication activation, a second RRC message to the first access node. The uplink packets of the first session may be duplicated by the wireless device. In an example, the packets from the first session and second sessions are transmitted between the first access node and the first UPF via the same path (tunnel).

Figure 24:
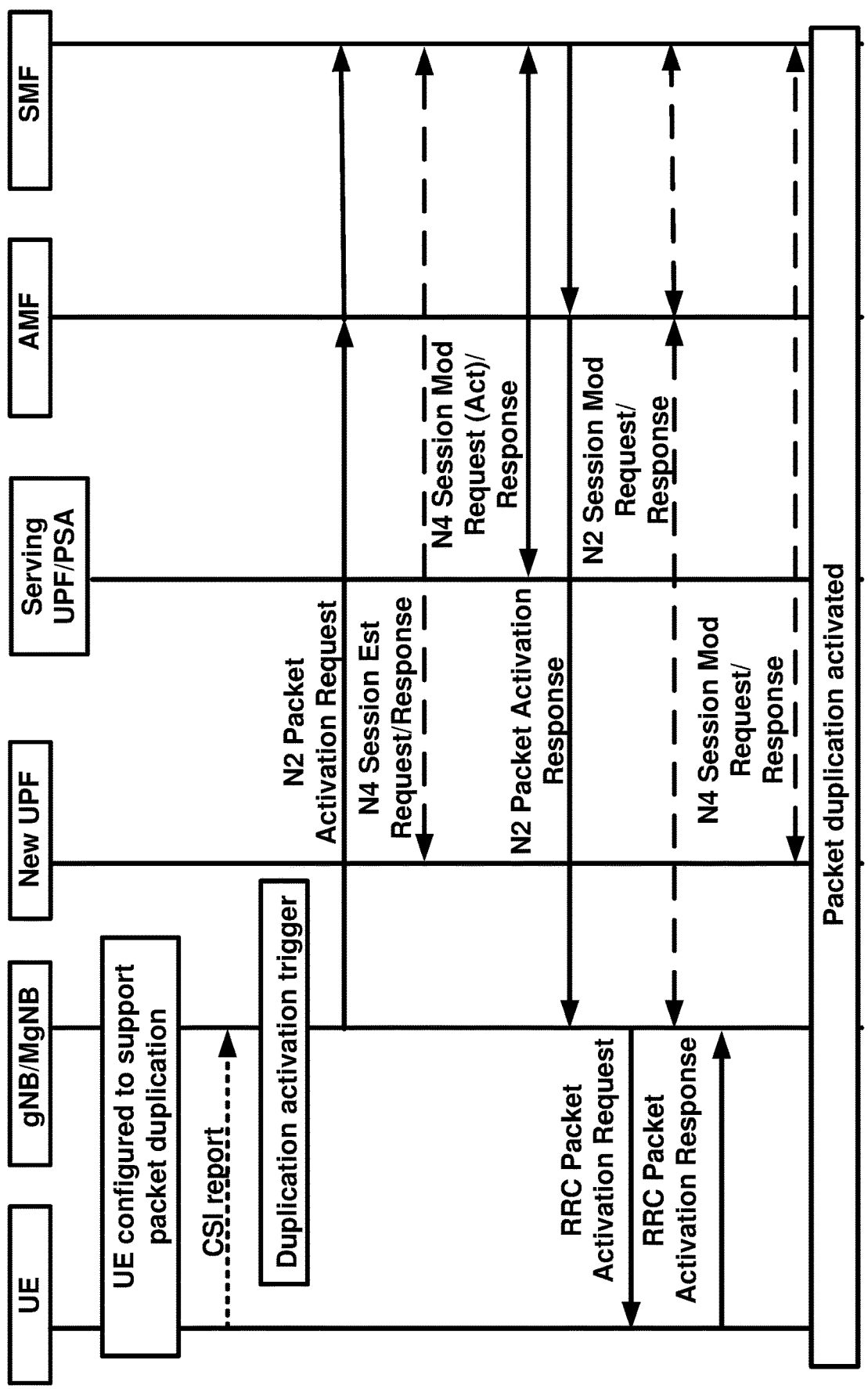
FIG. 24 illustrates an example call flow of the network configuration.

In an example, as illustrated in FIG. 24, the first access node may receive at least one channel measurement information from the wireless device. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The SMF may respond to the AMF with the result of the packet duplication activation by sending the second message once it receives a response of the packet duplication activation, a fourth message from the first UPF. The fourth message from the first UPF sent to the SMF may comprise an uplink TNL address of the first UPF.

In an example, the SMF may send the uplink TNL address of the first UPF in a fifth message using N2 protocol to the AMF. The AMF may respond to the SMF with a sixth message, comprising a downlink TNL address of the first access node. The AMF may forward the fifth message as a seventh message to the first access node. The response of the seventh message may be sent by the first access node to the AMF as an eighth message.

In an example, the access node may send the downlink TNL address of the first access node in a fifth message using N2 protocol to the AMF. The AMF may respond to the first access node with a sixth message, comprising an uplink TNL address of the first UPF. The AMF may forward the fifth message as a seventh message to the SMF. The response of the seventh message may be sent by the SMF to the AMF as an eighth message.

If the seventh message indicates acceptance of the packet duplication activation, the first access node may send the first RRC message to the wireless device. The wireless device may send the result of the packet duplication activation, a second RRC message to the first access node. The uplink packets of the first session may be duplicated by the wireless device. In an example, the packets from the first session and second sessions are transmitted between the first access node and the first UPF via two different paths (tunnels).

Figure 25:
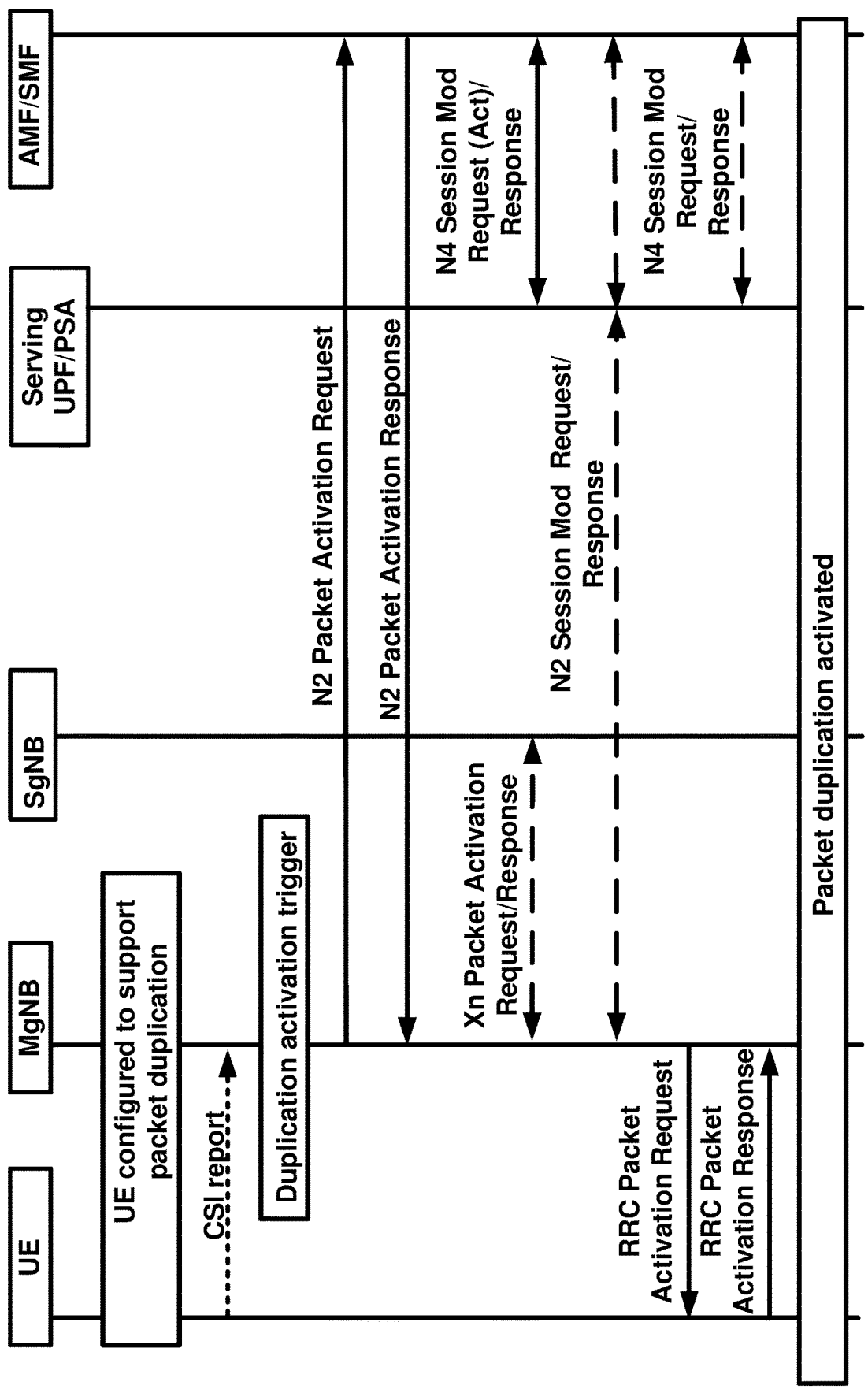
FIG. 25 illustrates an example call flow of the network configuration.

In an example, as illustrated in FIG. 25, the first access node may receive at least one channel measurement information from the wireless device. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The SMF may respond to the AMF with the result of the packet duplication activation by sending the second message once it receives a response of the packet duplication activation, a fourth message from the first UPF. The fourth message from the first UPF sent to the SMF may comprise an uplink TNL address of the first UPF.

The SMF may send a request to the second UPF for an establishment of one or more TNL addresses. The second UPF may respond to the SMF comprising a downlink TNL address or an uplink TNL address. The SMF may forward the uplink TNL address of the first UPF to the second UPF and the downlink TNL address of the second UPF. This path between the first UPF and the second UPF may be used to transmit uplink packets received at the second UPF to the first UPF, where the first UPF may be the PSA UPF.

In an example, the SMF may send the uplink TNL address of the second UPF in a fifth message using N2 protocol to the AMF. The AMF may respond to the SMF with a sixth message, comprising a downlink TNL address of the first or second access node. The AMF may forward the fifth message as a seventh message to the first access node. The response of the seventh message may be sent by the first access node to the AMF as an eighth message.

In an example, the access node may send the downlink TNL address of the first access node or the second access node in a fifth message using N2 protocol to the AMF. The AMF may respond to the first access node with a sixth message, comprising an uplink TNL address of the second UPF. The AMF may forward the fifth message as a seventh message to the SMF. The response of the seventh message may be sent by the SMF to the AMF as an eighth message.

If the seventh message indicates acceptance of the packet duplication activation, the first access node may send the first RRC message to the wireless device. The wireless device may send the result of the packet duplication activation, a second RRC message to the first access node. The uplink packets of the first session may be duplicated by the wireless device. The downlink packets of the first session may be duplicated by the first UPF, where the first UPF is also the PSA UPF. In an example, the packets from the first session and second sessions are transmitted between the first access node and the first UPF, between the first access node and the second UPF or between first access node and the first UPF and between the second access node and the second UPF via two different paths (tunnels).

In an example, as illustrated in FIG. 24, the first access node may receive at least one channel measurement information from the wireless device. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The SMF may respond to the AMF with the result of the packet duplication activation by sending the second message once it receives a response of the packet duplication activation, a fourth message from the first UPF. The fourth message from the first UPF sent to the SMF may comprise an uplink TNL address of the first UPF.

The SMF may send a request to the second UPF for an establishment of one or more TNL addresses. The second UPF may respond to the SMF comprising a downlink TNL address or an uplink TNL address. The SMF may forward the uplink TNL address of the first UPF to the second UPF and the downlink TNL address of the second UPF. This path between the first UPF and the second UPF may be used to transmit uplink packets received at the second UPF to the first UPF, where the first UPF may be the PSA UPF.

In an example, the SMF may send the uplink TNL address of the second UPF in a fifth message using N2 protocol to the AMF. The AMF may respond to the SMF with a sixth message, comprising a downlink TNL address of the first or second access node. The AMF may forward the fifth message as a seventh message to the first access node. The response of the seventh message may be sent by the first access node to the AMF as an eighth message.

In an example, the access node may send the downlink TNL address of the first access node or the second access node in a fifth message using N2 protocol to the AMF. The AMF may respond to the first access node with a sixth message, comprising an uplink TNL address of the second UPF. The AMF may forward the fifth message as a seventh message to the SMF. The response of the seventh message may be sent by the SMF to the AMF as an eighth message.

If the seventh message indicates acceptance of the packet duplication activation, the first access node may send the first RRC message to the wireless device. The wireless device may send the result of the packet duplication activation, a second RRC message to the first access node. The uplink packets of the first session may be duplicated by the wireless device. The downlink packets of the first session may be duplicated by the first UPF, where the first UPF is also the PSA UPF. In an example, the packets from the first session and second sessions are transmitted between the first access node and the first UPF, between the first access node and the second UPF or between first access node and the first UPF and between the second access node and the second UPF via two different paths (tunnels).

In an example, as illustrated in FIG. 25, the first access node may receive at least one channel measurement information from the wireless device. The wireless device may be using dual mode connectivity (SCG bearer, MCG bearer or split mode) for transmitting packets of the first session. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The SMF may respond to the AMF with the result of the packet duplication activation by sending the second message once it receives a response of the packet duplication activation, a fourth message from the first UPF. The fourth message from the first UPF sent to the SMF may comprise an uplink TNL address of the first UPF.

In an example, the SMF may send the uplink TNL address of the first UPF in a fifth message using N2 protocol to the AMF. The AMF may respond to the SMF with a sixth message, comprising a downlink TNL the second access node. The AMF may forward the fifth message as a seventh message to the first access node. The response of the seventh message may be sent by the first access node to the AMF as an eighth message.

In an example, the access node may send the downlink TNL address of the second access node in a fifth message using N2 protocol to the AMF. The AMF may respond to the first access node with a sixth message, comprising an uplink TNL address of the first UPF. The AMF may forward the fifth message as a seventh message to the SMF. The response of the seventh message may be sent by the SMF to the AMF as an eighth message.

If the seventh message indicates acceptance of the packet duplication activation, the first access node may send the first RRC message to the wireless device. The wireless device may send the result of the packet duplication activation, a second RRC message to the first access node.

In the wireless device is using MCG or split bearer mode, the wireless device may transmit the packets of the first session to the first access node and transmit the packets of the second session to the second access node. The second access node may forward the received packets from the wireless device, of the second session to the first UPF and the first access node may forward the received packets from the wireless device of the first session to the first UPF.

In the wireless device is using SCG bearer mode, the wireless device may transmit the packets of the first session to the second access node and transmit the packets of the second session to the first access node. The second access node may forward the received packets from the wireless device, of the first session to the first UPF and the first access node may forward the received packets from the wireless device of the second session to the first UPF.

The uplink packets of the first session may be duplicated by the wireless device. The downlink packets of the first session may be duplicated by the first UPF, where the first UPF is also the PSA UPF. In an example, the packets from the first session and second sessions are transmitted between the first access node and the first UPF, between the second access node and the first UPF via two different paths (tunnels).

Figure 26:
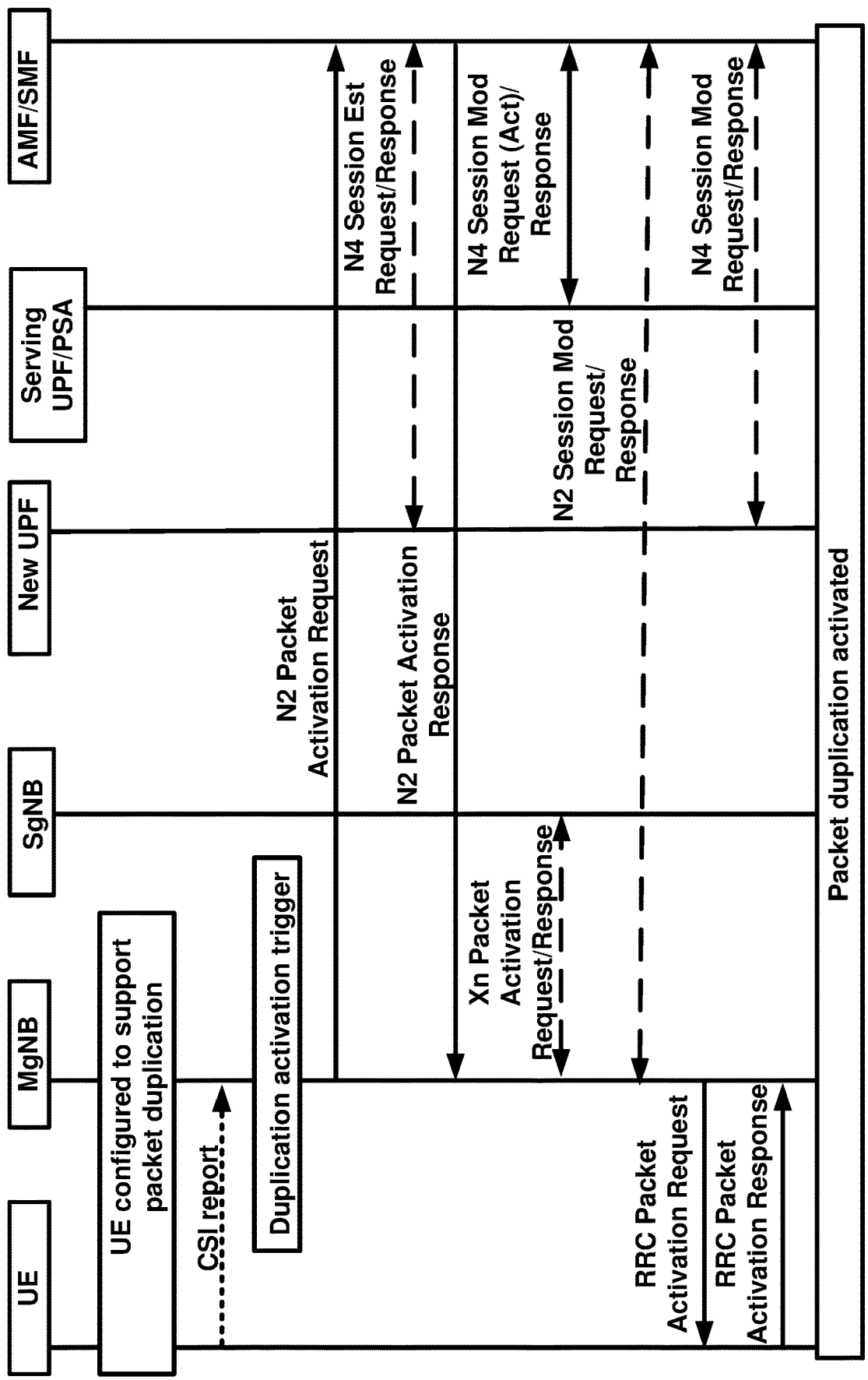
FIG. 26 illustrates an example call flow of the network configuration.

In an example, as illustrated in FIG. 26, the first access node may receive at least one channel measurement information from the wireless device. The wireless device may be using dual mode connectivity (SCG bearer, MCG bearer or split mode) for transmitting packets of the first session. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The SMF may respond to the AMF with the result of the packet duplication activation by sending the second message once it receives a response of the packet duplication activation, a fourth message from the first UPF. The fourth message from the first UPF sent to the SMF may comprise an uplink TNL address of the first UPF.

The SMF may send a request to the second UPF for an establishment of one or more TNL addresses. The second UPF may respond to the SMF comprising a downlink TNL address or an uplink TNL address. The SMF may forward the uplink TNL address of the first UPF to the second UPF and the downlink TNL address of the second UPF. This path between the first UPF and the second UPF may be used to transmit uplink packets received at the second UPF to the first UPF, where the first UPF may be the PSA UPF.

In an example, the SMF may send the uplink TNL address of the second UPF in a fifth message using N2 protocol to the AMF. The AMF may respond to the SMF with a sixth message, comprising a downlink TNL the second access node. The AMF may forward the fifth message as a seventh message to the first access node. The response of the seventh message may be sent by the first access node to the AMF as an eighth message.

In an example, the access node may send the downlink TNL address of the second access node in a fifth message using N2 protocol to the AMF. The AMF may respond to the first access node with a sixth message, comprising an uplink TNL address of the second UPF. The AMF may forward the fifth message as a seventh message to the SMF. The response of the seventh message may be sent by the SMF to the AMF as an eighth message.

If the seventh message indicates acceptance of the packet duplication activation, the first access node may send the first RRC message to the wireless device. The wireless device may send the result of the packet duplication activation, a second RRC message to the first access node.

In the wireless device is using MCG or split bearer mode, the wireless device may transmit the packets of the first session to the first access node and transmit the packets of the second session to the second access node. The second access node may forward the received packets from the wireless device, of the second session to the first UPF and the first access node may forward the received packets from the wireless device of the first session to the first UPF.

In the wireless device is using SCG bearer mode, the wireless device may transmit the packets of the first session to the second access node and transmit the packets of the second session to the first access node. The second access node may forward the received packets from the wireless device, of the first session to the first UPF and the first access node may forward the received packets from the wireless device of the second session to the first UPF.

The uplink packets of the first session may be duplicated by the wireless device. The downlink packets of the first session may be duplicated by the first UPF, where the first UPF is also the PSA UPF. In an example, the packets from the first session and second sessions are transmitted between the first access node and the first UPF and between the second access node and the second UPF or between the first access node and the second UPF and between the second access node and the first UPF via two different paths (tunnels).

Figure 27:
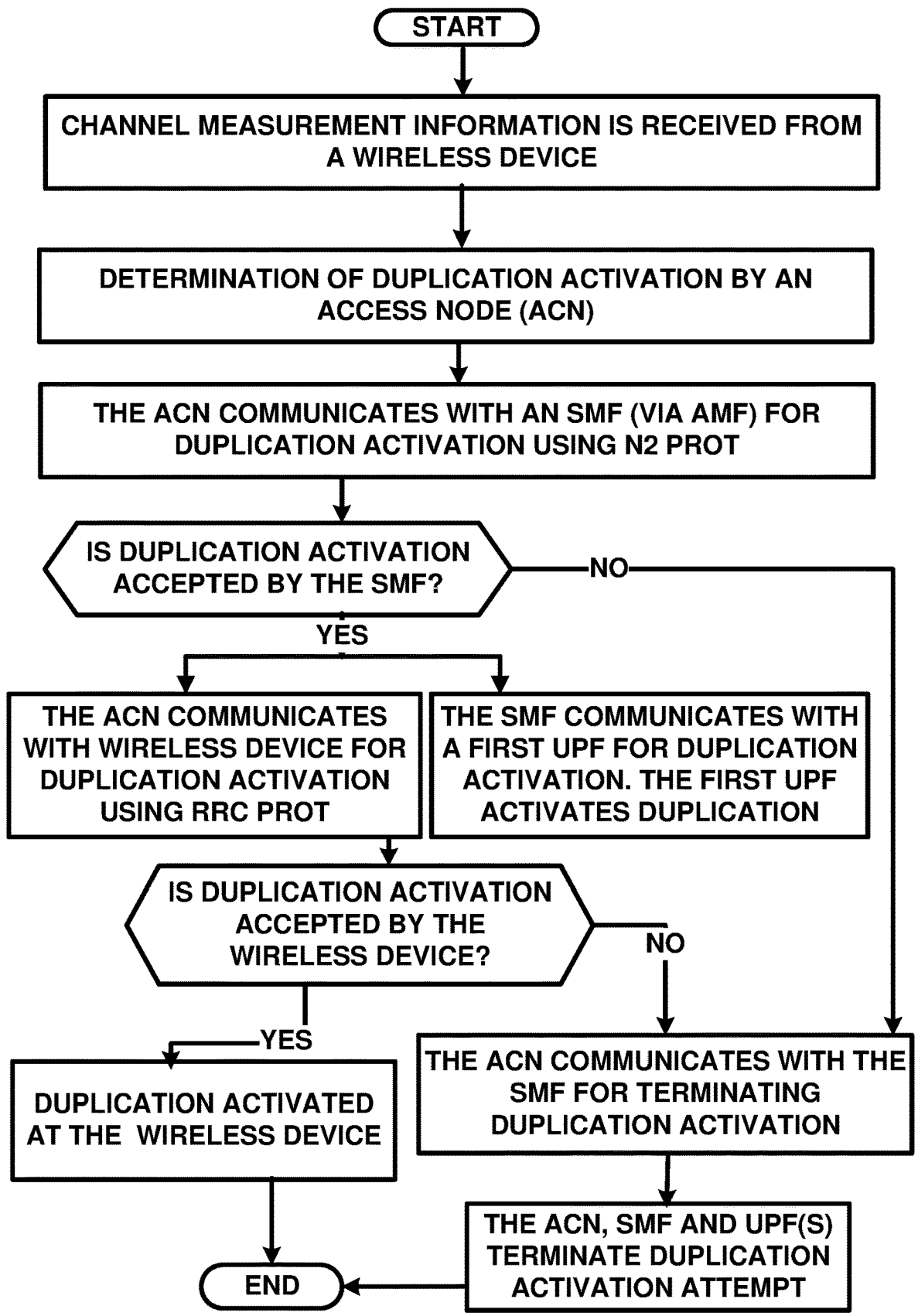
FIG. 27 illustrates an example flow chart where communication may be supported using an N2 protocol and RRC protocol as per an aspect of an embodiment of the present disclosure.

In an example, as illustrated in FIG. 27, the first access node may receive at least one channel measurement information from the wireless device. The first node may determine packet duplication. The first access node may send the packet duplication indication to the SMF via the AMF using N2 protocol. The SMF may decide to accept the packet duplication. The SMF may send a result of the decision to the first access node via the AMF.

If the SMF accepts the session duplication request, the first access node may send a message (e.g. an RRC connection reconfiguration message, and/or the like) using RRC protocol indicating the packet duplication to the wireless device. If the wireless device accepts the packet duplication message, it may respond to the first access node using the RRC protocol and start duplication of the packets of the first session.

If the SMF does not accept the session duplication request, the first access node may terminate the packet duplication attempt.

If the wireless device does not accept the packet duplication request from the first access node, the first access node indicates termination of the packet duplication attempt to the SMF via the AMF. The SMF may indicate the termination of the packet duplication to the first UPF. The first UPF release uplink TNL address if it was allocated by the first UPF after receiving the packet duplication request from the SMF. The SMF may also indicate release of TNL addresses to the second UPF.

Figure 28:
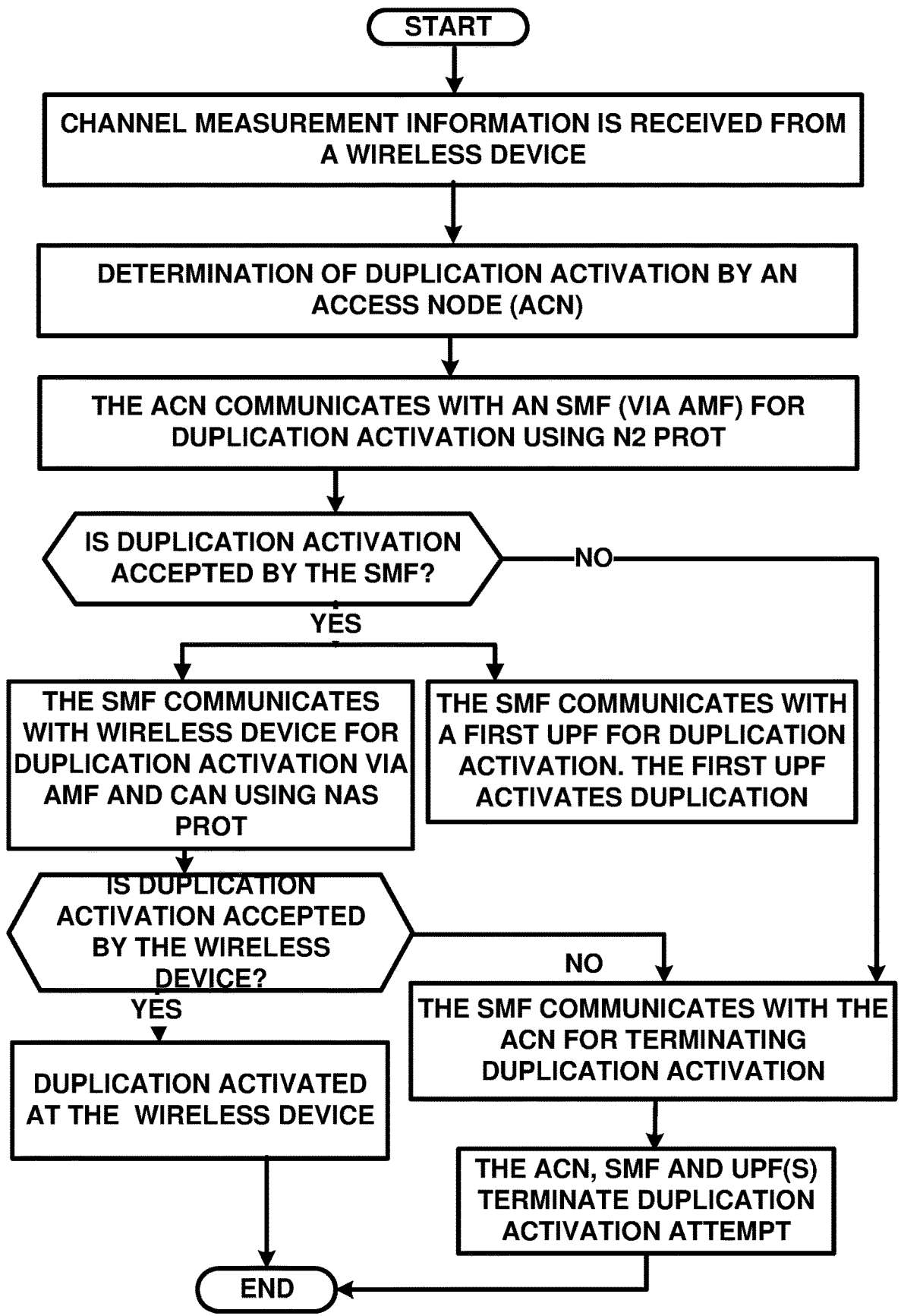
FIG. 28 illustrates an example flow chart where communication may be supported using the N2 protocol and an NAS protocol as per an aspect of an embodiment of the present disclosure.

In an example, as illustrated in FIG. 28, the first access node may receive at least one channel measurement information from the wireless device. The first node may determine packet duplication. The first access node may send the packet duplication indication to the SMF via the AMF using N2 protocol. The SMF may decide to accept the packet duplication. The SMF may send a result of the decision to the first access node via the AMF.

If the SMF accepts the session duplication request, the SMF may send a message (PDU session establishment request message, PDU session modification request message, PDU session activation request message and/or the like) using NAS protocol (e.g. SM-NAS and/or NAS message via the AMF) indicating the packet duplication to the wireless device. If the wireless device accepts the packet duplication message, it may respond to the SMF using the NAS protocol and start duplication of the packets of the first session. Messages sent using NAS protocol may be transmitted via the first access node and the AMF. In an example, the message using NAS protocol may be transmitted via an RRC message (e.g. DL information transfer message, RRC connection reconfiguration message, and/or the like) from the first access node to the wireless device. The first access node may receive the message using NAS protocol from the AMF via an NG interface message and/or S1 interface message (e.g. downlink NAS transport message, PDU session resource setup request message, PDU session resource release command, PDU session resource modify request, PDU session resource modify confirm message, initial context setup request message, handover request message, and/or the like).

In an example, the wireless device may respond to the AMF (and/or SMF) via the first access node using NAS protocol with the rejection of the activation of packet duplication. In an example, the AMF may forward the message (PDU session release request message, PDU session modification request and/or the like) indicating termination of the packet duplication to the SMF. In an example, the message (e.g. response message) using NAS protocol may be transmitted via an RRC message (e.g. UL information transfer message, RRC connection resume complete message, RRC connection setup complete message, and/or the like) from the wireless device to the first access node. The first access node may transmit/forward the message (e.g. response message) using NAS protocol to the AMF and/or the SMF via an NG interface message and/or S1 interface message (e.g. uplink NAS transport message, initial UE message, PDU session resource setup response message, PDU session resource release response message, PDU session resource modify response message, PDU session resource modify indication message, and/or the like).

In an example, when the message indicating termination of the packet duplication activation is received at the SMF, the SMF may send indication of cancellation of packet duplication activation to the first UPF. The first UPF may respond to the SMF. In an example, if the core network configuration is not pre-defined, the SMF may initiate release of resources established for supporting transmission of packets of the second session. The SMF may respond to the first access node. The first access node may terminate packet duplication attempt.

In an example, the wireless device may respond to the AMF (and/or SMF) using NAS protocol with the acceptance of the activation of packet duplication. In response to the acceptance of the activation, the wireless device may start sending packets and duplicated packets for the first session and the second session using mechanism communicated with the peer DPDEF entity in the core network.

If the SMF does not accept the session duplication request, the first access node may terminate the packet duplication attempt.

If the wireless device does not accept the packet duplication request from the SMF, the SMF indicates termination of the packet duplication attempt to the first access node via the AMF. The SMF may indicate the termination of the packet duplication to the first UPF. The first UPF release uplink TNL address if it was allocated by the first UPF after receiving the packet duplication request from the SMF. The SMF may also indicate release of TNL addresses to the second UPF.

Figure 29:
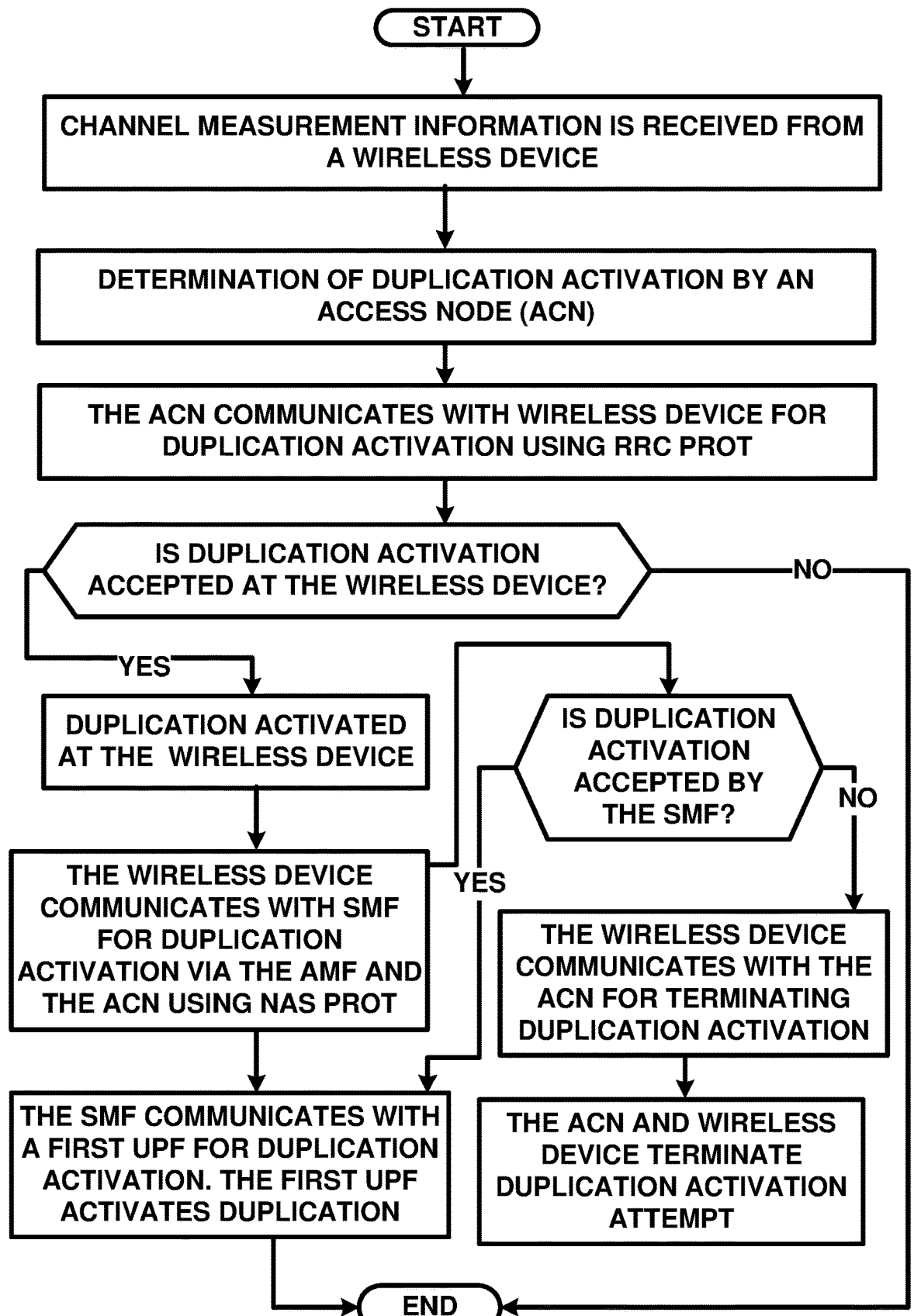
FIG. 29 illustrates an example flow chart where communication may be supported using the NAS protocol and the RRC protocol as per an aspect of an embodiment of the present disclosure.

In an example, as illustrated in FIG. 29, the first access node may receive at least one channel measurement information from the wireless device. The first node may determine packet duplication. The first access node may send the packet duplication indication to the wireless device using the RRC protocol. The wireless device may send a result of the activation duplication to the first access node and may start duplication of the packets of the first session If the wireless device accepts the session duplication request from the first access node, the wireless device may send a message (PDU session establishment request message, PDU session modification request message, PDU session activation request message and/or the like) using NAS protocol indicating the packet duplication to the SMF via AMF. If the SMF accepts the packet duplication message, it may respond to the wireless device using the NAS protocol. Messages sent using NAS protocol are transmitted via the first access node and the AMF.

If the wireless device does not accept the packet duplication request from the first access node, the first access node may terminate the packet duplication attempt.

If the SMF does not accept the packet duplication request from the wireless device, the wireless device may indicate failure to the first access node. The first access node and the wireless device may terminate the packet duplication attempt.

In an example embodiment, a first access node may receive a channel measurement information from a wireless device. The first access node may determine an activation of a packet duplication of a session of the wireless device based on the channel measurement information. The first access node may send a first message indicating an activation of the packet duplication of the session to an AMF. The first access node may receive the response of the first message, a second message indicating acceptance of the activation from the AMF. The first access node may send a first RRC message indicating the activation of the packet duplication of the session to the wireless device. The first access node may receive a second RRC message indicating a completion of the activation from the wireless device.

In an example, the first a access node may receive first (original) packets of a first (original) session from the wireless device. The first access node may send to a UPF second (duplicated) packets, wherein the second packets are a duplication of the first packets.

In an example, the first access node may receive first packets of the first session from the wireless device. The first access node may send to a UPF the first packets and second packets via a tunnel between the first access node and the UPF, wherein the second packets are a duplication of the first packets.

In an example, the first access node may receive first packets of the first session from the wireless device. The first access node may send to a UPF the first packets via a first tunnel between the first access node and the first UPF. The first access node may send second packets to a second UPF via a second tunnel between the first access node and the second UPF, wherein the second packets are a duplication of the first packets.

In an example, the first UPF may be the second UPF.

In an example, the first UPF may be a PSA UPF.

In an example, the first access node may receive from the wireless device first packets of the first session. The first access node may send to a first UPF, the first packets of the session via a first tunnel between the first access node and the first UPF. The first access node may receive second packets from the wireless device. The first access node may send to a first UPF, the second packets of the session via a fourth tunnel between the second access node and the first UPF.

In an example, the first UPF may be the second UPF.

In an example, the first access node may receive from the wireless device first packets of the first session. The first access node may send to a first UPF, the first packets of the session via a first tunnel between the first access node and the first UPF. A second access node may receive second packets from the wireless device. The second access node may send to a second UPF, the second packets of the session via a fifth tunnel between the second access node and the second UPF.

In an example, the first UPF may be the second UPF.

In an example, the first UPF may be a PSA UPF.

In an example, the channel measurement information may comprise at least one of a channel quality indicator (CQI), a precoding matrix indicator (PMI), a precoding type indicator (PTI); or rank indication (RI).

In an example, the first access node may determine the packet duplication of the session based on at least one of a quality-of-service requirements of the session, traffic load of the first access node, a network slice selection assistance information, a subscription information or a session/slice type.

In an example, the AMF may send a third message indicating an activation of the packet duplication of the session to an SMF. The AMF may receive a fourth message indicating acceptance of the activation.

In an example, the second message may comprise at least one of an uplink transport network layer (TNL) address of a first UPF.

In an example, the fourth message may comprise at least one of an uplink TNL address of the first UPF.

In an example, the second message may comprise at least one of an uplink TNL address of the second UPF.

In an example, the fourth message further comprises at least one of an uplink TNL address of the second UPF.

In an example, the AMF may receive from an SMF a fifth message as a request for session modification comprising at least one of an uplink TNL address of a first UPF or a duplication information. The AMF may send a sixth message indicating a result of session modification, comprising at least one of a downlink TNL address of the first access node.

In an example, the first access node may receive from the AMF, a seventh message for session modification, in response to receiving a fifth message, comprising at least one of an uplink TNL address of a first UPF. The first access node may send to the AMF an eighth message indicating a result of session modification, comprising at least one of a downlink TNL address of the first access node.

In an example, the first access node may send to a second access node, a ninth message indicating an activation of the packet duplication of the session. The first access node may receive from the second access node a tenth message comprising at least one of a downlink TNL address of the second access node.

In an example, the first access node may send to a second access node, a ninth message indicating an activation of the packet duplication of the session. The first access node may send to a first UPF, a second packets in response to receiving the ninth message.

In an example, the second access node may send to a second UPF, second packets in response to receiving the ninth message.

In an example, the AMF may receive from the SMF, a fifth message as a request for session modification, comprising at least one of an uplink TNL address of a second UPF. The AMF may send the SMF, a sixth message indicating a result of session modification, comprising at least one of a downlink TNL address of a second access node. In an example, the second UPF may be the first UPF. In an example, the second access node may be the first access node.

In an example, the first access node may receive from the AMF, a seventh message in response to receiving a fifth message, comprising at least one of an uplink TNL address of a second UPF. The first access node may send an eighth message indicating a result of session modification, comprising at least one of a downlink TNL address of the second access node. In an example, the second UPF may be the first UPF. In an example, the second access node may be the first access node.

In an example, the SMF may send to the first UPF, a ninth message indicating an activation of the packet duplication of the session, comprising a duplication indicator or a duplication information. The SMF may receive from the first UPF, a tenth message indicating acceptance of the activation.

In an example, am SMF may send the AMF, a fifth message as a request for session modification, comprising at least one of a downlink TNL address of a second access node. The AMF may receive from the SMF, a sixth message indicating a result of session modification, comprising at least one of an uplink TNL address of a second UPF.

In an example, the first access node may send to the AMF a seventh message, comprising at least one of an uplink TNL address of a second access node. The first access node may receive from the AMF, an eighth message indicating a result of session modification, comprising at least one of an uplink TNL address of a second UPF.

In an example, the first access node may receive a channel measurement information from a wireless device. The first access node may determine a deactivation of the packet duplication of the session of the wireless device based on the channel measurement information. The first access node may send an eleventh message indicating the deactivation of the packet duplication of the session to the AMF. The first access node may receive a twelfth message indicating acceptance of the deactivation from the AMF. The first access node may send a third RRC message indicating the deactivation of the packet duplication of the session to the wireless device. The first access node may receive a fourth RRC message indicating a completion of the deactivation from the wireless device.

In an example, the AMF may send to an SMF, a thirteenth message in response to receiving eleventh message. The AMF may receive a fourteenth message indicating acceptance of the deactivation from the SMF.

In an example, the first access node may send a fifteenth message indicating the deactivation of the packet duplication of the session to a second access node. The first access node may receive a sixteenth message indicating a completion of the deactivation from the second access node.

In an example, the first access node may receive an eighteenth message for a duplication configuration supporting the session and a second session from the wireless device where the second session is duplication of the first session.

In an example, the first access node may send a nineteenth message for a duplication configuration supporting the session and a second session to the AMF, where the second session is duplication of the first session. The first access node may receive a twentieth message in response to the nineteenth message from the AMF.

In an example, the AMF may send a twenty first message for a duplication configuration supporting the session and a second session where the second session is duplication of the first session to an AMF. The AMF may receive a twenty second message in response to the nineteenth message from the AMF.

A first access node may receive a channel measurement information from a wireless device. The first access node may determine an activation of a packet duplication of a session of the wireless device based on the channel measurement information. The first access node may send a first message indicating an activation of the packet duplication of the session to an AMF. The first access node may receive a first non-access stratum (NAS) message indicating the activation of the packet duplication of the session from the AMF. The first access node may send a second NAS message indicating the activation of the packet duplication of the session to the wireless device.

In an example, the AMF may send a second message indicating the activation of the packet duplication of the session to an SMF. The AMF may receive a third message indicating an acceptance of the activation from the SMF.

In an example, the first access node may receive a fourth message indicating acceptance of the activation from the AMF.

In an example, the first access node may receive a third NAS message indicating an acceptance of the activation from the wireless device. The first access node may send a fourth NAS message indicating an acceptance of the activation.

In an example, the AMF may receive a fifth NAS message indicating the activation of the packet duplication of the session from an SMF. The AMF may send a sixth NAS message indicating an acceptance of the activation to the SMF.

In an example, a first access node may receive a channel measurement information from a wireless device. The first access node may determine a deactivation of a packet duplication of a session of the wireless device based on the channel measurement information. The first access node may send a fifth message indicating the deactivation of the packet duplication of the session to the AMF. The first access node may receive a seventh non-access stratum (NAS) message indicating the deactivation of the packet duplication of the session from AMF. The first access node may send an eighth NAS message indicating the deactivation of the packet duplication of the session to the wireless device.

In an example, the AMF may send a sixth message indicating the deactivation of the packet duplication of the session to an SMF. The AMF may receive a seventh message indicating an acceptance of the deactivation from the SMF.

In an example, the first access node may receive an eighth message indicating acceptance of the deactivation from the AMF.

In an example, the first access node may receive a ninth NAS message indicating an acceptance of the deactivation from the wireless device. The first access node may send a tenth NAS message indicating an acceptance of the deactivation to the AMF.

In an example, the AMF may receive an eleventh NAS message indicating the deactivation of the packet duplication of the session from an SMF The AMF may send a twelfth NAS message indicating an acceptance of the deactivation to the SMF.

In an example, a first access node may receive a channel measurement information from a wireless device. The first access node may determine an activation of a packet duplication of a session of the wireless device based on the channel measurement information. The first access node may send a first radio resource control (RRC) message indicating an activation of the packet duplication of the session to the wireless device. The first access node may receive a first non-access stratum (NAS) message indicating the activation of the packet duplication of the session from the wireless device. The first access node may send a second NAS message indicating the activation of the packet duplication of the session to an AMF.

In an example, the first access node may receive a second RRC message indicating acceptance of the activation from the wireless device.

In an example, the first access node may receive a third NAS message indicating acceptance of the activation from the AMF.

In an example, the first access node may send a fourth NAS message indicating acceptance of the activation from the wireless device.

In an example, the AMF may send a fifth NAS message indicating the activation of the packet duplication of the session to an SMF. The AMF may receive a sixth NAS message indicating an acceptance of the activation from the SMF.

In an example, a first access node may receive a channel measurement information from a wireless device. The first access node may determine a deactivation of a packet duplication of a session of the wireless device based on the channel measurement information. The first access node may send a third radio resource control (RRC) message indicating a deactivation of the packet duplication of the session to a wireless device. The first access node may receive a seventh non-access stratum (NAS) message indicating the deactivation of the packet duplication of the session from the wireless device. The first access node may send an eighth NAS message indicating the deactivation of the packet duplication of the session to the AMF.

In an example, the first access node may receive from the wireless device, a fourth RRC message indicating acceptance of the deactivation.

In an example, the first access node may receive from the AMF, a ninth NAS message indicating acceptance of the deactivation.

In an example, the first access node may send to the wireless device, a tenth NAS message indicating acceptance of the deactivation.

In an example, the AMF may send an eleventh NAS message indicating the deactivation of the packet duplication of the session to an SMF. The AMF may receive a twelfth NAS message indicating an acceptance of the deactivation from the SMF.

High reliability may be difficult to achieve by single path on user plane. A redundant transmission for services requiring low latency and high reliability may be essential. Depending on the condition of network deployment, e.g. which network function or network segments cannot meet the requirements of reliability, the redundant transmission may be applied on the user plane path between the UE and the network.

Existing or next generation wireless system (4G, 5G, fifth generation, NR, LTE, EPC, next generation core, and/or the like) may require low latency, low jitter and high reliability. Existing solutions may provide procedures for establishing, modifying or releasing one or more tunnels for redundant packet transmission on N3 interface for communication between an access node and user plane function and N9 interface for communication between user plane functions.

In an example, session duplication (and/or packet duplication) may be necessary or inefficient depending on network congestion status, network link reliability status, and/or radio link conditions. Configuring or releasing a duplicate session of an original session (a session) may require signaling messages among a wireless device, access nodes (gNBs, eNBs), and/or core network nodes (e.g. AMF, SMF, UPF, UDM, PCF, and/or the like). In an existing technology, configuration or release of session duplication in response to dynamically changing network status and radio conditions may increase signaling overhead among network nodes and/or may increase adaptation delay to current network status (e.g. enabling/disabling delay for session (packet) duplication). An existing technology may decrease packet transmission reliability and service quality of wireless devices. Instead of configuring or releasing packets (session) duplication setup, an implementation of example embodiments provides dynamic activation and/or deactivation mechanisms of a configured duplication of the packets (e.g. sessions), based on network status and radio conditions. An implementation of example embodiments provides how duplication activation/deactivation is achieved at the access node and at the entity in the core network (e.g. packet data unit session anchor (PSA) user plane function (UPF), user plane function, UPF). An implementation of example embodiments may decrease signaling overhead and/or decrease configuration latency for session duplication configuration/release by activating/deactivating configured packet duplication depending on network status and/or radio condition changes. An implementation of example embodiments may increase packet transmission reliability and service quality in the wireless network. An implementation of example embodiments may allow efficient use of network resources.

An example embodiment may provide solution for determining a need of a duplication of packets by the access node and mechanism to dynamically activate and deactivate duplication of the session at the access node. The duplication of uplink packets may be provided by the access node and the duplication of downlink packets may be provided by a user plane entity in the network (e.g. PSA UPF, UPF). An example embodiment may provide mechanism to configure a core network when the activation is triggered by the access node. Various transmission mechanisms may be employed to handle original and duplicated packets of the session between the entities (e.g. access node and PSA UPF) handling packet duplication and duplication elimination using same or separate paths. In an example, separate paths may be disjoint paths.

There may be one or more options for achieving redundancy depending on which path is exposed to possibility of a frequent failure. In an example, there may be a mechanism to ensure duplication over an air interface between a wireless device and one or more access nodes (e.g. base stations, gNBs, eNBs). An activation of duplication procedure or mechanism may provide duplicating packets of an original session in to copy of one or more sessions (second session) and transmitting packets of the first session and the second session over one or more user plane paths involving N3 interface, N9 interface and/or the like. An example embodiment may provide mechanism for duplication of a PDU session (first session) for uplink packets of the application at the access node and duplication elimination of the received downlink packets received from a wireless core network at the wireless device. An example embodiment may provide mechanism for duplication of the first session for downlink packets received from a data network and duplication elimination of the received uplink packets from the access node at a PSA UPF. A determination of the activation of duplication of the original PDU session may be done by the access node serving the original session. A mechanism to ensure transmission of duplicated packets between these two entities (access node and PSA UPF) may include the activation of duplication and/or an establishment of one or more tunnels between the access node and the PSA UPF.

In an example, a wireless device may set up one or more redundant PDU sessions (e.g., two redundant PDU sessions) over the 5G network, so that the network may attempt to make the paths of the two redundant PDU sessions independent whenever that is possible. In an example, upper layer protocols, such as the IEEE TSN (Time Sensitive Networking) FRER (Frame Replication and Elimination for Reliability), to manage the replication and elimination of redundant packets/frames over the duplicate paths which may span both the wireless network and possibly fixed network segments. Other upper layer protocols, including IP based ones such as a DetNet based solution may also be employed for redundant packet transmission over one or more paths or for managing a backup path in addition to the active path.

Figure 46:
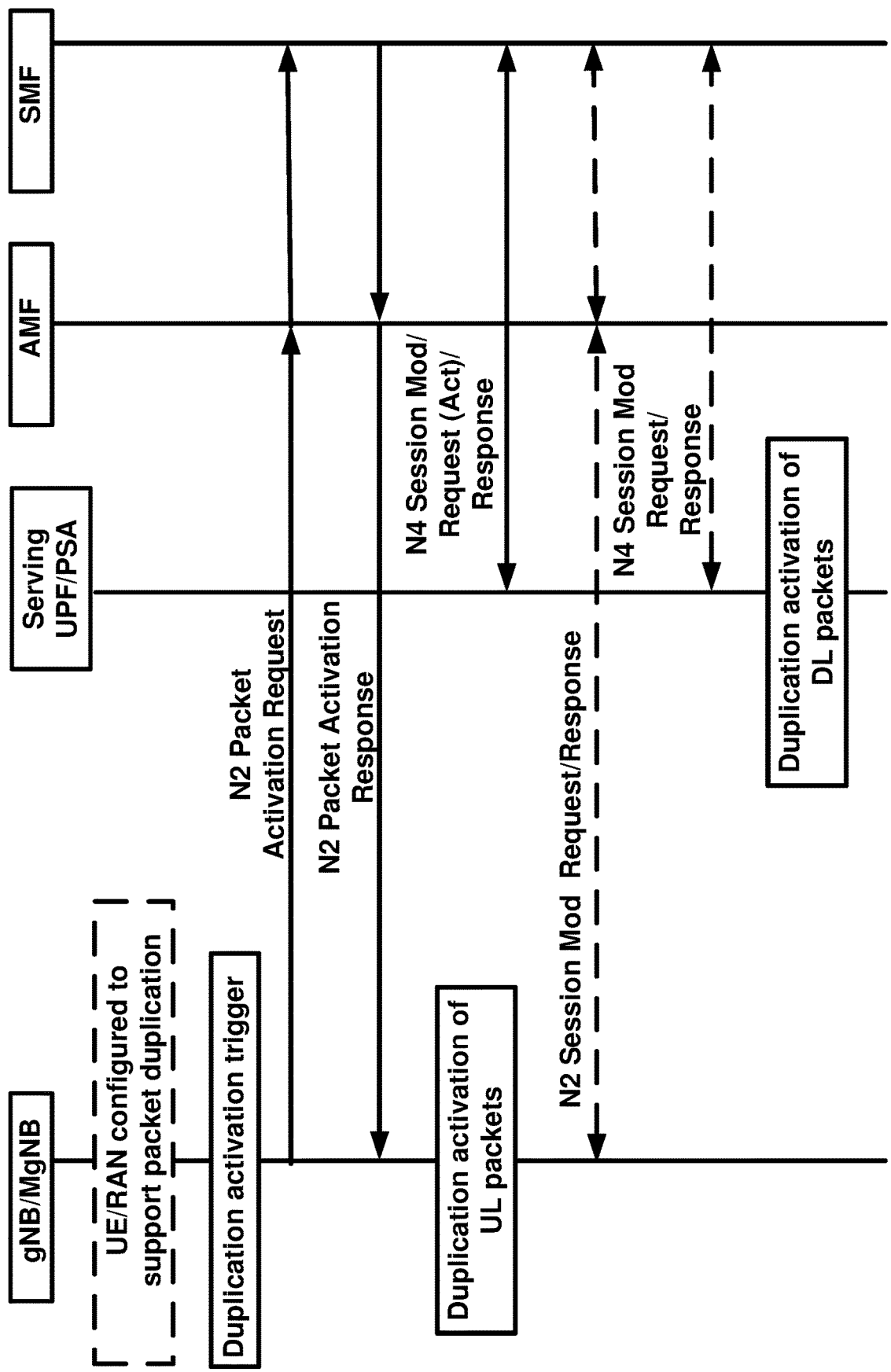
FIG. 46 illustrate call flows of different network configurations as per an aspect of an embodiment of the present disclosure.

In an example as illustrated in FIG. 46, a wireless network may provide two paths from the device: the first (packet data unit) PDU session spans from the UE via a first access node to a first UPF (UPF1) acting as the PSA UPF, and a second PDU session spans from the UE via a second access node to UPF2 acting as the PSA UPF. Based on these two independent PDU sessions, two independent paths are set up, which may span beyond wireless network. There are two paths set up between Host A in the device and Host B, with one or more intermediate nodes. The redundancy handling function (RHF) entities that may reside in Host A and Host B make use of the independent paths. The IEEE TSN FRER may be an example for an RHF. For Host A within the device, the two PDU sessions appear as different networking interfaces, making the host multi-homed. In an example, other solutions may be employed, where redundancy spans up to an intermediate node.

An example may be based on the dual connectivity feature that is supported both by LTE and NR. A single UE may have user plane connectivity with both the first access node (MgNB or first access node) and the second access node (SgNB or second access node). The radio access network (RAN) control plane and N1 interface may be handled via the MgNB. The MgNB may control the selection of SgNB and the setup of the dual connectivity feature via the Xn interface. The UE may set up (e.g., configure or establish) two PDU sessions, one via MgNB to UPF1 acting as a first PSAUPF, and another one via SgNB to UPF2 acting as a second PSA UPF. UPF1 and a second UPF (UPF2) may connect to the same Data Network (DN), even though the traffic via UPF1 and UPF2 might be routed via different user plane nodes within the DN. UPF1 and UPF2 are controlled by SMF1 and SMF2, respectively, where SMF1 and SMF2 may coincide depending on operator configuration of the SMF selection.

An example may differ from the RAN based Packet Data Convergence Protocol (PDCP) packet duplication function which may be internal to RAN, and the packet duplication takes place between the UE and the MgNB. The redundant paths may span the whole system including RAN and core network.

Two options may be provided for the selection of the UPFs and the gNBs. In an example, a static approach for UPF selection that may take place before the SgNB may be selected in RAN; this may be applicable to IP based PDU sessions, Ethernet based PDU sessions, non-IP based PDU sessions, unstructured PDU sessions, and/or the like. In an example, a dynamic approach for UPF selection, which enhances the static approach which may take into considerations the SgNB selected in RAN. This may be applicable to Ethernet PDU sessions.

The solution may comprise one or more SMFs. In an example embodiment, two SMFs may be employed. In an example, a single SMF may be employed. If two SMFs are employed, the SMFs may be aware that the sessions are redundant (e.g., one or more, or two distinct/disjoint sessions). In case of more than one SMFs are used, the SMFs may be configured to have different UPF pool for avoiding reuse of same UPF by different SMFs.

SMF(s) may be aware of redundant sessions using, e.g. UE providing indication regarding redundant PDU session and proper provisioning during UPF selection.

In an example, a wireless device may set up one or more redundant PDU sessions (e.g., request establishment/configuration) over the 5G network, so that the network may establish/configure separate, independent, and/or disjoint paths for one or more redundant PDU sessions. It may be possible to rely on upper layer protocols, such as the IEEE TSN (Time Sensitive Networking), to manage the replication and elimination of redundant packets/frames over one or more paths which may span both the wireless network and possibly fixed network segments. Other upper layer protocols, including IP based (e.g. DetNet) may be possible for redundant packet transmission over one or more paths or for managing a backup path in addition to the active path.

Figure 47:
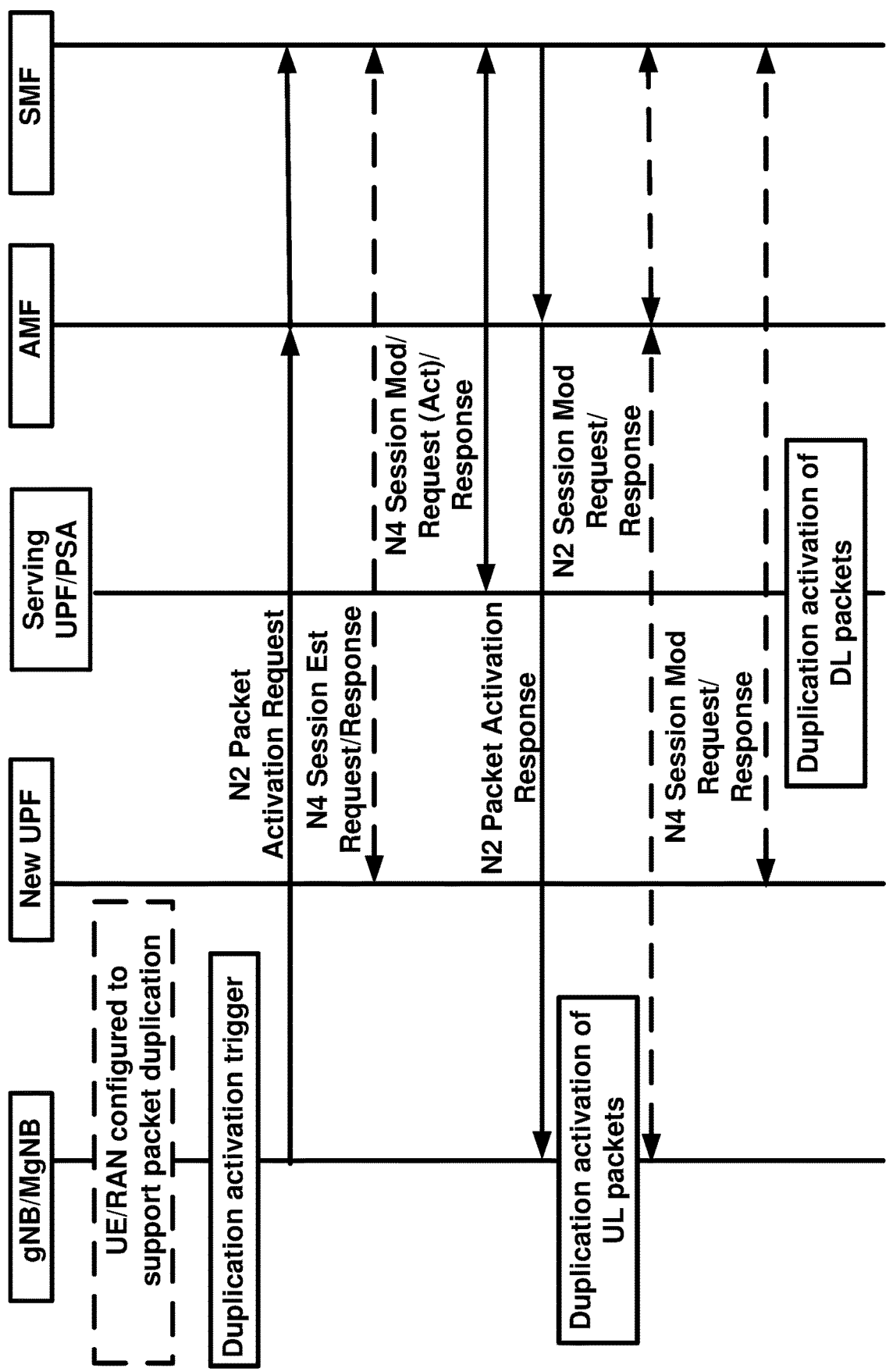
FIG. 47 illustrate call flows of different network configurations as per an aspect of an embodiment of the present disclosure.

In an example, a terminal device may be equipped with more than one UEs (wireless devices). In an example as illustrated in FIG. 47, when the terminal device may be equipped with two UEs, the first PDU session may span from a first wireless device (UE1) via gNB1 to UPF1, while the second PDU session may span from a second wireless device (UE2) via gNB2 to UPF2. Based on these two independent PDU sessions, two independent paths are set up, which may span even beyond the wireless network. In an example, there may be two paths set up between Host A and Host B, with some (optional) fixed intermediate nodes. The redundancy handling function (RHF) entities that reside in Host A and Host B make use of the independent paths. The IEEE TSN FRER may be an example of a RHF. For Host A within the terminal device, the two UEs may provide different networking interfaces, making the host redundantly connected. In an example, other solutions are also possible, where redundancy spans only up to an intermediate node and not to the end host.

In an example, an integration of one or more UEs into a device may be employed and may assume a RAN deployment where redundant coverage by one or more gNBs may be available. One or more PDU sessions may be set up from the UEs, which use independent RAN (gNB) and CN (UPF) entities. As illustrated in FIG. 47, UE1 and UE2 may be connected to gNB1 and gNB2, respectively and UE1 sets up a PDU session via gNB1 to UPF1, and UE2 sets up a PDU session via gNB2 to UPF2. UPF1 and UPF2 connect to the same DN, even though the traffic via UPF1 and UPF2 might be routed via different user plane nodes within the DN. UPF1 and UPF2 may be controlled by SMF1 and SMF2, respectively.

For handling the reliability grouping of UEs, a new system parameter UE reliability group (UE RG) may be defined. This parameter may be configured explicitly to the UE and sent in a registration request message to the network, it may be a part of the subscription or it may be derived from other system parameters (e.g., SUPI, PEI, NSSAI, RFSP) based on operator configuration. The UE RG parameter of one or more UE may be sent from AMF to a RAN (access node) when the RAN context is established, and maintained as part of the RAN context, so one or more gNBs may acquire knowledge about the reliability group of the connected UEs.

The reliability group of the RAN (cells of gNBs) entities may be pre-configured by an O&M system in RAN. It may be possible for gNBs to learn the reliability group neighboring cells as the Xn connectivity between the gNBs may be set up.

For connected mode mobility, the serving gNB may down-prioritize candidate target cells that belong to different reliability group than the UE. The UE may hand over only to cells in the same reliability group. If cells in the same reliability group are not available (UE is out of the coverage of cells of its own reliability group or link quality is below a given threshold) the UE may be handed over to a cell in another reliability group.

In case the UE connects to a cell in the wrong reliability group, the gNB may initiate a handover to a cell in the appropriate reliability group whenever such a suitable cell is available.

If redundant RAN coverage is available at a certain location, then UEs that belong to the same terminal device may connect to different gNBs based on the reliability group classification using the connected mode mobility.

In an example, redundant transmission may be employed over different physical transport paths in a core wireless network and RAN to enhance the reliability of upper layer service. Whether redundant transmission need to be activated for a QoS Flow may be decided by the SMF based on local policies for the DNN or S-NSSAI, or by the PCF based on its QoS requirement, UE's subscription and condition of network deployment.

Figure 35:
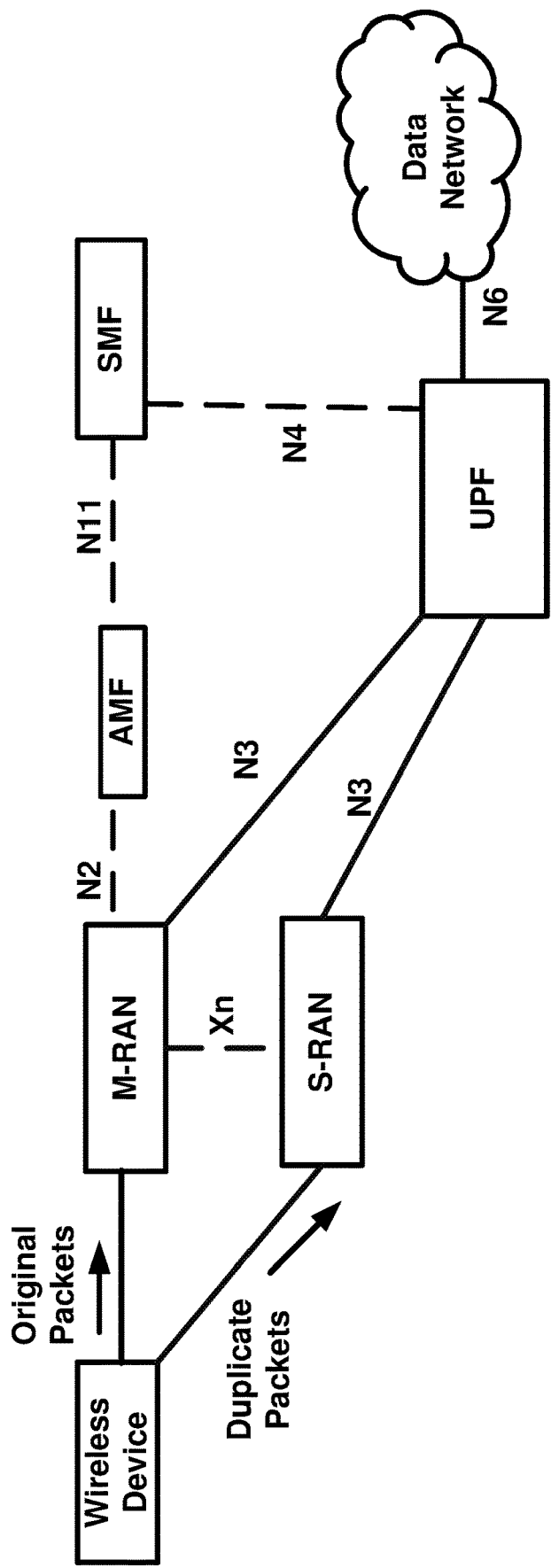
FIG. 35 illustrates an example for supporting redundant data transmission via single access node.

In an example illustrated in FIG. 35, it is assumed that the reliability of UPF and control plane functions may be high enough to fulfill the reliability requirement of ultra-reliable and low latency communication (URLLC) services served by these network functions (NFs), and the UE may be under overlapping coverage of the two RAN nodes. A single RAN node may not provide enough reliability in air interface for the QoS flow, so the redundant packets may be transferred between UPF and UE via two independent N3 tunnels and two RAN nodes to enhance the reliability of service.

To ensure the two N3 tunnels can be transferred via disjointed transport layer paths, the M-RAN (Master RAN) node, SMF or UPF may provide different routing information in the tunnel information (e.g. different IP addresses or different Network Instances), and this routing information may be mapped to disjoint transport layer paths according to network deployment configuration.

The redundant transmission may be based on the dual connectivity architecture, except that same packet is transferred via both M-RAN and S-RAN (Secondary RAN) nodes. With two different NG-RAN nodes (M-RAN and S-RAN), separate transport layer paths are employed for redundant data transmission in user plane. A high reliability protocol layer is implemented on the UE and UPF to support packet replication and elimination function.

Figure 49:
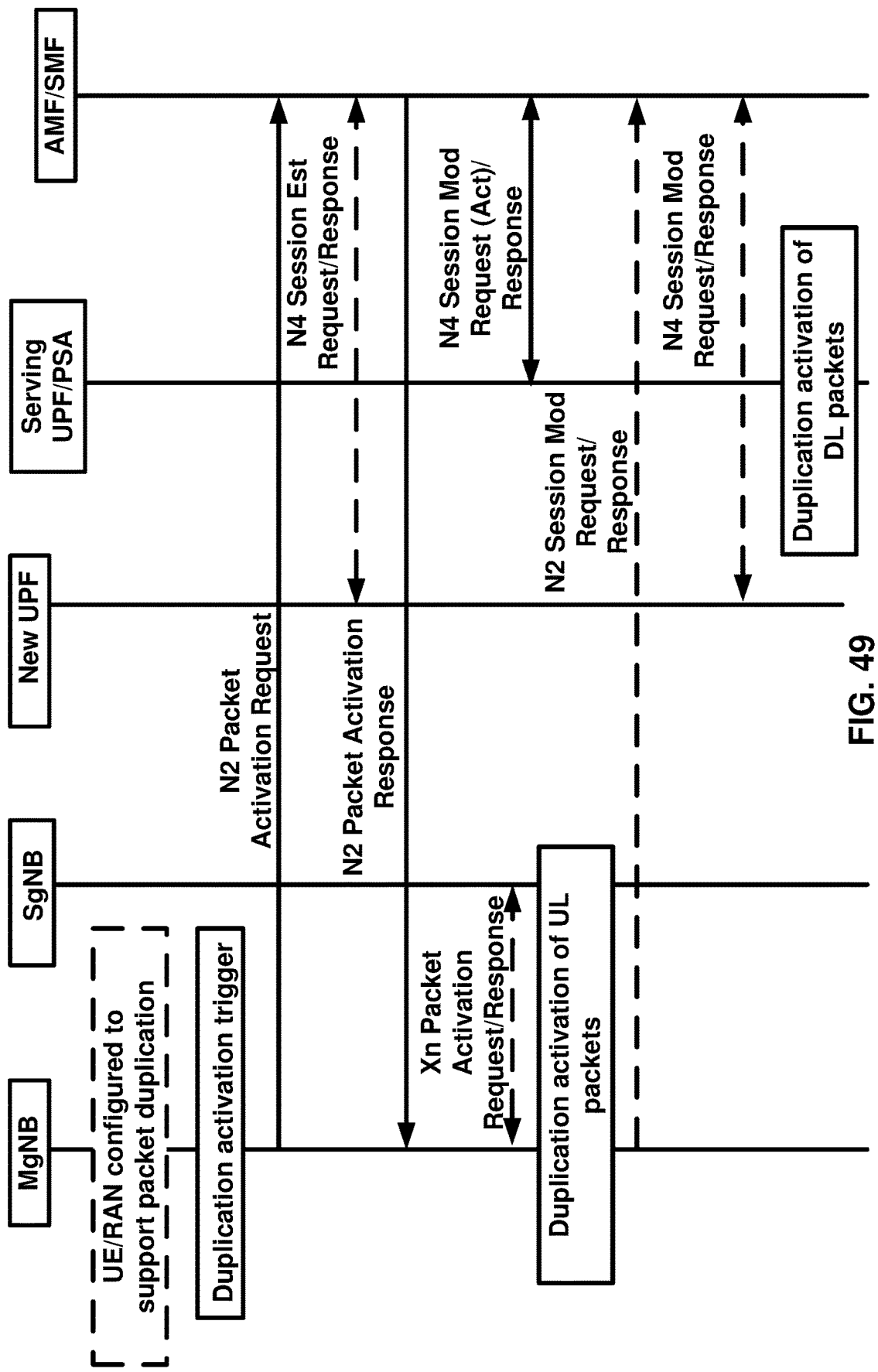
FIG. 49 illustrate call flows of different network configurations as per an aspect of an embodiment of the present disclosure.

In an example illustrated in FIG. 49, it is assumed that the reliability of NG-RAN node, UPF and control plane NFs may be high enough to fulfil the reliability requirement of ultra-reliable low latency services served by these NFs. The reliability of single N3 tunnel may not considered high enough, e.g. due to the deployment environment of backhaul network, so the redundant packets may be transferred between UPF and RAN via two independent N3 tunnels, which may be associated with a single PDU session, over different transport layer path to enhance the reliability of service.

To ensure the two N3 tunnels may be set via disjointed transport layer paths, the M-RAN node, SMF or UPF may provide different routing information in the tunnel information (e.g. different IP addresses or different Network Instances), and this routing information may be mapped to disjoint transport layer paths according to network deployment configuration.

In an example, the redundant transmission may be set based on two N3 tunnels between a gNB and the UPF. The RAN node and UPF may support the packet replication and elimination function.

Packet replication and elimination may be realized by modifying the GTP-U protocol. In case of downlink traffic, the UPF replicates the packet from the DN and assigns the same GTP-U sequence number to them for the redundant transmission. These packets are transmitted to the NG-RAN via the N3 Tunnel 1 and the N3 Tunnel 2 separately. For eliminating the duplicated packet, the NG-RAN may forward the packet received first from either tunnel to the UE and may drop the replicated packet which has the same GTP-U sequence number as the forwarded packet.

In case of uplink traffic, the NG-RAN may replicate the packet and may assign the same GTP-U sequence number to them and the UPF may eliminate the duplicated packet based on the GTP-U sequence number.

Figure 48:
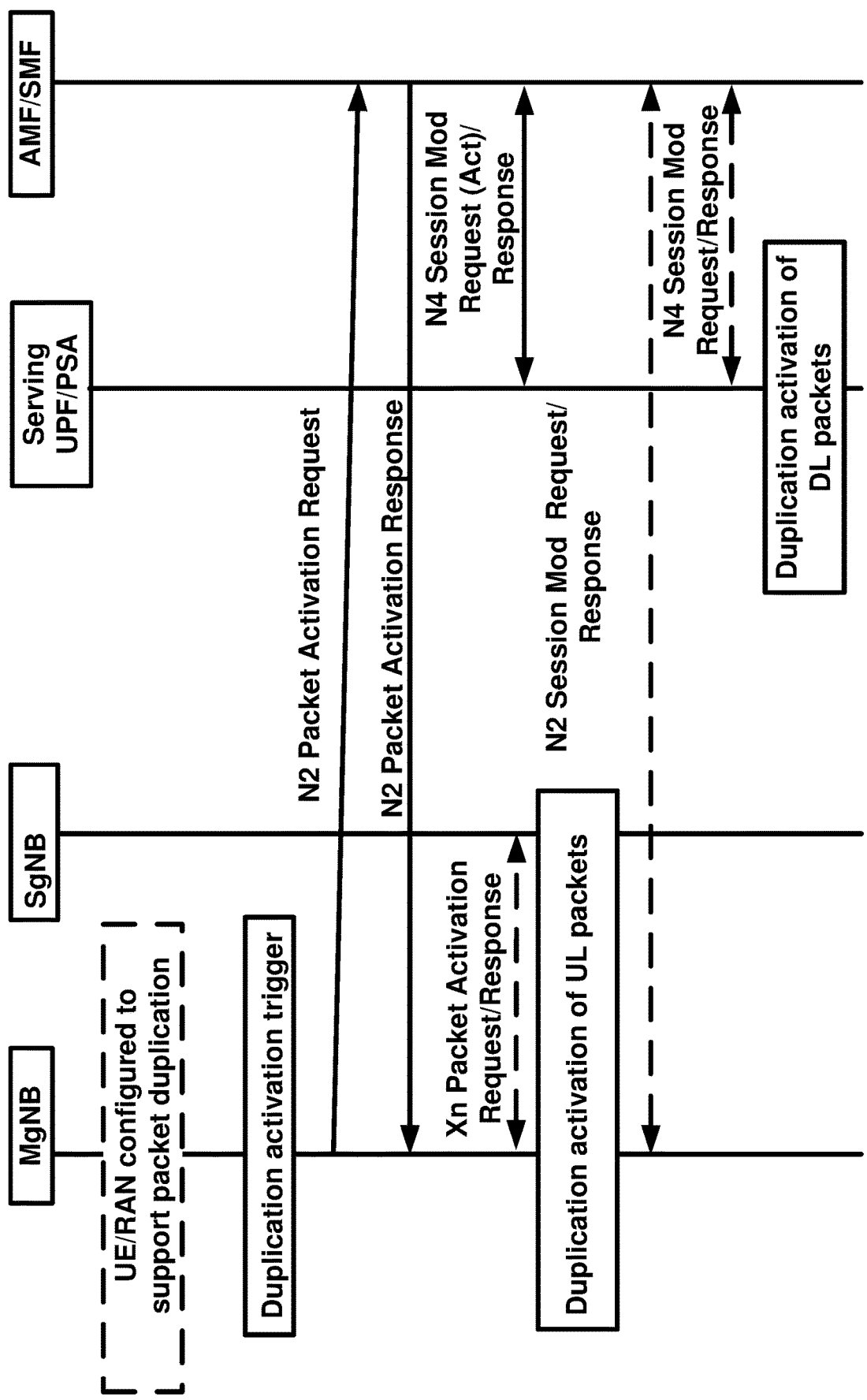
FIG. 48 illustrate call flows of different network configurations as per an aspect of an embodiment of the present disclosure.

In an example illustrated in FIG. 48, two separate paths may be extended by inserting two Intermediate UPFs (I-UPFs) between the UPF acting as the PDU session Anchor and the NG-RAN to support the redundant transmission based on two N3 and N9 tunnels between a single NG-RAN mode and the UPF. The RAN node and UPF may support the packet replication and elimination function.

Figure 36:
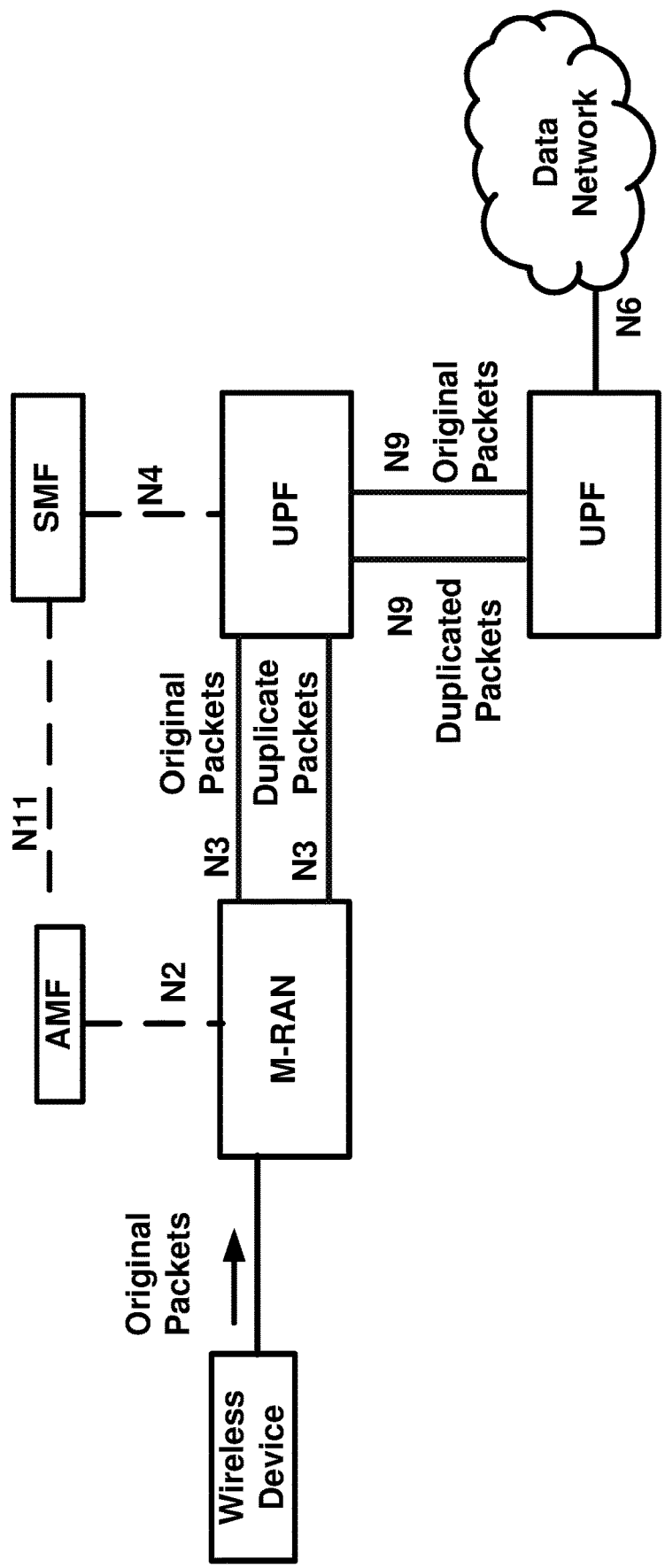
FIG. 36 illustrates an example where the packet duplication may be supported over an N3 interface and an N9 interface.

In an example illustrated in FIG. 36, there may be two N3 and N9 tunnels between NG-RAN and UPF for redundant transmission. In an example, the UPF interfacing the DN, may act as the traffic distributor for downlink traffic and this UPF may duplicates the packet of the URLLC service from the DN and may assign the same GTP-U sequence number to them. These duplicated packets may be transmitted to I-UPF1 and I-UPF2 via N9 Tunnel 1 and N9 Tunnel 2 separately. One or more I-UPFs may forward the packet with the same GTP-U sequence number which may be received from the UPF to NG-RAN via N3 Tunnel 1 and N3 Tunnel 2 respectively. The NG-RAN may eliminate the duplicated packet based on the GTP-U sequence number. In an example, for uplink traffic, the NG-RAN may act as the traffic distributor. The NG-RAN may duplicate uplink packets of the URLLC service for the UE and the UPF may eliminate the duplicated packet.

An example solution may reduce latency and jitter caused by the data forwarding and/or data path switch in a core network due to handover. A user plane tunnel may be established and employed to transmit data if the DRB is established. This procedure may be referred to as enhanced handover.

In an example, the enhanced handover may be dynamically provisioned at the SMF from an UDM or PCF during PDU session establishment procedure. In an example, the enhanced handover may be statically preconfigured in SMF. The SMF may retain the information (e.g., PDU session identifiers, type, and/or the like) essential for supporting enhanced handover for PDU sessions it may control.

When a handover is triggered by source RAN node, the SMF may duplicate the tunnel for the PDU session which may be associated to enhanced handover. The SMF may send the downlink data to source RAN and target RAN node until the handover may be completed.

In an example depicted in FIG. 49, a UE may be connected to source RAN (S-RAN) and has a PDU session established with a remote PDU session anchor (PSA1). The network may have inserted a source uplink classifier (S-ULCL) that directs selected traffic to a local PDU session anchor (PSA2). The traffic flows exchanged via PSA-2 may be terminated in a source application server (S-AS) which is a user plane entity (e.g. content distribution server) that may be controlled by an AF.

At some point, a UE may be handed over to the target RAN (T-RAN). In an example, upon instantiation of the target uplink classifier (T-ULCL) a N9 forwarding tunnel may be created between the source uplink classifier (S-ULCL) and the T-ULCL.

The N9 forwarding tunnel may be maintained until all active traffic flowing on it ceases to exist for a configurable duration. T-ULCL may be configured with packet filters that may force uplink traffic from existing sessions (between UE and Source AS) on the path involving T-RAN-T-ULCL-S-ULCL-PSA2. The S-ULCL may be configured to forward all downlink traffic for this UE coming from S-AS into the N9 forwarding tunnel towards T-ULCL.

In an example, T-ULCL may be configured with packet filters that force any new DNS requests (relating to the local DN) to go to the new local DN (via PSA3).

In an example, T-ULCL may be configured with packet filters that force any traffic related to the target application server (T-AS) in the new local DN (e.g. identified by a match between the destination IP address of uplink packets and the IP address of T-AS) to go to the new local DN (via PSA3).

In an example, T-ULCL may be configured with packet filters that may let any remaining traffic go to the remote PDU session anchor (PSA1).

SMF may send a late notification to AF to inform it about the DN access identifier change (i.e. change of local PSA). Based on this notification the AF may trigger the S-AS to use upper layer (e.g. IP level or HyperText Transfer Protocol (HTTP) level) mechanisms to redirect the ongoing traffic sessions towards a server in the new local DN (i.e. towards Target AS).

In an example, a replicator may be defined that allows a wireless system to be aware (e.g. detect or have explicit information) that two or more "streams" of replicated packets belong together, and may guide the lower layers to ensure these packets get an optimized treatment in the wireless system depending on whether the streams are terminated in a single UE or by two different UEs that belong together within the same hub-solution (e.g. TSN hub with two or more redundant 5G modems). In an example, the replicator may be applicable to any external multi-path mechanism even if one or more paths may not be employed for duplicating one or more packet on all paths but for partly or fully disjoint data transmission.

In an example, an entity/functionality referred as a replicator functionality, may be able to detect one or more related flows, and whether they are utilized for redundant packets, of incoming IP/Ethernet flows at the transmitter side. Control plane aspects necessary for the replicator functionality may reside in the SMF and the user plane aspects necessary for the replicator functionality may reside in the UPF.

In an example, the replicator may guide the lower layers to ensure their corresponding latency/availability/reliability requirements are fulfilled. The replicator may forward the received replicas to the lower layers, by adding a header or other type of indication that tells the lower-layers to treat the packets as uncorrelated as possible. In an example, the replicator may include manipulation of the incoming data, e.g. combining, excluding, or further replicating (among other operations) the incoming packets. For instance, create 3 packets based on the two incoming replicas and make sure they are scheduled correctly. It may only forward a single or a subset of the packets to the lower-layer but scaling appropriately the QoS constraint to be fulfilled by the lower layers.

To ensure the two N3 tunnels can be transferred via disjointed transport layer paths, the RAN node, SMF or UPF may provide different routing information in the tunnel information (e.g. different IP addresses or different network instances), and the routing information may be mapped to disjoint transport layer paths according to network deployment configuration.

At the receiver side, the receiver may translate and forward the internal streams to the corresponding external network(s). To make it transparent to the external network(s), further combine, remove or replicate operations may be applied. The replicator at the receiver may use the header information (or share explicit information with the replicator entity at the other end) to translate or re-build packets according to the external network(s) requirements. In an example, for redundant transmissions, all the duplicated packets may be forwarded to the receiver host to ensure correct performance of the protocol, even if only a single packet was transmitted over the radio network. In an example, for TSN applications, where the wireless system acts as a TSN ethernet bridge, the wireless system may need to forward a lower, equal or larger number of packets to the receiver host.

Figure 50:
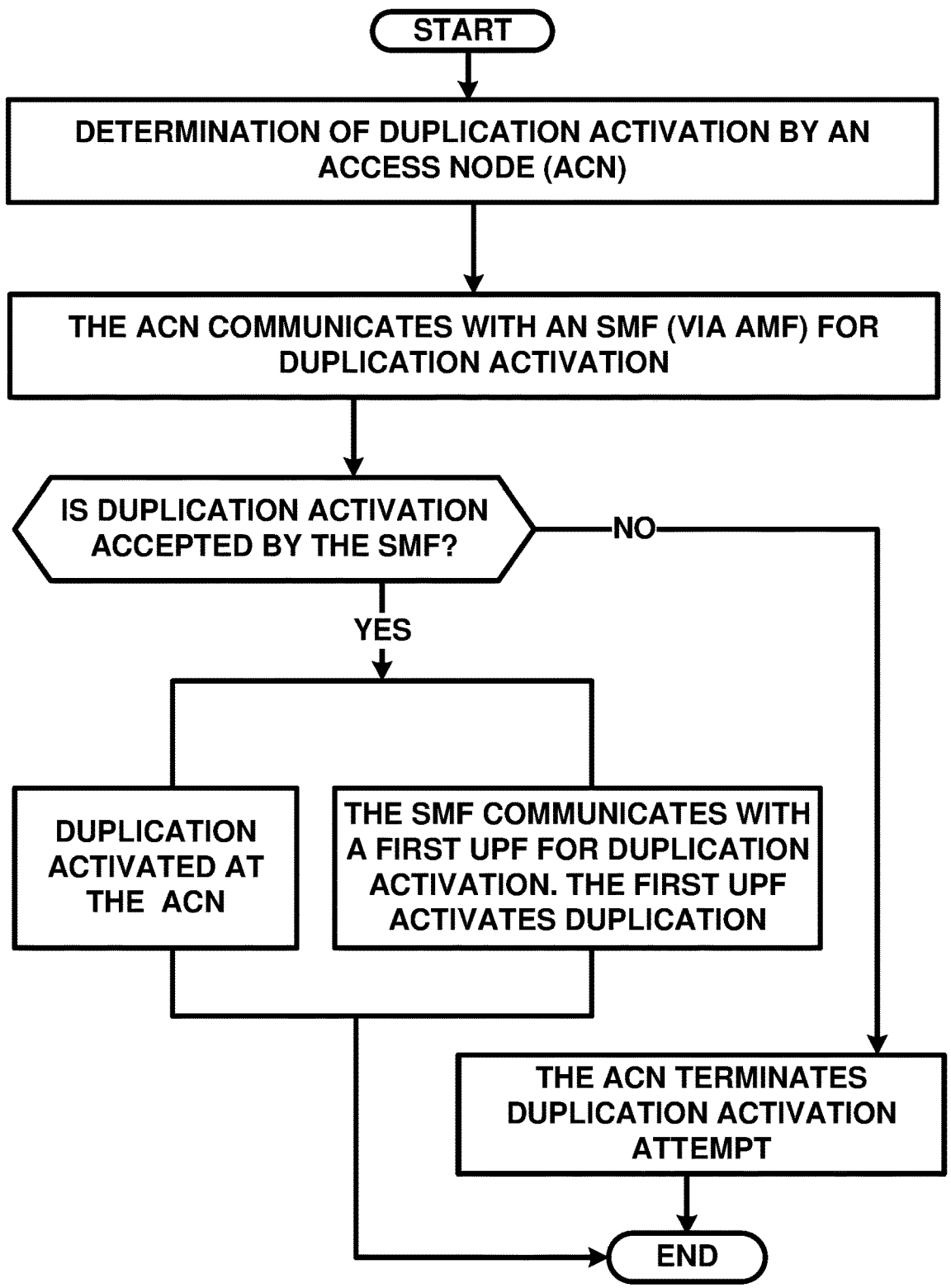
FIG. 50 illustrates an example flow chart as per an aspect of an embodiment of the present disclosure.

An example FIG. 50 shows the user-plane system architecture. In an example, the replicator functionality may be a part of the UPF (or collocated with the UPF) for user plane functionality and SMF for control plane functionality. Multi-UE transceiver may be considered that encompasses various UEs with independent hardware and protocol stacks. One or more gNBs may consist of one or more distributed units attached to a central unit.

In an example embodiment, terms of packet duplication, duplication of packets, packet replication, packets copy, copy of packets may be used interchangeably. The terms may refer to one or more copies of packets of the first session. In an example, packet duplication may mean session duplication (e.g. duplication of packets may be interpreted as duplication of a session of the packets).

In an example, the first access node may determine that packet duplication of one or more sessions (e.g., PDU sessions) supported by the wireless device may be required. The determining may be based on one or more criteria. The first access node may be the access node controlling an original session (first session). In an example, one or more criteria may comprise at least one CSI report received from the wireless device. In an example, the one or more criteria may comprise a measurement report (e.g. RRC layer message) received from the wireless device, the one or more received signal (e.g. sounding reference signal (SRS)) from the wireless device, and/or the like.

In an example, the first access node may comprise a wireless network node, e.g., an integrated access and backhaul (IAB) node as a base station (gNB, eNB) (e.g. comprising at least one of RRC, SDAP, PDCP, RLC, MAC, PHY sublayer functions and/or adaptive layer functions) and/or as a base station distributed unit (gNB-DU) (e.g. comprising at least one of RLC, MAC, PHY and/or adaptive layer functions). The first access node may determine the packet duplication (e.g. activation/deactivation of the packet duplication) based on wireless backhaul link conditions. In an example, N3 interface and/or N9 interface may comprise wireless backhaul link of the first access node. In an example, N3 interface may comprise the wireless backhaul link if the first access node comprises a base station and/or a base station distributed unit. In an example, N9 interface may comprise the wireless backhaul link if the first access node comprises UPF functions of one or more child nodes. The child nodes are IAB-nodes in the lower hierarchy of IAB architecture, directly communicating with wireless devices via wireless access links. The child nodes may communicate with other IAB-nodes via wireless backhaul links.

The wireless backhaul link condition of the first access node may comprise at least one of reference signal received power (RSRP) and/or reference signal received quality (RSRQ) of reference signals (e.g. synchronization signal, CSI-RS, DMRS, and/or the like) received from one or more donor nodes (e.g. IAB-donor node, base station central unit, gNB-CU, base station). The donor node is an access node which may provide wireless device's interface to wireless core network and wireless backhauling functionality to IAB nodes. The first access node may receive information of the wireless backhaul condition from the one or more donor nodes (e.g. IAB-donor node). The information received from the one or more donor nodes may comprise one or more elements of a CSI report and/or a measurement report of the first access node and/or RSRP/RSRQ of uplink reference signal (e.g. sounding reference signal, SRS) from the first access node. The first access node may receive an indication requesting activation/deactivation of the packet duplication from the one or more donor nodes (e.g. IAB-donor node). The one or more donor nodes may determine the packet duplication based on a CSI report of the first access node and/or RSRP/RSRQ of uplink reference signal (e.g. sounding reference signal, SRS) from the first access node.

In an example, the second access node may comprise a wireless network node, e.g., an IAB-node. The first access node may receive backhaul link radio condition of the second access node from the second access node. The backhaul link radio condition may comprise at least one of RSRP/RSRQ, CSI report, measurement report, and/or radio condition information of the second access node. In an example, the first access node may determine the packet duplication (e.g. activation/deactivation of the packet duplication) based on the backhaul link radio condition.

In an example, the wireless device may send a channel state information (CSI) report to the first access node. In an example embodiment, the CSI may be a channel measurement information. The CSI may comprise one or more parameters comprising a rank indicator (RI), a precoding matrix index (PMI), a channel quality indicator (CQI), a precoding type indicator (PTI), and/or the like. The wireless device may represent UE, wireless equipment, Integrated Access and Backhaul (IAB)-node, and/or like. The first access node and a second access node mentioned in an example embodiment may represent base station, gNB, gNodeB, eNB, eNodeB, RAN, NR, microcell, IAB donor, IAB-node, master base station, MgNB, MeNB, secondary base station, SgNB, SeNB, and/or like.

The wireless device may perform CQI, PMI, RI measurements and may report the measurements to the first access node. The RI may comprise information on a channel rank and indicate the number of streams that may be received via a time-frequency resource (e.g., the same time-frequency resource). The RI may be determined by long-term fading of a channel, and may be fed back at a cycle e.g., longer than that of PMI or CQI. The PMI may represent a value reflecting a spatial characteristic of a channel and may indicate a precoding matrix index of the first access node preferred by the wireless device based on a metric of signal to interference plus noise ratio (SINR). The CQI may represent information indicating strength of a channel and/or may indicate a reception SINR that may be obtainable when the first access node employs a PMI. The CQI may represent the CSI for sub-band and/or wide-band. The UE (the wireless device) may measure the reference signal in downlink and/or may map it to the CQI indices that may have one or more values.

According to transmission mode of the wireless device, one or more CQI, PMI, and/or RI may be transmitted. Periodic transmission of CSI may refer to as periodic reporting and transmission of CSI at the request of the first access node may refer to as aperiodic reporting.

In aperiodic reporting, the first access node may transmit a request bit included in uplink scheduling information to the wireless device. The wireless device may transmit CSI considering transmission mode thereof to the first access node, e.g. through a physical uplink shared channel (PUSCH). In periodic reporting, a period of CSI and/or an offset (e.g. timing offset) at the period may be signaled in a unit of subframes by a semi-static scheme through a higher-layer signal (e.g. an RRC message, a MAC CE, and/or a DCI) per wireless device. Precoding type (PTI) value in CSI report indicates type of CSI reporting provided by the wireless device.

In an example, determining that a packet duplication for one or more sessions is required, may be based on at least one of a quality of service (QoS) requirement of the one or more session, traffic load at the first access node and/or the traffic load of the second access node, service type of the session, a network operator policy, and/or the like.

In an example, the measurement report may comprise reference signal received power (RSRP) and/or reference signal received quality (RSRQ) of one or more cells of the first access node (and/or the second access node), RSRP and/or RSRQ of one or more beams (e.g. synchronization signal (SS)/PBCH beam, CSI-RS beam, and/or the like) of one or more cells of the first access node (and/or the second access node). In an example, if the RSRP and/or the RSRQ is equal to or lower than a threshold value (e.g. RSRP<α dB and/or RSRQ<β dB), the first access node may determine that packet duplication of the one or more session may be required.

In an example, if received power and/or received quality of one or more sounding reference signals (SRS) of the wireless device is equal to or lower than a threshold value (e.g. received power of SRS(s)<γ dB and/or received quality of SRS(s)<δ dB) the first access node may determine the need of packet duplication of the one or more sessions.

In an example, packets of first session may be transmitted via N3 interface using GTP-U tunnel (e.g. N3 interface, S1 interface, N9 interface, GTP tunnel, GTP-U interface, GTP-U protocol, GTP protocol, GTP interface) between the first access node and the PSA UPF. A control protocol (GTP-C) may be employed to manage the GTP-U tunnel. In the example, function of duplication of packets and duplication elimination (DPDE) for duplicating and removing (e.g. discarding, deleting, getting rid of) duplication of packets by the first node and the PSA UPF that may reside in the wireless system.

In an example embodiment, DPDE function (DPDEF) may represent functionality provided for packet duplication and/or packet elimination (e.g. removal, discard, delete). This DPDEF in the first node may be responsible for duplicating uplink packets and removing duplication of downlink packets. The PSA UPF may be responsible for duplicating downlink packets and removing duplication of uplink packets.

In the example, the packet duplication may be supported by the first access node and the PSA UPF by duplicating packets of the first session sent via a GTP-U tunnel (e.g. N3 interface, S1 interface, N9 interface, GTP tunnel, GTP-U interface, GTP-U protocol, GTP protocol, GTP interface) between the first access node and the PSA UPF. Duplicated packets (second packets) of the first session may have same sequence number as corresponding packets of the first session. As shown in an example FIG. 38, the GTP layer of the first node and GTP layer of the PSA UPF may be responsible for including GTP header to the packet (PDU or data) transmitted over the GTP tunnel and removing GTP header from the packet received over the GTP tunnel. The GTP-U layer of the first access node may include a sequence number to the uplink packet (PDU or data) for in sequence transmission. The GTP-U layer of the first access node may include a sequence number to the downlink packet (PDU or data) for in sequence transmission. The sequence number may be handled on a per GTP-U tunnel basis by the first access node for uplink packets. The sequence number may be handled on a per GTP-U Tunnel basis by the PSA UPF for downlink packets. In an example, the first node and the PSA UPF may generate the sequence number autonomously per GTP-U tunnel. In an example, the first node and the PSA UPF may use sequence number provided by external entities (e.g. control functions, higher protocol layer and/or lower protocol layer). The sequence number may be unique per GTP-U tunnel. One or more packets transmitted via the GTP-U tunnel between one or more node of the wireless system (e.g. intermediate UPFs, fixed nodes, relays) may relay same received sequence number of packets to a destination entity (e.g., the first access node, an UPF, one or more intermediate UPFs, the PSA UPF, fixed nodes, relays, and/or the like).

A duplication information comprising guidelines, parameters, filed, rules and/or the like may require for elimination of redundant packets of duplicated packets. The duplication information may be exchanged between the first access node and the PSA UPF handling DPDEF in the network to facilitate duplicate elimination (e.g. discarding duplicated packets and/or redundant packet(s) of a duplicated session). In an example, the first access node may employ separate message to exchange (e.g. N2 session activation request, N2 session modification request, N2 session update message, and/or the like) the duplication information with the SMF and the SMF may transmit the duplication information to the PSA UPF. In an example, the duplication information may be piggybacked with initial duplication activation related exchange handling DPDEF in the peer DPDEF entity. In an example, the duplication information may be exchanged with the peer DPDEF entity at the time of a session establishment of the first session. In an example, if the SMF receives the duplication information from the first access node via a control protocol (e.g. N2 interface, mobility management interface, session management interface, N11 interface, session management protocol, SM context information, and/or the like), the SMF may transmit the received duplication information to the PSA UPF. In an example, the duplication information may be transmitted using GTP control protocol (e.g. GTP-C).

In an example, the first access node may modify transport header of packets of the first session and/or the second session to define a field such as path id, connection id, list of intermediate nodes (e.g. access node and/or UPF via which the packets are transmitted), and/or the like. In an example, the first access node may determine how the field(s) of the transport header of packets of the first session may be employed and notify the peer DPDEF prior to packet duplication activation.

In an example, the first access node may employ existing transport header field of the packets of the first session and/or the second session for duplication such as type of service, and/or the like. The first access node may notify the peer DPDEF about how the transport header fields of the first session are employed.

In an example, transmission of packets of the first session and the second (duplicated) session may be realized using a frame (packet) replication and elimination (e.g. discarding, deleting) for reliability (FRER) mechanism standardized in IEEE 802.1. The FRER mechanism may be applicable at end devices (e.g. UE(s), peer FRER host, FRER client, FRER server) or collocated with entities within a network (e.g. access nodes, PSA UPF, first UPF, second UPF). Uplink packets of the first session may be duplicated, and sequence numbers may be added to the packet headers. A duplicate/copy/replica of the packets may be forwarded via disjoint paths (e.g. different access nodes, different UPFs, and/or different tunnels) in the network. At PSA UPF in the core network, the duplicate packets may be identified based on the sequence numbers, and one copy (e.g. one of original packet and duplicated packet) may be forwarded toward a data network. In an example, a duplicate copy (e.g. duplicated packets) of the first session may be eliminated. The ordering of the packets may be maintained at the PSA UPF in the core network based on a sequence numbering rule/algorithm. An FRER entity (e.g. first access node, second access node, PSA UPF, first UPF, second UPF, and/or the like) may be employed to replicate and/or eliminate packets for downlink and/or uplink transmission. The FRER functionality and/or information of paths may be setup or configured between the FRER entities (e.g. first access node, second access node, PSA UPF, first UPF, second UPF, and/or the like) using protocols such as FRER handshake protocol, combination of N2 and N4 protocols, GTP-C protocol, user plane protocol, application protocol over HTTP, in-band signaling, and/or the like.

In an example, transmission of original and the second sessions may be realized by using a multipath transport control protocol (MP-TCP, multipath TCP, MP TCP and/or the like) mechanism standardized in IETF. The multipath transport control protocol may allow TCP connection to employ one or more (multiple) paths using an inverse multiplexer enabling a data stream to be broken into one or more (multiple) lower data rate communication links. In an example, MP TCP functionality may be present in the first access node and in the network (e.g. in PSA UPF, proxy over an N6 interface, and/or the like). An information for paths for transmitting packets of the first session and packets of the second session between two MP TCP entities (e.g. wireless device, proxy, MP TCP, proxy, and/or the like) may be communicated prior to packet duplication activation using TCP three-way handshake. In an example, protocols such as FRER handshake protocol, combination of N2 and N4 protocols, GTP-C protocol, user plane protocol, application protocol over HTTP, in-band signaling, and/or the like may be used for paths and path set up.

In an example, transmission of the first session and/or the second session may be realized by using a multipath quick user datagram protocol internet connections (QUIC) (e.g. MP-QUIC, MP QUIC, multiple QUIC, and/or the like) mechanism standardized in IETF. This protocol may allow user datagram protocol (UDP) connection to use one or more paths using multiplexes data streams having reduce or compress redundant data transmissions. In an example, MP QUIC functionality may be present in the first access node and in the network (e.g. in PSA UPF, proxy over an N6 interface, and/or the like). An information of paths for transmitting packets of the first session and packets of the second session between two MP QUIC entities (e.g. wireless device, proxy, MP QUIC proxy, and/or the like) may be communicated prior to packet duplication activation using cryptographic handshake. In an example, other protocols such as FRER handshake protocol, combination of N2 and N4 protocols, GTP-C protocol, user plane protocol, application protocol over HTTP, in-band signaling, and/or the like may be used for paths and path set up. Lost packets carrying data for an individual stream may impact only that specific stream.

In an example, transmission of the first session and the second session may be realized by using multipath protocols such as concurrent multipath routing, capillary routing, and/or the like between the first access node and the PSA UPF.

In an example, transmission of the first session and the second session may be realized by using combination of protocols between the first access node and entity in the wireless network. Example of these protocols include combination of N2 protocol (mobility management protocol, S1-MME, and/or the like) and N4 interface (Sx interface, openflow interface, and/or the like), GTP-C protocol, GTP-U protocol and/or the like.

In an example, the first session and/or the second session may be established via different network nodes (e.g. different access nodes and/or different UPFs). In an example, the first session may be established for the wireless device, via the first access node, and a first UPF, and the second session may be established for the wireless device, via the second access node, and a second UPF (and/or the first UPF). A network node may forward/transmit/send original packets of the first session to a next network node where the first session is established. A network node may forward/transmit duplicated packets of the duplicated session (e.g. the second session) to a next network node where the duplicated session (e.g. the second session) is established.

Figure 45:
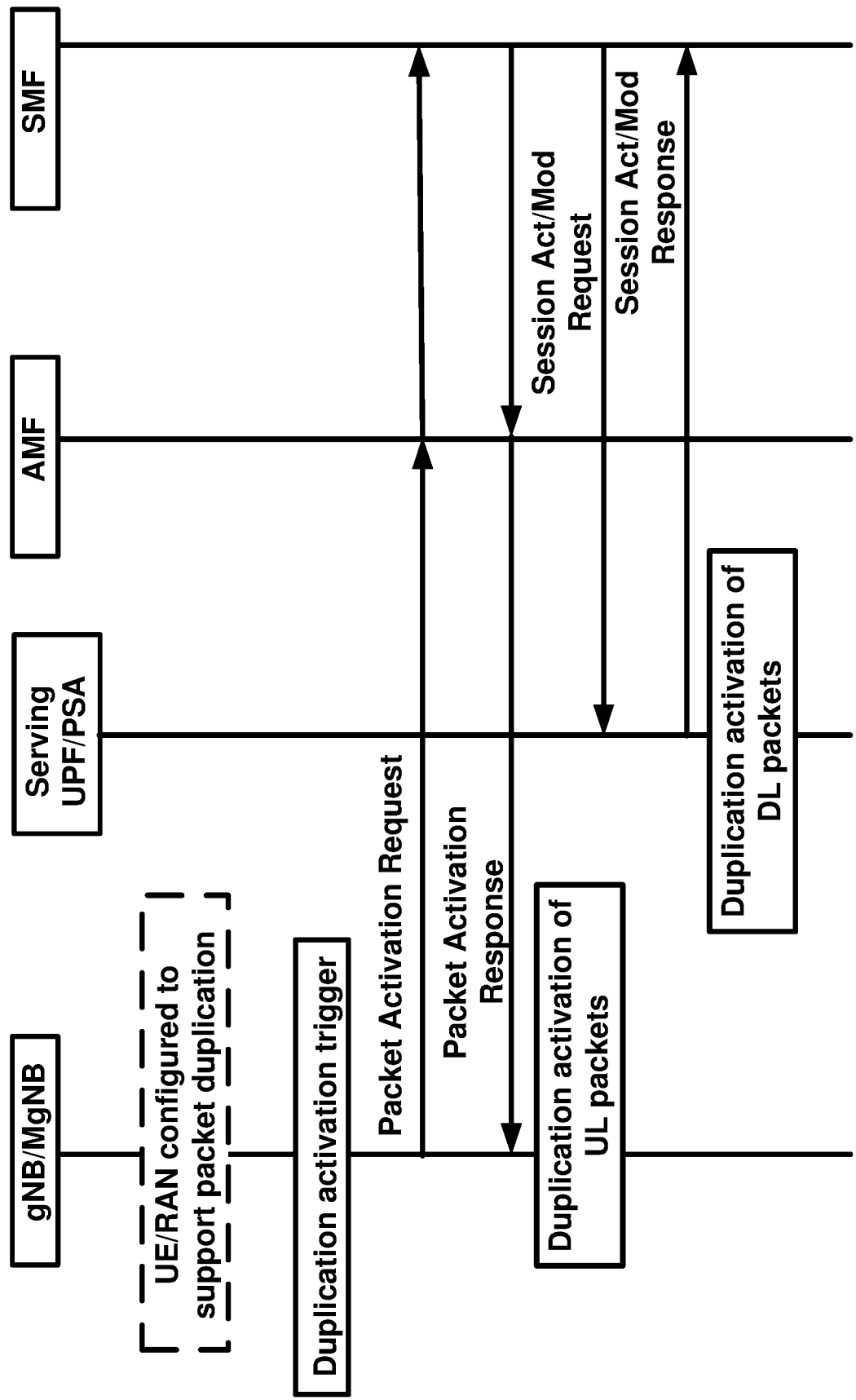
FIG. 45 illustrate call flows of different network configurations as per an aspect of an embodiment of the present disclosure.

As illustrated in example FIG. 45, in response to determining the need of having packet duplication of one or more sessions of the wireless device, the first access node may send an indication to an access and mobility management function (AMF) requesting to activate packet duplication of the one or more sessions (e.g. the first session).

In an example, the first access node may piggyback request (an indication) to activate packet duplication in a message (e.g. NG message, S1 message, PDU session resource modification indication message, PDU session resource modification response message, PDU session resource notify message, E-RAB modification indication message, E-RAB modify response message, and/or the like) sent from the first access node to the AMF.

In an example, the AMF may forward the received request to activate packet duplication to a session management function (SMF). The SMF may determine support (e.g. allowance, acceptance, enabling, activation) of duplication (e.g. duplication activation) based on information in a unified data management (UDM) for a user, a type of service supported by the first session, a current traffic condition at the first UPF controlled by the SMF, a load information of the UPF, static/dynamic capacity information of the UPF, traffic conditions of one or more UPFs (e.g. via which the first session and/or the duplicated session (the second session) is established), a core network configuration, a current resource availability, one or more policy rules received from a policy control function (PCF), one or more operator policies configured at the SMF and/or the like. The result of the activation of packet duplication is sent to the AMF using N2 (mobility management protocol, S1-MME, and/or the like) protocol. In an example, the SMF may receive traffic condition information from the first UPF and/or the one or more UPFs, periodically and/or aperiodically (e.g. by requesting traffic information in response to receiving the packet duplication activation request).

In an example, in response to determining the support (e.g. allowance, acceptance, enabling, activation) of duplication (e.g. duplication activation), the SMF may send a request to the first UPF indicating a request for activating packet duplication of the first session (e.g. the one or more sessions). The SMF may check a status of the core network configuration. The core network configuration for supporting packet duplication may be established at the time of the first session establishment. In an example, if the core network configuration for supporting packet duplication was not established, the SMF may initiate core network configuration. In an example, the type of core network configuration (e.g. no separate tunneling, separate tunneling with the first UPF, separate tunneling with the second UPF, and/or the like) for supporting duplicated packets may be pre-defined at the SMF. Based on the type of core network configuration set in the SMF, the SMF may initiate session modification procedure with the first UPF for transmitting and receiving the duplicated packets from the first access node or the second access node. The SMF may initiate session establishment procedure with the second UPF for transmitting and receiving the duplicated packets. Tunnel endpoints at the first access node or the second access node may be modified.

In an example, in response to determining the support of duplication (e.g. duplication activation), the SMF may send a response message indicating the activation of packet duplication (e.g. session duplication) of the first session (e.g. the one or more sessions). The AMF may forward/send/transmit response of the activation of packet duplication received from the SMF to the first access node. In an example, the AMF may send the response of the activation of packet duplication to the first access node via an NG interface message (e.g. PDU session resource modify request message, PDU session resource modify confirm message, E-RAB modification confirm message, E-RAB modify request message). If the AMF response sent to the first access node indicates rejection of activation of packet duplication, the first access node may terminate packet duplication. In an example, the response of the activation of packet duplication may indicate an acceptance of the activation of packet duplication.

In an example, in response to receiving the AMF response comprising acceptance of the activation of packets duplication, the first access node may send/transmit an activation indication of packet duplication of the first session to the second access node. The activation indication may be transmitted via an Xn message (e.g. S-NODE modification request message, S-NODE reconfiguration complete message, S-NODE modification confirm message, X2 message). In an example, based on the activation indication, the second access node may receive/transmit packets of the second session (e.g. the duplicate session).

In an example, in response to the acceptance of the activation from the AMF, the first access node may start sending packets of the first session (e.g. the original session) and the second session (e.g. the duplicate session) by employing a mechanism communicated with the peer DPDEF entity (PSA UPF, UPF, and/or the like) in the core network.

In an example, the core network configuration required for supporting duplication of packets may be established at the time of session establishment procedure. In an example, the core network configuration for transmitting packets of the second session may be the same as transmitting packets for the first session. In an example, the core network configuration may be established dynamically when activation of the packet is triggered, and an activation indication is received from the AMF by the SMF. The core network configuration may be for supporting one path or may be for supporting separate paths for transmitting the packets of the first session and second session. An example embodiment may support activation of duplicated packets with or without prior core network configuration.

Figure 37:
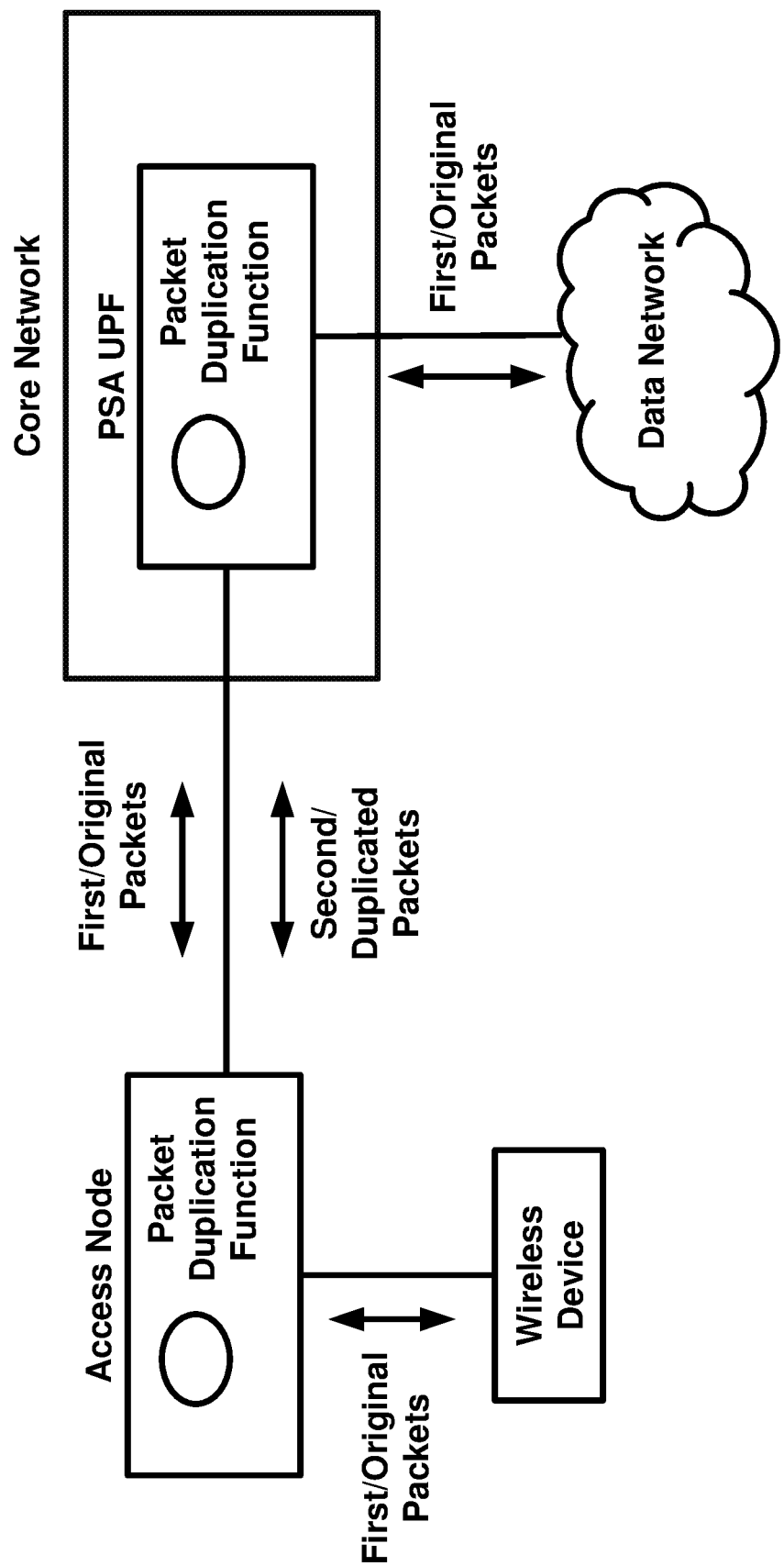
FIG. 37 is an example representing peer entities where duplication of packets and duplication elimination of packets may be handled for uplink (UL) packets and downlink (DL) packets as per an aspect of an embodiment of the present disclosure.

An example illustrated in FIG. 37 may convey information on the packet duplication and elimination functions resided at the first access node and the first UPF where the first UPF may be the PSA UPF.

Figure 38:
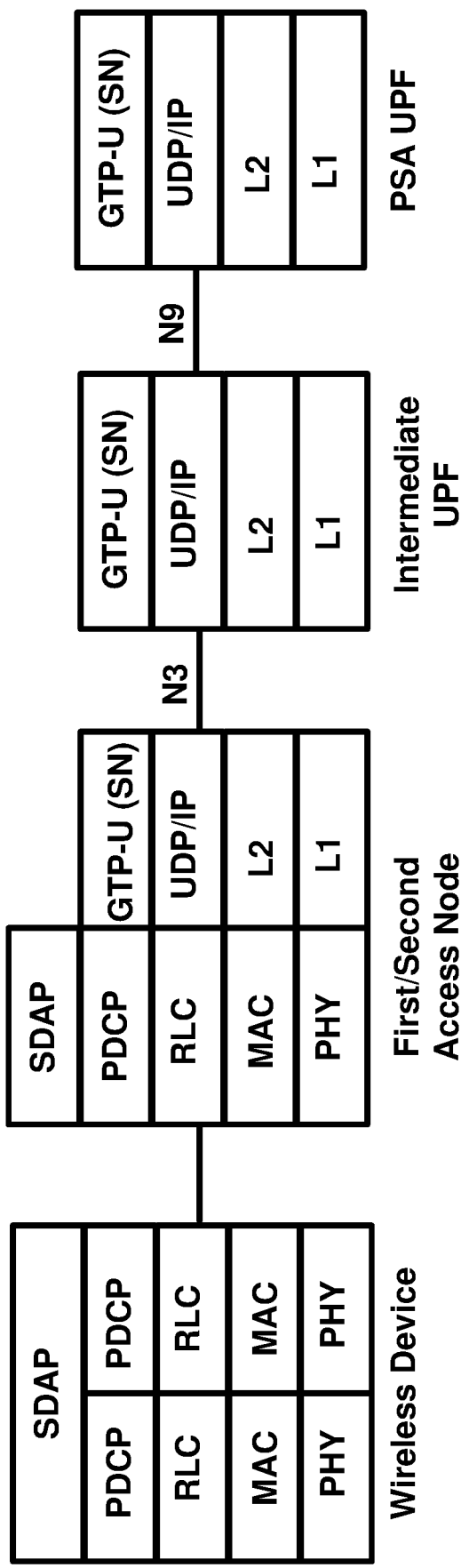
FIG. 38 illustrates an example of duplication of an original session by an access network as per an aspect of an embodiment of the present disclosure.

A protocol stack illustrating GTP-U layer is in an example FIG. 38. The duplication of the sequence number and elimination of the duplicated sequence number may be provided by the GTP-U layer. In an example, the duplication of the sequence number and elimination of the duplicated sequence number may be controlled or facilitated by the SMF.

Figure 39:
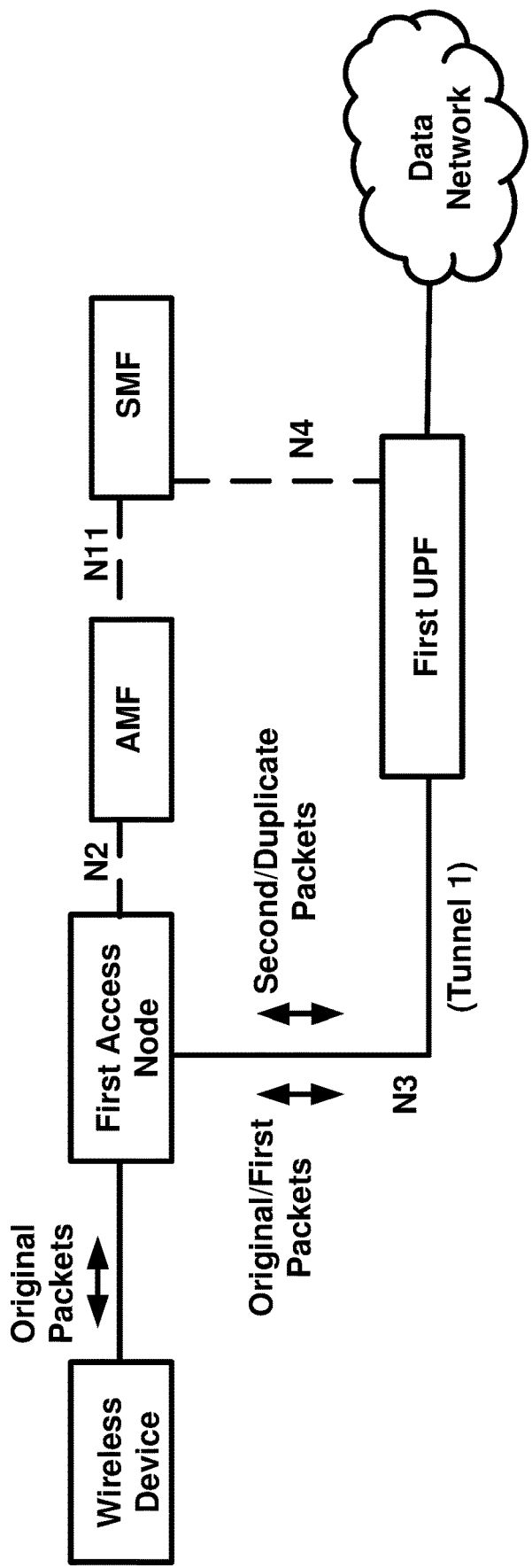
FIG. 39 illustrates an example of network configuration where the duplicated packets may be transmitted via the same path as original packets as per an aspect of an embodiment of the present disclosure.

In an example illustrated in FIG. 39, packets for the first session and second session may be transmitted and received using the same path between the first access node and the first UPF where the first UPF is the UPF currently supporting transmission of packets of the first session. The first UPF may be the PSA UPF.

Figure 40:
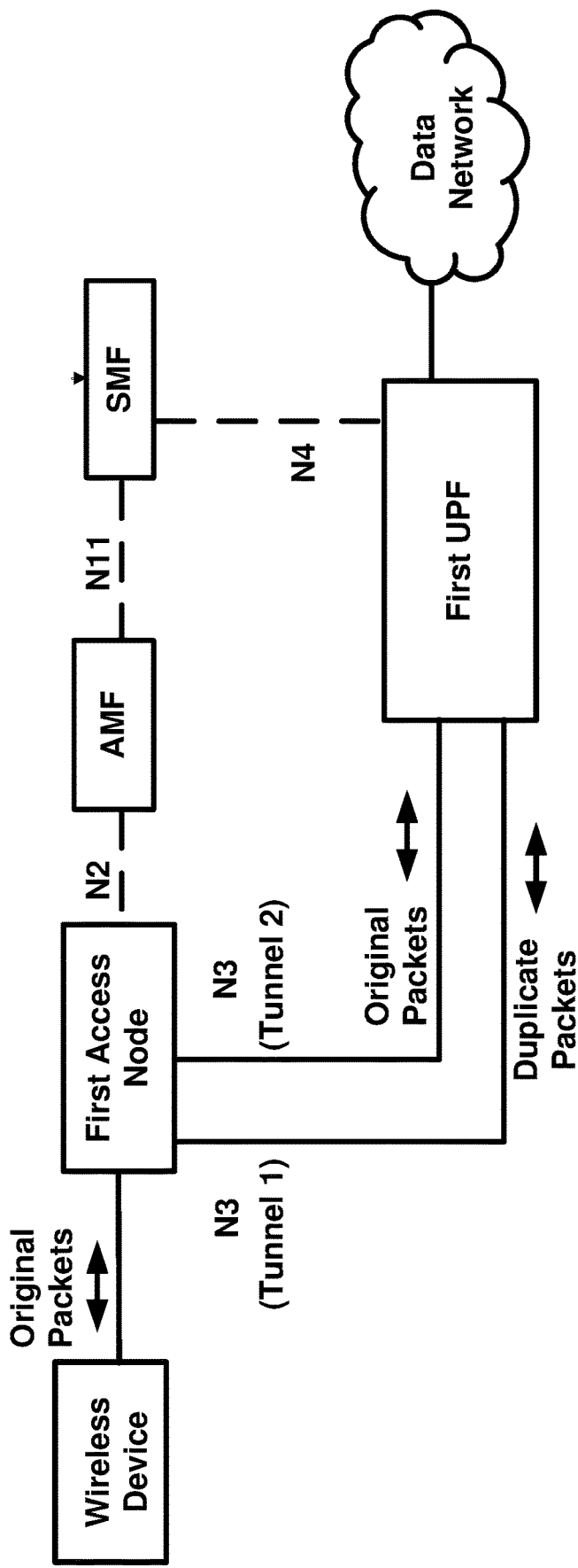
FIG. 40 illustrates an example of network configuration where the duplicated packets may be transmitted via different paths of a same UPF as original packets as per an aspect of an embodiment of the present disclosure.

In an example as illustrated in FIG. 40, one or more separate independent routing paths may be employed between the first access node and the first UPF to transmit packets for the first session and second session.

Figure 41:
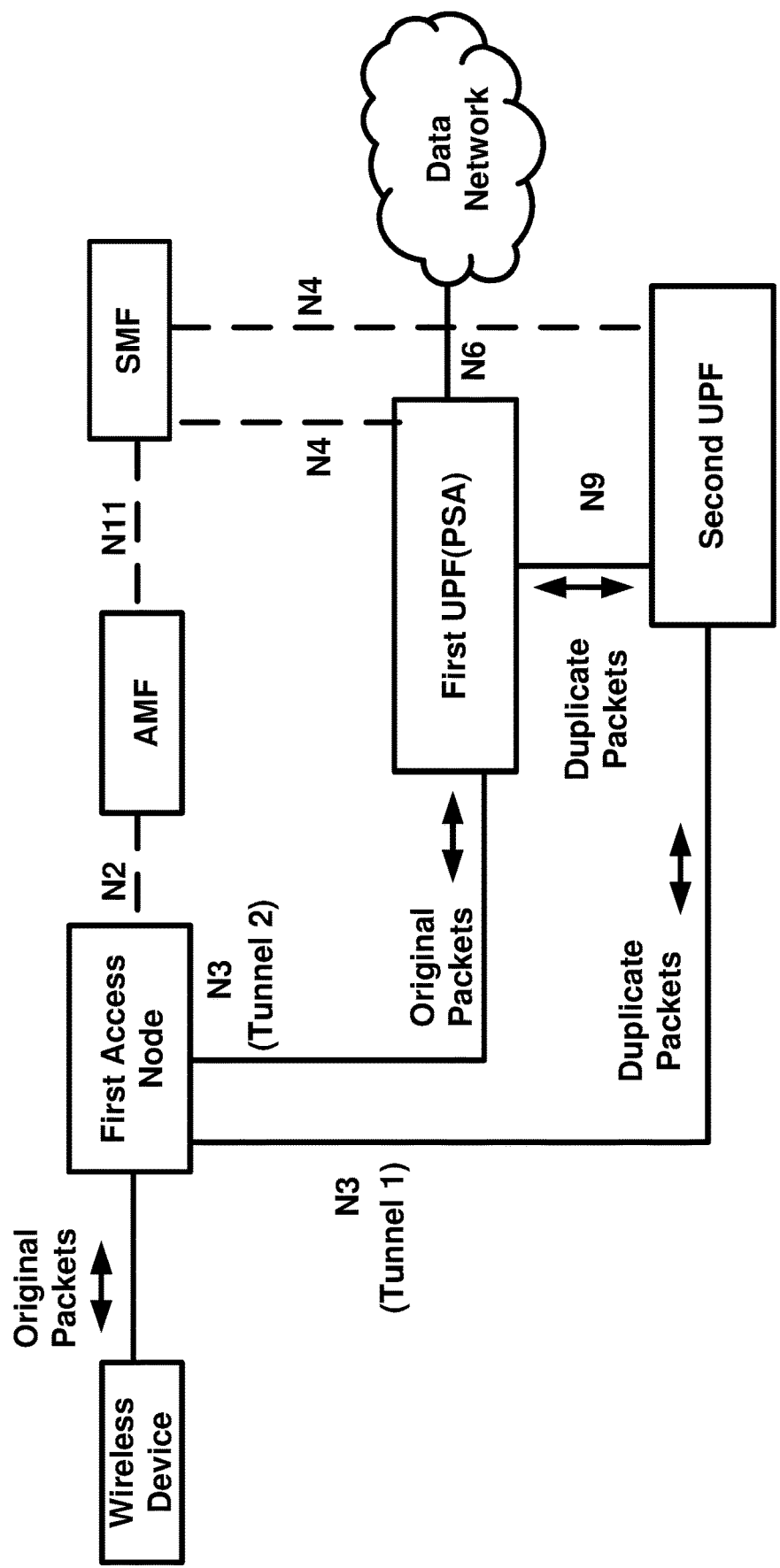
FIG. 41 illustrates an example of network configuration where the duplicated packets may be transmitted via different paths using different UPFs for duplicated and original packets as per an aspect of an embodiment of the present disclosure.

In an example illustrated in FIG. 41, one or more separate paths (tunnels) may be established between the first access node and the first UPF and between the first access node and a new intermediate UPF (second UPF) to transmit packets for the first session and second session. A separate tunnel may be established between the first UPF and the second UPF where the first UPF may be the PSA UPF. Duplicated uplink packets may be transmitted from the second UPF to the first UPF. Duplicated downlink packets may be transmitted from the first UPF to the second UPF. The DPDEF in the core network (located at the PSA UPF, first UPF, second UPF and/or the like) may reorder uplink packets and eliminate duplicated packets based on the duplication information which may be exchanged prior to packet duplication activation. Duplicated uplink packets may be eliminated by DPDEF of the core network. The DPDEF in the first access node may reorder downlink packets and eliminate duplicated packets based on the duplication information which may be exchanged prior to packet duplication activation. Duplicated downlink packets may be eliminated by DPDEF of the wireless device.

In an example where the first access node (master next generation nodeB) is a part of dual connectivity, separate paths for packets of the first session and second session may be transmitted via the first access node (master next generation nodeB) and the second access node (secondary next generation nodeB) depending on the bearer mode (MCG bearer, SCG bearer or split bearer, and/or the like).

Figure 42:
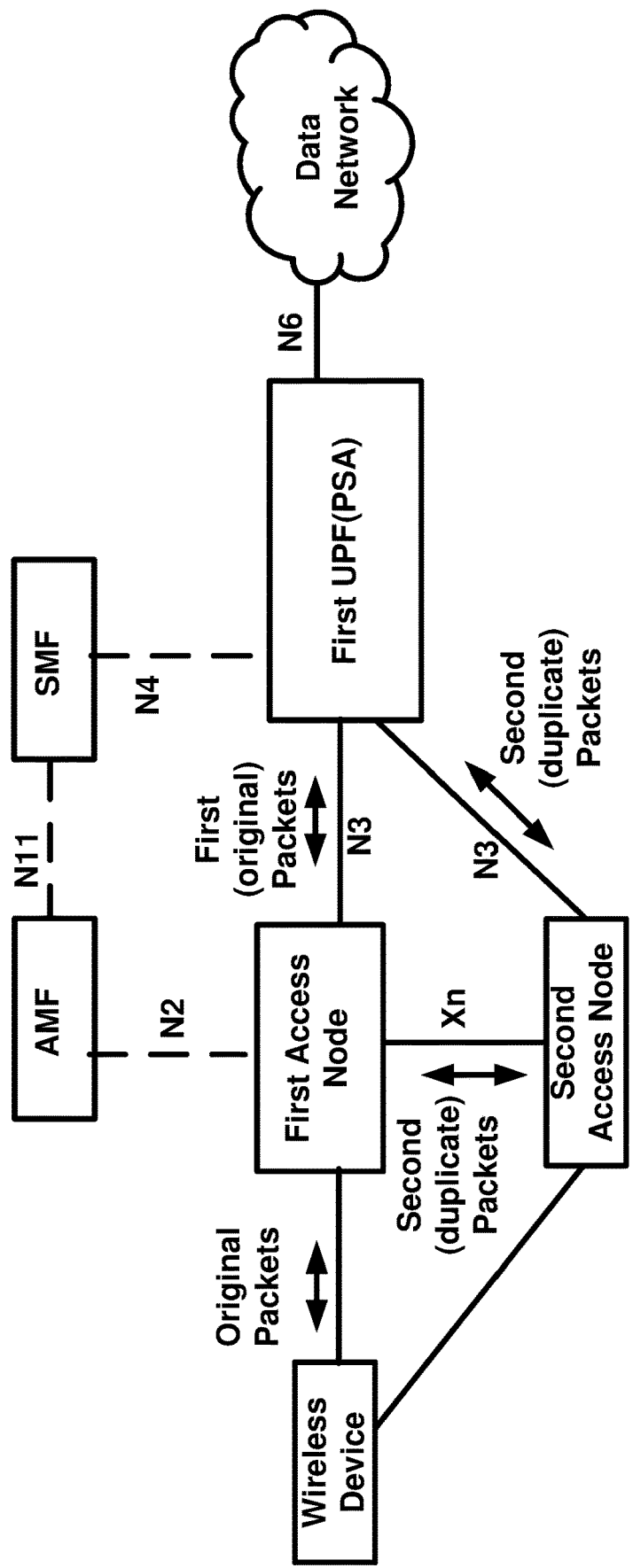
FIG. 42 illustrates an example of network configuration where the duplicated packets may be transmitted using dual connectivity mode via different paths of a same UPF as original packets as per an aspect of an embodiment of the present disclosure.

In an example as illustrated in FIG. 42, one or more separate paths (tunnels) may be connected to the first UPF where the packets of the first session from the first access node may be transmitted via first tunnel between the first access node and the first UPF. The packets of the second session from the first access node may be transmitted via second tunnel between the first access node and the second UPF.

Figure 43:
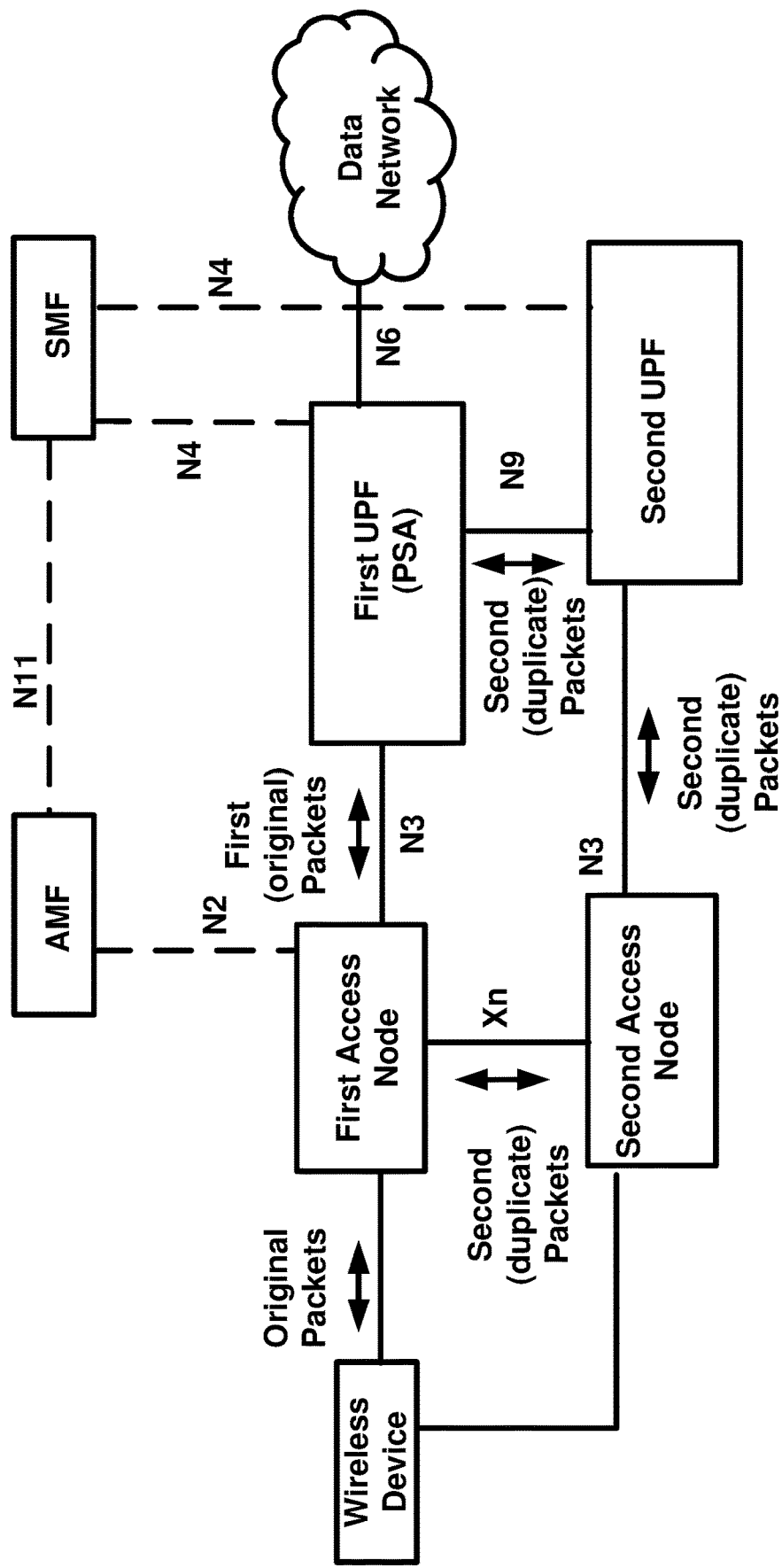
FIG. 43 illustrates an example of network configuration where the duplicated packets may be transmitted using dual connectivity mode (MCG bearer and split bearer) via different paths using different UPFs for duplicated and original packets as per an aspect of an embodiment of the present disclosure.
Figure 44:
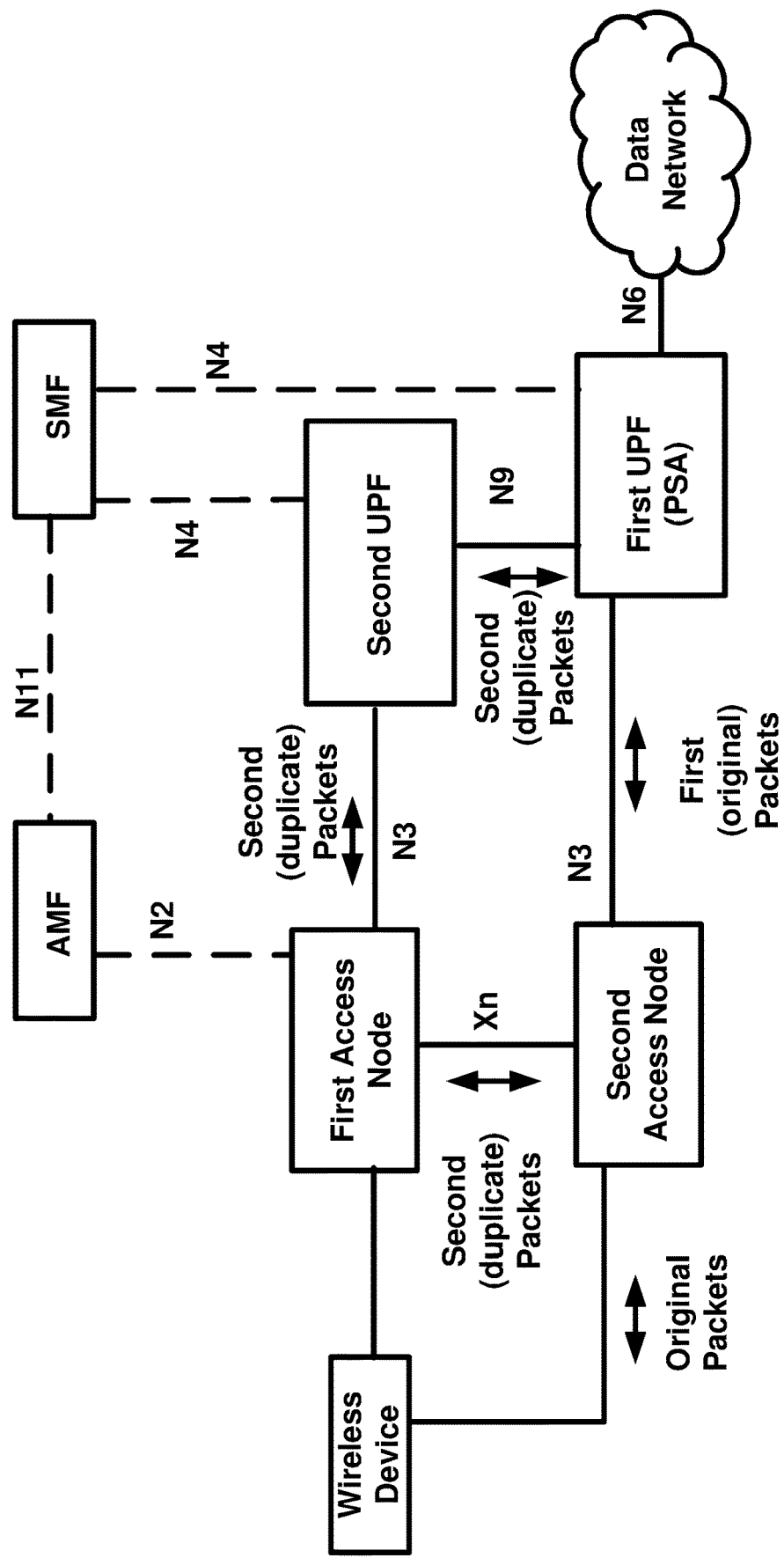
FIG. 44 illustrates an example of network configuration where the duplicated packets may be transmitted using dual connectivity mode (SCG bearer) via different paths using different UPFs for duplicated and original packets as per an aspect of an embodiment of the present disclosure.

In another example illustrated in FIG. 43, the first access node may be connected to the first UPF and the second access node may be connected to the second UPF for transmitting packets in MCG bearer mode or split bearer mode.

FIG. 28 illustrates an example where the first access node may be connected to the second UPF and the second access node may be connected to the first UPF for transmitting the packets in SCG bearer mode.

In an example, the first UPF may receive uplink packets of the first session and uplink packets of the second sessions. The first UPF may be the PSA UPF. Based on the duplication information previously exchanged with the first access node, the SMF may identify packets of the second session as duplicate packets. The first UPF may reorder packets of first session and second session, identify and discard uplink packets of the first session or uplink packets of the second session arriving at the later time to remove duplication.

In an example, the first access node may determine a need of removing packet duplication of one or more sessions supported by the first access node based on at least one CSI report received from the wireless device. In an example, this determination may be based on at least one or more of a quality of service requirement of the session, traffic load at the first access node, service type of the session, and/or the like.

In an example, the first access node may send an indication to the AMF requesting it to deactivate packet duplication over N2 (mobility management protocol, S1-MME, and/or the like) protocol (e.g. N2 session resource modify request message, N2 session resource release request message, N2 session modify request message, PDU session release message). In an example, the first access node may piggyback request (an indication) to deactivate packet duplication in a message sent to an AMF.

In an example, the AMF may forward the received request to deactivate packet duplication to the SMF (e.g. N2 session resource modify request message, N2 session resource release request message, N2 session modify request message, PDU session release message), Nsmf_PDUSession_UpdateSMContext request operation, Nsmf_PDUSession_ReleaseSMContext request operation and/or the like). The SMF may send a message to the first UPF to deactivate packet duplication (e.g. N4 session modification request, N4 session deactivation request, and/or the like). If the core network configuration is supported dynamically, the SMF may request the first UPF to deallocate a TNL address and/or may request the second UPF to release TNL address if the second UPF was requested earlier for transmitting packets of the first session or the second session. The SMF may send the result of the deactivation of packet duplication to the AMF (e.g. N2 session resource modify response message, N2 session modification response message, N2 session resource release response message, N2 session release response message, N2 session update response message, Nsmf_PDUSession_UpdateSMContext response operation, Nsmf_PDUSession_ReleaseSMContext response operation and/or the like).

The AMF may forward response of the deactivation of packet duplication received from the SMF to the first access node using N2 (mobility management protocol, S1-MME, and/or the like) protocol.

In an example when the core network configuration is not pre-defined at the time of a session establishment of the first session, the SMF may initiate the core network configuration when it receives a message (PDU session establishment request message, PDU session modification request message, PDUSession_CreateSMContext request operation, PDUSession_UpdateSMContext request operation and/or the like) from the AMF requesting the activation of the duplication. In one example, the SMF may receive an indication requesting the activation of duplication piggybacked in a message. In another example, the SMF may receive a separate message requesting the activation of the duplication. The first access node may include at least one or more uplink transport network layer (TNL) address (e.g. IP address, MAC address of corresponding tunnel (the first tunnel and/or the second tunnel)) of a first UPF in the response to the first access node. In an example, if the packets of the second sessions are transmitted using a tunnel between the first access node and the second UPF, the first access node may include at least one or more uplink transport network layer (TNL) address of the second UPF.

In an example, the SMF may request the session modification of the first UPF at the time of requesting the activation of the duplication. In another example, the SMF may request the session modification of the first UPF after requesting the activation of the duplication. The request for session modification may include at least one or more downlink TNL address of a second UPF. In an example, the first UPF may responds to the SMF with at least one or more uplink TNL address of a first UPF.

In an example, the SMF may request the session establishment of the second UPF. The request for session establishment may include at least one or more uplink TNL address of a the first UPF. In an example, the first UPF may responds to the SMF with at least one or more uplink TNL address and/or the downlink TNL address of the second UPF.

In an example, the SMF may send a message (e.g. Nsmf_PDUSession_UpdateSMContext request operation and/or the like) to the AMF including at least one or more uplink TNL address of a the first UPF. In an example, the SMF may send a message (e.g. Nsmf_PDUSession_UpdateSMContext request operation and/or the like) to the AMF including at least one or more uplink TNL address of a the second UPF. The AMF may forward the message received from the SMF to the first access node. The first access node may respond to the AMF with the downlink TNL address of the first UPF (e.g. PDU session modification response, session update response and/or the like). In an example, the first access node may respond to the AMF with the address of the downlink TNL address of the second UPF if the path to transmit the packets of the second session includes the tunnel between the second UPF and the second access network. The AMF may send the response received from the first access node to the SMF.

In an example, the SMF may send a message (e.g. N4 session modification request, and/or the like) including at least one or more the uplink TNL address of the first UPF, the downlink TNL address of the first access node or the downlink TNL address of the second access node to the second UPF. The second UPF may send the response of the message to the SMF.

In an example, when the first access node is a part of dual connectivity for the first session supporting MCG bearer mode or split bearer mode, the first access node may send an activation of the duplication message to the second access node. In an example, the activation of duplication may be piggybacked in a message sent to the second UPF. The activation of duplication message may include at least one or more an uplink TNL address of the first access node. The second access node may respond to the first UPF comprising at least one or more of downlink uplink TNL address of the second access node.

In an example, when the first access node is a part of dual connectivity for the first session supporting SCG bearer mode, the first access node may send an activation of the duplication message to the second access node. The duplication of uplink packets of the first session may be handled by the second access node. The uplink packets of the first session may be transmitted by the second access node to the first UPF. The uplink packets of the second session may be received at the first access node from the second access node. The first access node may transmit the second session packets to the first UPF or the second UPF based on the core network configuration. Duplication of downlink packets received from the first UPF or the second UPF may be eliminated by the second access node. The downlink packets of the second session may be sent by the first access node to the second access node. Based on the duplication information previously exchanged with the SMF via the first access node, the second access node may identify and discard duplicated downlink packets of the first session or downlink packets of the second session arriving at the later time to remove duplication. The second access node may send the re-ordered downlink packets to the wireless device.

In an example, when the first access node is a part of dual connectivity for the first session supporting MCG bearer mode or split bearer mode, the first access node may send an activation of the duplication message to the second access node. The duplication of uplink packets of the first session may be handled by the first access node. The uplink packets of the first session may be transmitted by the first access node to the first UPF. The uplink packets of the second session may be received at the second access node from the first access node. These packets may be sent to the second access node from the first access node after the duplication of packets at the first access node. The second access node may transmit the second session packets to the first UPF or the second UPF based on the core network configuration. Duplication of downlink packets received from the first UPF or the second UPF may be eliminated by the first access node. The downlink packets of the second session may be sent by the second access node to the first access node. Based on the duplication information previously exchanged with the SMF, the first access node may re-order packets of first session and second session. The first access node may identify and discard duplicated downlink packets of the first session or downlink packets of the second session arriving at the later time to remove duplication. The first access node may send the re-ordered downlink packets to the wireless device.

The SMF may provide the duplication information previously exchanged with the first access node to the first UPF which may be the PSA UPF. In an example, the SMF may provide the duplication information at the time of receiving the packet duplication request from the AMF. In an example, the SMF may provide the duplication information when the duplication information is received from the AMF. Based on the duplication information, the first UPF may identify uplink packets of the second session as duplicate packets. The first UPF may re-order packets of first session and second session, identify and discard uplink packets of the first session or uplink packets of the second session arriving at the later time to remove duplication.

In an example, as illustrated in FIG. 45, the first access node may receive at least one channel measurement information from the wireless device. The first access node may determine a need of a duplication activation of packets of the first session. Determination at the first access node may be based on a traffic status of an N3 interface, a network slice type of the first session, a hardware load state in the first access node, or a status of a secondary access node for the wireless device, and/or the like.

The first access node may send a first message indicating a packet duplication activation indication to the AMF. The AMF may forward the packet duplication activation indication, a third message to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a seventh message indicating the packet activation to the first UPF. The first UPF may be the PSA UPF. The downlink packets of the first session may be duplicated by the first UPF. The SMF may respond to the AMF with the result of the packet duplication activation by sending the fourth message once it receives a response of the packet duplication activation, an eighth message from the first UPF. The uplink packets of the first session may be duplicated by the first access node when it receives a second message from the AMF indicating an acceptance of the packet duplication. In an example, the packets from the first session and second sessions are transmitted between the first access node and the first UPF via the same path (tunnel).

In an example, as illustrated in FIG. 46, the first access node may receive at least one channel measurement information from the wireless device. The first access node may determine a need of a duplication activation of packets of the first session. The first access node may send a first message indicating a packet duplication activation indication to the AMF. The AMF may forward the packet duplication activation indication to the SMF in the third message (e.g. Nsmf_PDUSession_UpdateSMContext request operation, Nsmf_PDUSession_CreateSMContext request operation). The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a seventh message (e.g. N4 session modification request, N4 session modification request, N4 session activation request, N4 session update request, N4 activate session request) indicating the packet activation with the first UPF. The SMF may respond to the AMF with the result of the packet duplication activation by sending the second message once it receives a response of the packet duplication activation, the eighth message (e.g. N4 session modification response, N4 session modification response, N4 session activation response, N4 session update response, N4 activate session response) from the first UPF. The eighth message from the first UPF sent to the SMF may comprise an uplink TNL address of the first UPF.

In an example, the SMF may send the uplink TNL address of the first UPF in a fifth message using N2 protocol to the AMF. The AMF may respond to the SMF with a sixth message (e.g. Nsmf_PDUSession_UpdateSMContext request operation, and/or the like), comprising a downlink TNL address of the first access node. The AMF may forward the fifth message as a ninth message to the first access node. The response of the forwarded fifth message, a tenth message may be sent by the first access node to the AMF.

In an example, the access node may send the downlink TNL address of the first access node in a fifth message using N2 protocol to the AMF. The AMF may respond to the first access node with a sixth message, comprising an uplink TNL address of the first UPF. The AMF may forward the fifth message to the SMF. The response of the forwarded fifth message may be sent by the SMF to the AMF.

If the fifth message forwarded by the AMF, indicates acceptance of the packet duplication activation, the first access node may start duplicating uplink packets of the first session received from the wireless device. The first node may start removing duplication of packets of the first session and second sessions. In an example, the packets from the first session and second sessions are transmitted by the first access node and the first UPF via two different paths (tunnels).

In an example, as illustrated in FIG. 47, the first access node may receive at least one channel measurement information from the wireless device. The first access node may determine a need of a duplication activation of packets of the first session. The first access node may send a first message indicating a packet duplication activation indication to the AMF. The AMF may forward the packet duplication activation indication to the SMF in a third message (e.g. N11 message, N11 operation request, Nsmf_PDUSession_UpdateSMContext request operation, and/or the like). The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a seventh message (e.g. N4 session modification request, N4 session modification request, N4 session activation request, N4 session update request, N4 activate session request) indicating the packet activation with the first UPF. The first UPF may initiate packet duplication and may respond to the SMF by sending an eighth message (e.g. N4 session modification response, N4 session modification response, N4 session activation response, N4 session update response, N4 activate session response). The SMF may respond to the AMF with the result of the packet duplication activation by sending a second message once it receives a response of the packet duplication activation, the fourth message from the first UPF. The fourth message from the first UPF sent to the SMF may comprise an uplink TNL address of the first UPF.

The SMF may send a request (e.g. N4 session establishment request, N4 session modification request) to the second UPF for an establishment of one or more TNL addresses. The second UPF may respond to the SMF (e.g. N4 session establishment response, N4 session modification response) comprising a downlink TNL address or an uplink TNL address. The SMF may forward the uplink TNL address of the first UPF to the second UPF and the downlink TNL address of the second UPF. This path between the first UPF and the second UPF may be employed to transmit uplink packets received at the second UPF to the first UPF, where the first UPF may be the PSA UPF.

In an example, the SMF may send the uplink TNL address of the second UPF in a fifth message using N2 protocol to the AMF. The AMF may respond to the SMF with a sixth message, comprising a downlink TNL address of the first or second access node. The AMF may forward the fifth message as a seventh message to the first access node. The response of the forwarded fifth message may be sent by the first access node to the AMF.

In an example, the access node may send the downlink TNL address of the first access node or the second access node in a fifth message using N2 protocol to the AMF. The AMF may respond to the first access node with a sixth message, comprising an uplink TNL address of the second UPF. The AMF may forward the fifth message to the SMF. The response of the forwarded fifth message may be sent by the SMF to the AMF.

If the fifth message indicates acceptance of the packet duplication activation, the first access node may start duplicating uplink packets of the first session received from the wireless device. The first node may start removing duplication of packets of the first session and second sessions. The downlink packets of the first session may be duplicated by the first UPF, where the first UPF is also the PSA UPF. In an example, the packets from the first session and second session are transmitted between the first access node and the first UPF, between the first access node and the second UPF or between first access node and the first UPF and between the second access node and the second UPF via two different paths (tunnels).

In an example, as illustrated in FIG. 48, the first access node may receive at least one channel measurement information from the wireless device. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The SMF may respond to the AMF with the result of the packet duplication activation by sending the second message once it receives a response of the packet duplication activation, a fourth message from the first UPF. The fourth message from the first UPF sent to the SMF may comprise an uplink TNL address of the first UPF.

In an example, the SMF may send the uplink TNL address of the first UPF in a fifth message using N2 protocol to the AMF. The AMF may respond to the SMF with a sixth message, comprising a downlink TNL address of the first or second access node. The AMF may forward the fifth message to the first access node. The response message of the forwarded fifth message may be sent by the first access node to the AMF.

In an example, the access node may send the downlink TNL address of the first access node or the second access node in a fifth message using N2 protocol to the AMF. The AMF may respond to the first access node with a sixth message, comprising an uplink TNL address of the first UPF. The AMF may forward the fifth message to the SMF. The response of the forwarded fifth message may be sent by the SMF to the AMF.

In an example, if the wireless device is using MCG or split bearer mode, the wireless device may transmit the packets of the first session to the first access node. The first access node duplicates packets of the first session. The first access node may transmit the packets of the first session to the first UPF and may transmit the packets of the second session to the second access node. The second access node may forward the received packets from the first access node to the first UPF.

In an example, if the wireless device is using SCG bearer mode, the wireless device may transmit the packets of the first session to the second access node. The second access node duplicates packets of the first session. The second access node may transmit the packets of the first session to the first UPF and may transmit the packets of the second session to the first access node. The first access node may forward the received packets from the second access node to the first UPF.

The downlink packets of the first session may be duplicated by the first UPF, where the first UPF is also the PSA UPF. In an example, the packets from the first session are transmitted between the first access node and the first UPF. The packets from the second session are transmitted between the first access node and the second access node and between the second access node and the first UPF. In an example, the packets from the first session are transmitted between the second access node and the first UPF. The packets from the second session are transmitted between the second access node and the first access node and between the second access node and the first UPF.

In an example, as illustrated in FIG. 49, the first access node may receive at least one channel measurement information from the wireless device. The wireless device may be using dual mode connectivity (SCG bearer, MCG bearer or split mode) for transmitting packets of the first session. The first access node may determine a need of a duplication activation of packets of the first session. The first access node may send a first message indicating a packet duplication activation indication to the AMF. The AMF may forward the packet duplication activation indication to the SMF. The SMF may determine support of duplication based on information in a unified data management (UDM) for a user, a type of service supported by the first session, a current traffic condition at the first UPF controlled by the SMF, a core network configuration, a current resource availability, one or more policy rules received from a policy control function (PCF), one or more operator policies configured at the SMF and/or the like. The SMF may send a third message indicating the packet activation with the first UPF. The SMF may respond to the AMF with the result of the packet duplication activation by sending the second message once it receives a response of the packet duplication activation, a fourth message from the first UPF. The fourth message from the first UPF sent to the SMF may comprise an uplink TNL address of the first UPF.

The SMF may send a request to the second UPF for an establishment of one or more TNL addresses. The second UPF may respond to the SMF comprising a downlink TNL address or an uplink TNL address. The SMF may forward the uplink TNL address of the first UPF to the second UPF and the downlink TNL address of the second UPF. This path between the first UPF and the second UPF may be employed to transmit uplink packets received at the second UPF to the first UPF, where the first UPF may be the PSA UPF. In an example, the path between the first UPF and the second UPF may be employed to transmit downlink packets from the first UPF to the second UPF, where the first UPF may be the PSA UPF.

In an example, the SMF may send the uplink TNL address of the second UPF in a fifth message using N2 protocol to the AMF. The AMF may respond to the SMF with a sixth message, comprising a downlink TNL the second access node. The AMF may forward the fifth message to the first access node. The response of the forwarded fifth message may be sent by the first access node to the AMF.

In an example, the access node may send the downlink TNL address of the first access node or second access node in a fifth message using N2 protocol to the AMF. The AMF may respond to the first access node with a sixth message, comprising an uplink TNL address of the second UPF. The AMF may forward the fifth message to the first access node. The response of the forwarded fifth message may be sent by the first access node to the AMF.

In an example, if the wireless device is using MCG or split bearer mode, the wireless device may transmit the packets of the first session to the first access node. The first access node duplicates packets of the first session. The first access node may transmit the packets of the first session to the first UPF and may transmit the packets of the second session to the second access node. The second access node may forward the received packets from the first access node to the second UPF.

In an example, if the wireless device is using SCG bearer mode, the wireless device may transmit the packets of the first session to the second access node. The second access node duplicates packets of the first session. The second access node may transmit the packets of the first session to the first UPF and may transmit the packets of the second session to the first access node. The first access node may forward the received packets from the second access node to the second UPF.

The downlink packets of the first session may be duplicated by the first UPF, where the first UPF is also the PSA UPF. In an example, the packets from the first session are transmitted between the first access node and the first UPF and the packets from the second session are transmitted between the second access node and the second UPF via two different paths (tunnels). In an example, the packets from the first session are transmitted between the second access node and the first UPF and the packets from the second session are transmitted between the first access node and the second UPF via two different paths (tunnels).

In an example, as illustrated in FIG. 50, the first access node may receive at least one channel measurement information from the wireless device. The first node may determine packet duplication. The first access node may send the packet duplication indication to the SMF via the AMF. The SMF may decide to accept the packet duplication. The SMF may send a result of the decision to the first access node via the AMF. The SMF may request the first UPF to activate the duplication of the first session. The first UPF may start duplicating downlink packets of the first session and may start removing duplication of the uplink packets of the first session.

If the SMF accepts the session duplication request, the first access node may start packet duplication of the first session.

If the SMF does not accept the session duplication request, the first access node may terminate the packet duplication attempt.

In an example, if the configuration of the duplication may not be supported at the time of activation request at the SMF, the SMF may request the first UPF to allocate TNL for supporting packets of the second session. In an example, the SMF may request the second UPF to allocate TNL for supporting packets of the second session. The SMF may communicate with the first access node for providing uplink TNL of first UPF or second UPF. The SMF may obtain the downlink TNL of the first access node or the second access node from the first access node.

In an example embodiment, a first access node may determine an activation of a packet duplication of a session. The first access node may send a first message indicating an activation of the packet duplication of the session to an AMF. The first access node may receive the response of the first message, a second message indicating acceptance of the activation from the AMF.

In an example, the first access node may receive first packets of the first session from a wireless device. The first access node may send second packets to an UPF, wherein the second packets are a duplication of the first packets.

In an example, the first access node may receive first packets of the first session from a wireless device. The first access node may send the first packets and second packets via a tunnel between the first access node and the UPF, wherein the second packets are a duplication of the first packets.

In an example, the first access node may receive first packets of the first session from a wireless device. The first access node may send the first packets via a first tunnel between the first access node and the first UPF. The first access node may send second packets via a second tunnel between the first access node and the second UPF, wherein the second packets are a duplication of the first packets. The first UPF may be the PSA UPF.

In an example, the first access node may receive first packets of the first session from a wireless device. The first access node may send the second packets via a first tunnel between the first access node and the first UPF, wherein the second packets are a duplication of the first packets. The first access node may send first packets via a second tunnel between the first access node and the second UPF. The first UPF may be the PSA UPF In an example, the determination is based on at least one of a traffic status of an N3 interface, a network slice type of the first session, a hardware load state in the first access node or a status of a secondary access node for the wireless device, and/or the like.

In an example, the first access node may send first packets of the first session to a first UPF via a first tunnel between the first access node and the first UPF. A second access node may receive second packets from the first access node wherein the second packets are a duplication of the first packets. A second access node may send the second packets to a second UPF via a fourth tunnel between the second access node and the second UPF.

In an example, the second access node may receive first packets from the wireless device or from the first access node. The second access node may send first packets of the first session to a first UPF via a first tunnel between the second access node and the first UPF. The first access node may receive second packets from the second access node wherein the second packets are a duplication of the first packets. The first access node may send the second packets to a second UPF via a fourth tunnel between the first access node and the second UPF. In an example, the first access node may send the second packets to a second UPF via a fourth tunnel between the first access node and the first UPF.

In an example, the AMF may send a third message indicating an activation of the packet duplication of the first session to an SMF. The AMF may receive a fourth message indicating a result of the activation of the packet duplication of the first session from the SMF.

In an example, the SMF may send a seventh message indicating an activation of the packet duplication of the first session to an UPF. The SMF may receive an eighth message indicating a result of the activation of the packet duplication of the first session.

In an example, the second message may comprise at least one of an uplink transport network layer (TNL) address of a first UPF.

In an example, the second message may comprise at least one of an uplink transport network layer (TNL) address of a second UPF.

In an example, the fourth message may comprise at least one of an uplink TNL address of the first UPF.

In an example, the fourth message may comprise at least one of an uplink TNL address of the second UPF In an example, the AMF may receive a fifth message from an SMF comprises an uplink TNL address of a first UPF indicating a session modification. The AMF may send a sixth message from the SMF indicating a result of the session modification, the sixth message comprising a downlink TNL address of the first access node.

In an example, the first access node may send a ninth message to a second access node indicating an activation of the packet duplication of the session. The first access node may receive a tenth message from the second access node comprising at least one of a downlink TNL address of the second access node. In an example, the second access node may send second packets I to the second UPF in response to receiving the ninth message.

In an example, the SMF may send an eleventh message to a first UPF indicating an activation of the packet duplication of the session, comprising a duplication indicator or a duplication information. The SMF may receive a twelfth message from the first UPF indicating acceptance of the activation.

In an example, the first access node may determine a deactivation of a packet duplication of a first session. The first access node may send a twenty first message to the AMF indicating a deactivation of the packet duplication of the session. The first access node may receive a twenty second message from the AMF indicating acceptance of the deactivation.

In an example, the AMF may send a thirteenth message to an SMF in response to receiving eleventh message. The AMF may receive a fourteenth message from the SMF indicating acceptance of the deactivation.

In an example, the first access node may send a fifteenth message to a second access node indicating the deactivation of the packet duplication of the session. The first access node may receive a sixteenth message from the second access node indicating a completion of the deactivation.

In an example, the first access node may send a seventeenth message to the AMF for a duplication configuration supporting the session and a second session where the second session is duplication of the first session. The first access node may receive an eighteenth message from the AMF in response to the seventeenth message.

In an example, the AMF may send, to an SMF, a nineteenth message for a duplication configuration supporting the session and a second session. The second session is duplication of the first session. In an example, the SMF may receive, from the AMF, a twentieth message in response to the nineteenth message, the twentieth message confirming the duplication configuration.

In an example, a wireless device may receive, from a base station, at least one first radio resource control message comprising configuration parameters for: a first session between the wireless device and a user plane function; a second session, for packet duplication of the first session, between the wireless device and the user plane function; and/or the like. The wireless device may receive at least one second radio resource control message indicating activation of the packet duplication. Based on the activation of the packet duplication, the wireless device may send original packets via the first session to the user plane function and duplicated packets of the first session to the user plane function via the second session.

In an example, the second session may be deactivated based on the receiving the at least one radio resource control message. In an example, the wireless device may receive at least one third radio resource message indicating deactivation of the packet duplication. Based on the deactivation of the packet duplication, the wireless device may keep sending original packets of the first session to the user plane function and stop sending duplicated packets of the first session to the user plane function via the second session. The wireless device may send, to the base station, a response radio resource control message indicating a completion of the activation. The base station may send, to the user plane function, the duplicated packets of the first session. The base station may send, to the user plane function, the original packets via a first tunnel between the base station and the user plane function and the duplicated packets via a second tunnel between the base station and the user plane function.

In an example, the base station may send the original packets to a first user plane function and the duplicated packets to a second user plane function. In an example, the wireless device may send the original packets via the base station and the duplicated packets via a second base station. The base station may receive, from the wireless device, a channel measurement information. The base station may determine, based on the channel measurement information, the activation of the packet duplication. The channel measurement information may comprise at least one of: a channel quality indicator (CQI), a precoding matrix indicator (PMI), a precoding type indicator (PTI), a rank indication (RI), and/or the like. The base station may determine the packet duplication based on at least one of: a quality-of-service requirement of the first session, a traffic load of the base station, a session type of the first session, a network slice of the first session, and/or the like.

In an example, the base station may send, to an access and mobility management function (AMF), a first message indicating the activation of the packet duplication. The base station may receive, from the AMF, a second message indicating acceptance of the activation. The at least one second radio resource control message may be based on the acceptance of the activation. The second message may comprise an uplink transport network layer (TNL) address of the user plane function. The second message may comprise at least one of: a first uplink TNL address of a first user plane function for the original packets, a second uplink TNL address of a second user plane function for the duplicated packets, and/or the like.

In an example, the AMF may send, to a session management function (SMF), a third message indicating the activation of the packet duplication. The AMF may receive, from the SMF, a fourth message indicating acceptance of the activation. The fourth message may comprise an uplink TNL address of the user plane function. The fourth message may comprise at least one of: a first uplink TNL address of a first user plane function for the original packets, a second uplink TNL address of a second user plane function for the duplicated packets, and/or the like.

In an example, the AMF may send, to an SMF, an information message comprising at least one of: a first downlink TNL address for the original packets, a second downlink TNL address for the duplicated packets, and/or the like. In an example, a second base station may receive, from the base station, a modification request message indicating the activation of the packet duplication. The second base station may start, based on the modification request message, sending the duplicated packets. The base station may receive, from a second base station, resource status information of the second base station. The activation of the packet duplication may be based on the resource status information. The second base station may be a secondary base station of the wireless device.

Figure 51:
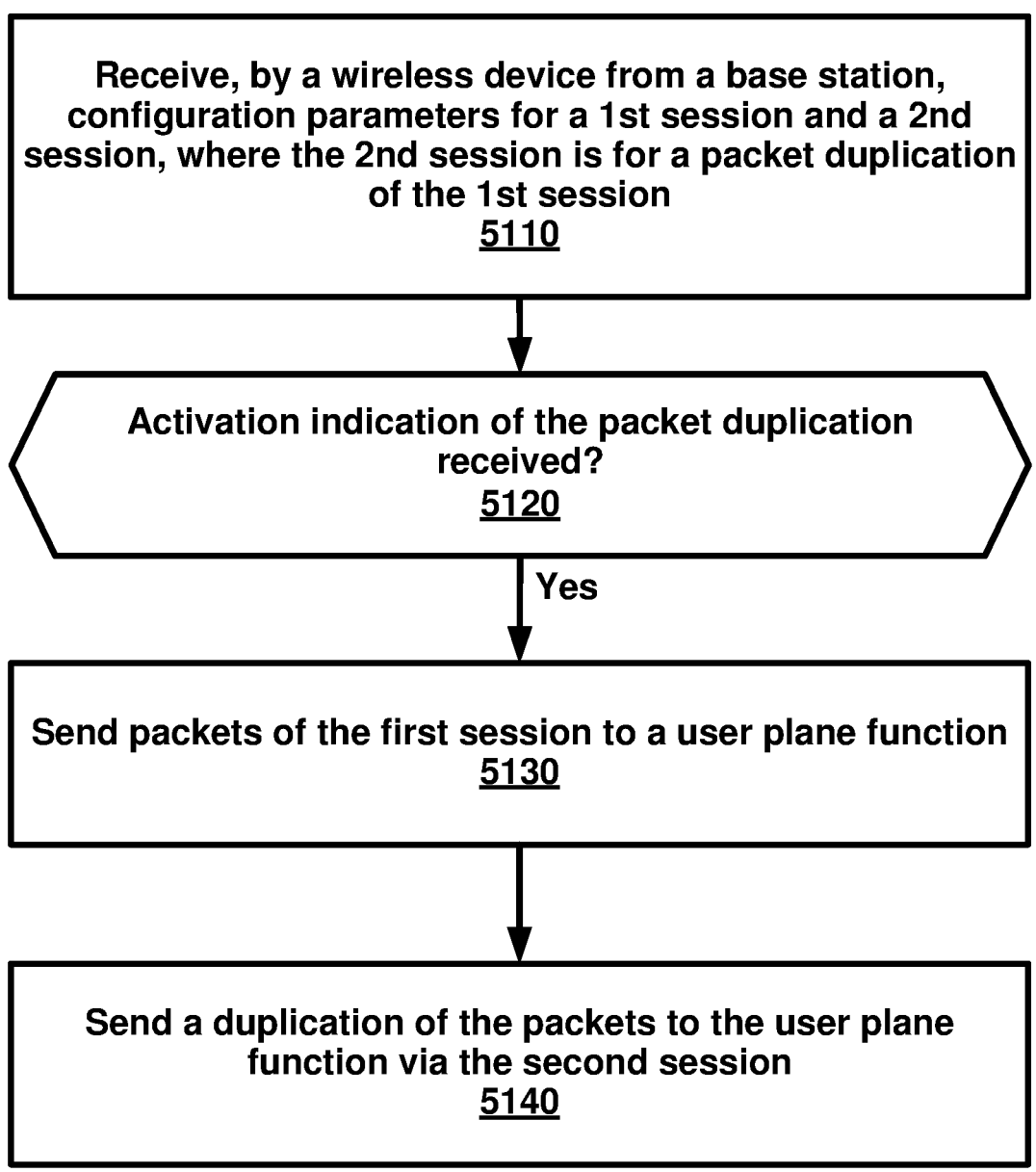
FIG. 51 is a flow diagram of an aspect of an example embodiment of the present disclosure.

FIG. 51 is a flow diagram of an aspect of an example embodiment of the present disclosure. At 5110, a wireless device may receive, from a base station, configuration parameters for a first session and a second session. The second session may be for a packet duplication of the first session. The wireless device may receive an activation indication of the packet duplication at 5120. Based on the activation indication of the packet duplication, the wireless device may send packets of the first session to a user plane function at 5130, and a duplication of the packets to the user plane function via the second session at 5140.

In an example, a wireless device may receive, from a base station, at least one first radio resource control message comprising configuration parameters for a first session and a second session. The second session may be for a packet duplication of the first session. The wireless device may receive at least one second radio resource message indicating activation of the packet duplication. Based on the activation of the packet duplication, the wireless device may send: original packets of the first session to a user plane function; and duplicated packets of the first session to the user plane function via the second session.

In an example, the first access node may receive, from a wireless device, channel measurement information. The first access node may determine to activate a packet duplication of a first session for the wireless device based on the channel measurement information. Based on activating the packet duplication, original packets of the first session may be transmitted between the wireless device and a user plane function. In response to activating the packet duplication, duplicated packets of the first session may be transmitted via a second session between the wireless device and the user plane function. The first access node may send, to an access and mobility management function (AMF), a first message indicating activation of the packet duplication of the session based on the determining. The first access node may receive, from the AMF, a second message indicating acceptance of the activation. The first access node may send, to the wireless device and based on the acceptance of the activation, a first radio resource control message indicating the activation.

In an example, the first access node may transmit, to the user plane function: first packets to the user plane function via the first session; and/or second packets, being duplication of the first packets, to the user plane function via the second session. The first access node may receive, from the wireless device, a second RRC message indicating a completion of the activation.

In an example, the first access node may determine to activate a packet duplication of a first session for the wireless device. Based on activating the packet duplication: original packets of the first session may be transmitted between the wireless device and a user plane function; and/or duplicated packets of the first session may be transmitted via a second session between the wireless device and the user plane function. The first access node may send, to an access and mobility management function (AMF), a first message indicating request for activation of the packet duplication of the session based on the determining. The first access node may receive, from the AMF, a second message indicating acceptance of the activation. The first access node may send, to the wireless device and based on the acceptance of the activation, a first radio resource control message indicating the activation.

In an example, the first access node may determine, to activate a packet duplication of a first session for the wireless device. Based on activating the packet duplication: original packets of the first session may be transmitted between the wireless device and a user plane function; and/or duplicated packets of the first session may be transmitted via a second session between the wireless device and the user plane function. The first access node may send, to an access and mobility management function (AMF), a first message indicating request for activation of the packet duplication of the session based on the determining. The first access node may receive, from the AMF, a second message indicating acceptance of the activation. The first access node may send, to the wireless device and based on the acceptance of the activation, a first radio resource control message indicating the activation.

In an example, a first access node may receive, from a wireless device, a channel measurement information. The first access node may determine an activation of a packet duplication of a session of the wireless device based on the channel measurement information. The first access node may send, to AMF, a first message indicating an activation of the packet duplication of the session. The first access node may receive, from the AMF, a first non-access stratum (NAS) message indicating the activation of the packet duplication of the session. The first access node may send, to the wireless device, a second NAS message indicating the activation of the packet duplication of the session.

In an example, the AMF may send, to a session management function (SMF), a second message indicating the activation of the packet duplication of the session. The AMF may receive, from the SMF, a third message indicating an acceptance of the activation. In an example, the first access node may receive, from the AMF, a fourth message indicating acceptance of the activation. In an example, the first access node may receive, from the wireless device, a third NAS message indicating an acceptance of the activation. The first access node may send, to the AMF, a fourth NAS message indicating an acceptance of the activation. The AMF may receive, from an SMF, a fifth NAS message indicating the activation of the packet duplication of the session. The AMF may send, to the SMF, a sixth NAS message indicating an acceptance of the activation.

In an example, a first access node may receive, from a wireless device, a channel measurement information. The first access node may determine a deactivation of a packet duplication of a session of the wireless device based on the channel measurement information. The first access node may send, to the AMF, a fifth message indicating the deactivation of the packet duplication of the session. The first access node may receive, from the AMF, a seventh non-access stratum (NAS) message indicating the deactivation of the packet duplication of the session. The first access node may send, to the wireless device, an eighth NAS message indicating the deactivation of the packet duplication of the session. The AMF may send, to a session management function (SMF), a sixth message indicating the deactivation of the packet duplication of the session. The AMF may receive, from the SMF, a seventh message indicating an acceptance of the deactivation. The first access node may receive, from the AMF, an eighth message indicating acceptance of the deactivation.

In an example, the first access node may receive, from the wireless device, a ninth NAS message indicating an acceptance of the deactivation. The first access node may send, to the AMF, a tenth NAS message indicating an acceptance of the deactivation. The AMF may receive, from an SMF, an eleventh NAS message indicating the deactivation of the packet duplication of the session. The AMF may send, to the SMF, a twelfth NAS message indicating an acceptance of the deactivation.

In an example, a first access node may receive, from a wireless device, a channel measurement information. The first access node may determine an activation of a packet duplication of a session of the wireless device based on the channel measurement information. The first access node may send, to the wireless device, a first radio resource control (RRC) message indicating an activation of the packet duplication of the session. The first access node may receive, from the wireless device, a first non-access stratum (NAS) message indicating the activation of the packet duplication of the session. The first access node may send, to an access and mobility management function (AMF), a second NAS message indicating the activation of the packet duplication of the session. The first access node may receive, from the wireless device, a second RRC message indicating acceptance of the activation. The second RRC message may comprise a duplication information. The first access node may receive, from the AMF, a third NAS message indicating acceptance of the activation. The first access node may send, to the wireless device, a fourth NAS message indicating acceptance of the activation.

In an example, the AMF may send, to a session management function (SMF), a fifth NAS message indicating the activation of the packet duplication of the session. The AMF may receive, from the SMF, a sixth NAS message indicating an acceptance of the activation.

In an example, a first access node may receive, from a wireless device, a channel measurement information. The first access node may determine a deactivation of a packet duplication of a session of the wireless device based on the channel measurement information. The first access node may send, to a wireless device, a third radio resource control (RRC) message indicating a deactivation of the packet duplication of the session. The first access node may receive, from the wireless device, a seventh non-access stratum (NAS) message indicating the deactivation of the packet duplication of the session. The first access node may send, to the AMF, an eighth NAS message indicating the deactivation of the packet duplication of the session. The first access node may receive, from the wireless device, a fourth RRC message indicating acceptance of the deactivation. The first access node may receive, from the AMF, a ninth NAS message indicating acceptance of the deactivation. The first access node may send, to the wireless device, a tenth NAS message indicating acceptance of the deactivation. In an example, the AMF may send, to a session management function (SMF), an eleventh NAS message indicating the deactivation of the packet duplication of the session. The AMF may receive, from the SMF, a twelfth NAS message indicating an acceptance of the deactivation.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
    receiving, by a wireless device from a base station, at least one first radio resource control message comprising configuration parameters for:
        a first session associated with a first session identifier between the wireless device and a user plane function; and
        a second session associated with a second session identifier different from the first session identifier, for packet duplication of the first session, between the wireless device and the user plane function;
    receiving at least one second radio resource control message indicating activation of the packet duplication; and
    based on the activation of the packet duplication, sending:
        original packets via the first session to the user plane function; and
        duplicated packets of the first session to the user plane function via the second session.

2. The method of claim 1, wherein the second session is deactivated based on receiving at least one third radio resource control message.

3. The method of claim 1, further comprising:
    receiving, by the wireless device, at least one third radio resource message indicating deactivation of the packet duplication; and
    based on the deactivation of the packet duplication, by the wireless device:
    keeping sending continuing to send, by the wireless device, original packets of the first session to the user plane function; and
    stopping sending not continuing to send, by the wireless device, duplicated packets of the first session to the user plane function via the second session.

4. The method of claim 1, further comprising sending, by the wireless device to the base station, a response radio resource control message indicating a completion of the activation.

5. The method of claim 1, further comprising sending, by the base station to the user plane function, the duplicated packets of the first session.

6. The method of claim 1, further comprising sending, by the base station to the user plane function:

the original packets via a first tunnel between the base station and the user plane function; and the duplicated packets via a second tunnel between the base station and the user plane function.

7. The method of claim 1, further comprising sending by the base station:

the original packets to a first user plane function; and the duplicated packets to a second user plane function.

8. The method of claim 1, wherein the wireless device sends:

the original packets via the base station; and the duplicated packets via a second base station.

9. The method of claim 1, further comprising:

receiving, by the base station from the wireless device, a channel measurement information; and determining, by the base station and based on the channel measurement information, the activation of the packet duplication.

10. The method of claim 9, wherein the channel measurement information comprises at least one of:

a channel quality indicator (CQI);

a precoding matrix indicator (PMI);

a precoding type indicator (PTI); or a rank indication (RI).

11. The method of claim 1, further comprising determining, by the base station, the packet duplication based on at least one of:

a quality-of-service requirement of the first session;

a traffic load of the base station;

a session type of the first session; or a network slice of the first session.

12. The method of claim 1, further comprising:

sending, by the base station to an access and mobility management function (AMF), a first message indicating the activation of the packet duplication; and receiving, by the base station from the AMF, a second message indicating acceptance of the activation, wherein the at least one second radio resource control message is based on the acceptance of the activation.

13. The method of claim 12, wherein the second message comprises an uplink transport network layer (TNL) address of the user plane function.

14. The method of claim 12, wherein the second message comprises at least one of:

a first uplink transport network layer (TNL) address of a first user plane function for the original packets; or a second uplink TNL address of a second user plane function for the duplicated packets.

15. The method of claim 12, further comprising:

sending, by the AMF to a session management function (SMF), a third message indicating the activation of the packet duplication; and receiving, by the AMF from the SMF, a fourth message indicating acceptance of the activation.

16. The method of claim 15, wherein the fourth message comprises an uplink transport network layer (TNL) address of the user plane function.

17. The method of claim 15, wherein the fourth message comprises at least one of:

a first uplink transport network layer (TNL) address of a first user plane function for the original packets; or a second uplink TNL address of a second user plane function for the duplicated packets.

18. The method of claim 1, further comprising sending, by an access and mobility management function (AMF) to a session management function (SMF), an information message comprising at least one of:

a first downlink transport network layer (TNL) address for the original packets; or a second downlink TNL address for the duplicated packets.

19. The method of claim 1, further comprising:

receiving, by a second base station from the base station, a modification request message indicating the activation of the packet duplication; and starting, by the second base station and based on the modification request message, sending the duplicated packets.

20. The method of claim 1, further comprising receiving, by the base station from a second base station, resource status information of the second base station, wherein:

the activation of the packet duplication is based on the resource status information; and the second base station is a secondary base station of the wireless device.

* * * * *